(12) United States Patent
Wagner et al.

(10) Patent No.: US 12,704,907 B2
(45) Date of Patent: Aug. 11, 2026

(54) GESTURE AND VOICE CONTROLLED INTERFACE DEVICE

(71) Applicant: Wearable Devices Ltd., Yokneam Ilit (IL)

(72) Inventors: Guy Wagner, Kiryat Tivon (IL); Leeor Langer, Alonei Aba (IL); Asher Dahan, Or-Akiva (IL)

(73) Assignee: Wearable Devices Ltd., Yokneam Ilit (IL)

( * ) Notice: Subject to any disclaimer, the term of this patent is extended or adjusted under 35 U.S.C. 154(b) by 0 days.

(21) Appl. No.: 19/245,339

(22) Filed: Jun. 22, 2025

(65) Prior Publication Data

US 2026/0023439 A1 Jan. 22, 2026

Related U.S. Application Data

(63) Continuation of application No. 18/388,528, filed on Nov. 9, 2023, now Pat. No. 12,340,029, which is a continuation of application No. 18/109,315, filed on Feb. 14, 2023, now Pat. No. 12,340,027.

(60) Provisional application No. 63/314,491, filed on Feb. 28, 2022.

(51) Int. Cl.

| | |
|---|---|
| ***G06F 3/01*** | (2006.01) |
| ***G06F 3/0346*** | (2013.01) |
| ***G06F 3/16*** | (2006.01) |
| ***G10L 17/06*** | (2013.01) |
| ***G10L 17/22*** | (2013.01) |

(52) U.S. Cl.

CPC ............. *G06F 3/017* (2013.01); *G06F 3/015* (2013.01); *G06F 3/0346* (2013.01); *G06F 3/167* (2013.01); *G10L 17/06* (2013.01); *G10L 17/22* (2013.01); *G06F 3/013* (2013.01)

(58) Field of Classification Search

CPC ........ G06F 3/017; G06F 3/015; G06F 3/0346; G06F 3/167; G06F 3/013; G06F 1/163; G06F 3/016; G10L 17/06; G10L 17/22; G06N 3/0464; G06N 3/09

See application file for complete search history.

(56) References Cited

U.S. PATENT DOCUMENTS

| | | | | |
|---|---|---|---|---|
| 9,720,515 | B2 | 8/2017 | Wagner et al. | |
| 2012/0029399 | A1 | 2/2012 | Sankai | |
| 2016/0313801 | A1 | 10/2016 | Zhao et al. | |
| 2017/0195636 | A1* | 7/2017 | Child | H04L 12/2803 |
| 2018/0025562 | A1* | 1/2018 | Chen | H04N 7/188 348/156 |
| 2019/0224849 | A1 | 7/2019 | Tan et al. | |
| 2020/0069210 | A1 | 3/2020 | Berenzweig et al. | |
| 2021/0064132 | A1 | 3/2021 | Rubin et al. | |

(Continued)

*Primary Examiner* — Pegeman Karimi

(74) *Attorney, Agent, or Firm* — PEARL COHEN ZEDEK LATZER BARATZ LLP

(57) ABSTRACT

A gesture and voice-controlled interface device comprising one or a plurality of gesture sensors for sensing gestures of a user; one or a plurality of audio sensors for sensing sounds made by the user; and a processor configured to obtain one or a plurality of sensed gestures from said one or a plurality of gesture sensors and to obtain one or a plurality of sensed sounds from said one or a plurality of audio sensors, to analyze the sensed gesture and sensed sounds to identify an input from the user, and to generate an output signal corresponding to the input to a controlled device.

4 Claims, 47 Drawing Sheets

(56) References Cited

U.S. PATENT DOCUMENTS

2022/0121288 A1* 4/2022 Wu .................... G06F 1/1698
2022/0279760 A1 9/2022 Ehrman et al.
2022/0404914 A1 12/2022 Qiu et al.
2023/0129964 A1* 4/2023 Rodriguez Bravo .................... G07F 19/207 705/43

* cited by examiner

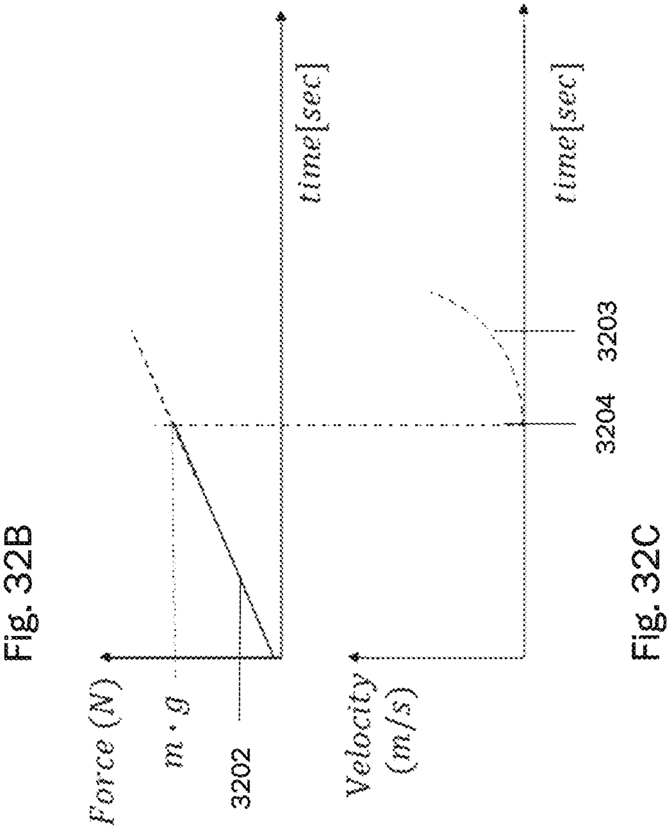
Fig. 32B
Fig. 32C
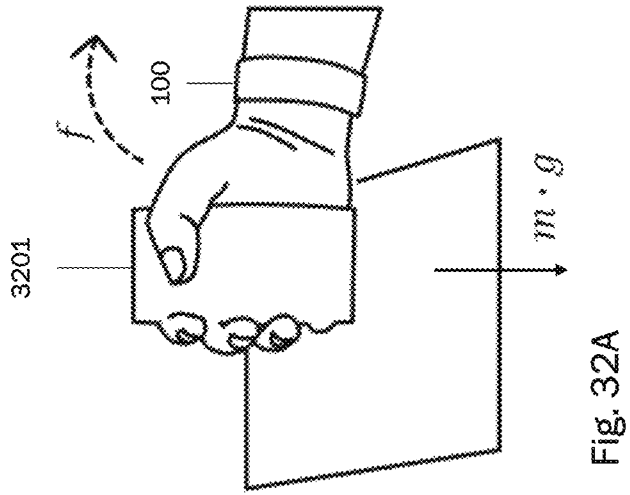
Fig. 32A

3301

GESTURE AND VOICE CONTROLLED INTERFACE DEVICE

CROSS REFERENCE TO RELATED APPLICATIONS

This application is a Continuation of U.S. patent application Ser. No. 18/388,528, filed Nov. 9, 2023, which is a Continuation of U.S. patent application Ser. No. 18/109,315, filed Feb. 14, 2023, which claims the benefit of U.S. Provisional Patent Application No. 63/314,491, filed Feb. 28, 2022, all of which are incorporated herein by reference in their entirety.

FIELD OF THE INVENTION

The present invention relates to an interface for an electronic device. More particularly, the present invention relates to a gesture and voice-controlled interface device.

BACKGROUND OF THE INVENTION

Natural human communication is typically a combination of speech and gestures. Typically, speech is used to convey the bulk of the communicated information, while gestures are used as an additional contextual aid. The spoken word communicated between participants of a conversation may carry most of the context, but void of gestures, the same spoken words may take a different meaning. During a conversation, feedback is provided by participants of the conversation on the reception and understanding of the communicated information. The feedback is also typically a combination of speech and gestures. A recipient of a communication may nod their head and say "yes" in approval and may also shake their head or hands in disapproval. Aspects and intricacies of natural human communication may be intuitively understood by conversing parties, as human communication is a result of ages of development of the natural human communication. Human interface with electronic devices and computers, on the other hand, is relatively new and less developed.

Before the invention of the smart device (e.g., smartphone and tablet), human interface with computers was limited to basic input and output devices. Input was received by a keyboard and a mouse, where a user would serially press on keys to communicate with the computer. Feedback was provided on output devices such as displays and speakers. For example, feedback provided for acknowledgement such as a click on a pointing device such as a computer mouse click, may have included a "ping" sound and a change in the illumination intensity (e.g., darkening or brightening) of an object on a display screen.

A smart device that includes a touch screen may provide an additional layer of communication with electronic devices. A user of the smart device that includes a touch screen may touch, press, swipe and perform various gestures on the touch screen. The smart device may provide visual, auditory and haptic feedback to the user. The screen may display a visual effect (e.g., a change in a shape and color of a virtual button), a sound may be emitted, and a vibration may be generated to provide feedback to the user of the smart device.

Speech and sounds may also be used to communicate with electronic devices. Smartphones and smart speakers (e.g., Amazon Echo) may have virtual assistant artificial intelligence (AI) technology (e.g., Amazon Alexa) that allow a user to utter a command, which the virtual assistant AI may then interpret and provide feedback to. Users may typically ask the virtual assistant a question or provide a command.

There are electronic devices that recognize gestures such as hand movements. Gesture recognition may be performed by analyzing a video imaging of a user. Gesture recognition may also be performed by analyzing data received from sensors positioned on the body of the user (e.g., an accelerometer on a wearable device attached to a user's arm).

It may be desired to provide devices, systems and methods for combined gesture and voice controlling for an electronic device.

SUMMARY OF THE INVENTION

There is thus provided, in accordance with an embodiment of the invention, a device for estimating a force applied on an object. The device may include one or a plurality of biopotential sensors configured to be placed on a limb of a user and to measure one or more biopotential signals from one or more muscles or one or more nerves of the limb. The device may also include an inertial measurement unit (IMU) to measure one or more inertial properties of the limb. The device may also include a processor configured to obtain the measured one or more biopotential signals and one or more measured inertial properties, and to estimate the force applied on the object by the limb of the user based on a model constructed from samples of biopotential signals and inertial properties collected from a plurality of users who applied a known force.

According to some embodiments of the present invention, said one or more inertial properties is selected from the group of inertial properties consisting of: orientation, angular velocity, linear velocity and acceleration of the limb.

According to some embodiments of the present invention, the processor is configured to estimate weight of the object.

According to some embodiments of the present invention, the processor is configured to estimate torque applied on a lever.

According to some embodiments of the present invention, the processor is configured to estimate force applied to successfully connect a connector.

According to some embodiments of the present invention, there is provided a gesture-controlled interface device. The device may include one or a plurality of gesture sensors for sensing gestures of a user; and a processor configured to obtain one or a plurality of sensed gestures from said one or a plurality of gesture sensors, to analyze the one or a plurality of sensed gestures to identify an input from the user, and to generate an output signal corresponding to the input to a controlled device that is modulated by a modulating function according to one or more properties of the one or a plurality of sensed gestures.

According to some embodiments of the present invention, the modulating function simulates a physical parameter relating to a virtual object or a virtual environment.

According to some embodiments of the present invention, the physical parameter is selected from the group consisting of: weight, texture, friction and resistance.

According to some embodiments of the present invention, the device may include a feedback device selected from the group consisting of screen, haptic actuator, tactile actuator and speaker.

According to some embodiments of the present invention, the one or more properties is selected from the group consisting of position of a hand, pressure between fingers and distance between fingers.

According to some embodiments of the present invention, there is provided a gesture-controlled interface device. The device may include one or a plurality of gesture sensors for sensing gestures of a user; and a processor configured to obtain one or a plurality of sensed gestures from said one or a plurality of gesture sensors, to analyze the sensed gesture to identify an input from the user and to identify successful connection of a connector, and to generate an output signal corresponding to the input to a controlled device.

According to some embodiments of the present invention, the processor is further configured to analyze the sensed gesture to identify disconnection of the connector.

According to some embodiments of the present invention, said one or a plurality of sensors comprises a sensor selected from the group of sensors biopotential sensors, and an inertial measurement unit for determining hand orientation or angular velocity acceleration.

According to some embodiments of the present invention, the processor is configured, when analyzing the sensed gesture to identify successful connection to analyze a sound.

According to some embodiments of the present invention, the sound comprises a click or a friction sound.

According to some embodiments of the present invention, the processor is further configured to verify, based on comparing said one or a plurality of sensed gestures, to a gesture signature of a specific person that the one or a plurality sensed gestures were performed by that specific person.

According to some embodiments of the present invention, there is provided a gesture and voice-controlled interface device comprising: one or a plurality of gesture sensors for sensing gestures of a user; one or a plurality of audio sensors for sensing sounds made by the user; and a processor configured to obtain one or a plurality of sensed gestures from said one or a plurality of gesture sensors and to obtain one or a plurality of sensed sounds from said one or a plurality of audio sensors, to analyze the sensed gesture and sensed sounds to identify an input from the user, and to generate an output signal corresponding to the input to a controlled device.

According to some embodiments of the present invention, the processor is configured to identify the input only if said one or a plurality of sensed gestures and said one or a plurality of sensed sounds were sensed within a predetermined period of time.

According to some embodiments of the present invention, said one or a plurality of sensed gestures was sensed before said one or a plurality of sensed sounds.

According to some embodiments of the present invention, said one or a plurality of sensed gestures was sensed after said one or a plurality of sensed sounds.

According to some embodiments of the present invention, said one or a plurality of sensed gestures was concurrently sensed with said one or a plurality of sensed sounds.

According to some embodiments of the present invention, the processor is configured to identify an initiating cue in said one or a plurality of sensed gestures or in said one or a plurality of sensed sounds, to extract a first measured gesture value from said one or a plurality of sensed gestures, to extract a second measured gesture value from said one or a plurality of sensed gestures, and to generate the output signal based on the first measured gesture value and the second measured gesture value.

According to some embodiments of the present invention, the initiating cue is used to select a function of a controlled device, wherein the first measured gesture value is used to select an initial state of a parameter of the function, and wherein the second measured gesture value is used to select a final state of the parameter of the function.

According to some embodiments of the present invention, the function is selected from the group of functions consisting of: volume of an audio device, temperature of a climate control device, size of a virtual object, displacement of a virtual object and zooming in or zooming out.

According to some embodiments of the present invention, the processor is configured to identify the initiating cue based on at least one cue from the group of cues consisting of: a sound of the user, a gesture of the user, a value of force measured from the user and a signal generated by the processor.

According to some embodiments of the present invention, the processor is configured, after identifying the initiating cue, to wait for a predetermined period of time before extracting the first measured parameter.

According to some embodiments of the present invention, the processor is configured to identify a terminating cue in said one or a plurality of sensed gestures or in said one or a plurality of sensed sounds.

According to some embodiments of the present invention, the processor is configured to identify the terminating cue based on identifying exiting a predetermined parameter range or identifying a stabilization within a predetermined parameter range.

According to some embodiments of the present invention, the processor is configured to generate the output signal based on a mathematical relation selected from the group of mathematical relations consisting of: ratio, addition, subtraction, multiplication and division.

According to some embodiments of the present invention, said one or a plurality of gesture sensors for sensing gestures of a user is configured to sense one or more parameters of the group of parameters consisting of: displacement of the user, displacement of a limb of the user, displacement of a finger of the user, facial gesture, facial grimace, values of biopotentials from nerves or muscle of a limb or finger of the user, and eye movement of the user.

According to some embodiments of the present invention, the processor is configured, to calculate a similarity measure between a gesture of said one or a plurality of sensed gestures and a predefined gesture, and to generate the output signal only when the similarity measure is above a predetermined threshold.

According to some embodiments of the present invention, the processor is configured to: identify a specific person based on comparing said one or a plurality of sensed sounds to a voice signature of the specific person; verify, based on comparing said one or a plurality of sensed gestures, to a gesture signature of the specific person that the one or a plurality sensed gestures were performed by the specific person; and generate an output signal corresponding to the input to the controlled device only if it was verified that said one or a plurality of sensed gestures were performed by the specific person.

According to some embodiments of the present invention, the processor is configured to calculate a similarity measure between a gesture of said one or a plurality of sensed gestures and a predefined gesture, and to generate the output signal only when the similarity measure is above a predetermined threshold.

According to some embodiments of the present invention, the processor is further configured to present to the user a pattern to be mimicked that corresponds to the predefined gesture, via an output device.

According to some embodiments of the present invention, the processor is further configured to present to the user a plurality of patterns to choose from the pattern to be mimicked, via an output device.

According to some embodiments of the present invention, the predefined gesture is a variation of the pattern to be mimicked.

According to some embodiments of the present invention, the predefined gesture is an opposite of the pattern to be mimicked.

According to some embodiments of the present invention, the processor is configured to generate the pattern to be mimicked.

According to some embodiments of the present invention, the pattern to be mimicked is selected from a database of predefined patterns.

According to some embodiments of the present invention, a modality of the pattern to be mimicked is selected from the group of modalities consisting of: sound, vision, tactile and haptic.

According to some embodiments of the present invention, the output device is selected from the output devices consisting of: a display screen, headphones, earphones, a speaker, tactile actuator, and haptic actuator.

According to some embodiments of the present invention, said one or a plurality of sensed gestures comprises sensing pressure applied between fingers or sensing pressure resulting from fisting.

According to some embodiments of the present invention, said one or a plurality of sensed gestures also comprises sensing motion of a forearm of the user.

According to some embodiments of the present invention, said motion is selected from the group of motions consisting of: roll, pitch and yaw.

According to some embodiments of the present invention, the processor is configured to determine whether the sensed pressure and the sensed motion are synchronized.

According to some embodiments of the present invention, said one or a plurality of gesture sensors comprises one or more sensors selected from the group of sensors consisting of: reflectometer sensor, biopotential sensor, electro-myography (EMG) sensor, surface nerve conductance (SNC) sensor, electro-oculogram (EOG) sensor, pressure sensor, inertial measurement unit (IMU) sensor, optical sensor and imaging sensor.

According to some embodiments of the present invention, there is provided a gesture-controlled interface device comprising: one or a plurality of gesture sensors for sensing gestures of a user; and a processor configured to obtain one or a plurality of sensed gestures from said one or a plurality of gesture sensors and to analyze the one or a plurality of sensed gestures to identify an input from the user, and to generate an output signal corresponding to the input to a controlled device, wherein the processor is configured, to calculate a similarity measure between a gesture of said one or a plurality of sensed gestures and a predefined gesture, and to generate the output signal only when the similarity measure is above a predetermined threshold.

According to some embodiments of the present invention, the processor is further configured to present to the user a pattern to be mimicked that corresponds to the predefined gesture, via an output device.

According to some embodiments of the present invention, the processor is further configured to present to the user a plurality of patterns to choose from the pattern to be mimicked, via an output device.

According to some embodiments of the present invention, the predefined gesture is a variation of the pattern to be mimicked.

According to some embodiments of the present invention, the predefined gesture is an opposite of the pattern to be mimicked.

According to some embodiments of the present invention, the processor is configured to generate the pattern to be mimicked.

According to some embodiments of the present invention, the pattern to be mimicked is selected from a database of predefined patterns.

According to some embodiments of the present invention, a modality of the pattern to be mimicked is selected from the group of modalities consisting of: sound, vision, tactile and haptic.

According to some embodiments of the present invention, the output device is selected from the output devices consisting of: a display screen, headphones, earphones, a speaker, tactile actuator, and haptic actuator.

According to some embodiments of the present invention, said one or a plurality of sensed gestures comprises sensing pressure applied between fingers or sensing pressure resulting from fisting.

According to some embodiments of the present invention, said one or a plurality of sensed gestures also comprises sensing motion of a forearm of the user.

According to some embodiments of the present invention, said motion is selected from the group of motions consisting of: roll, pitch and yaw.

According to some embodiments of the present invention, the processor is configured to determine whether the sensed pressure and the sensed motion are synchronized.

According to some embodiments of the present invention, there is provided a gesture and voice-controlled interface device comprising: one or a plurality of gesture sensors for sensing gestures of a user; and a processor configured to obtain one or a plurality of sensed gestures from said one or a plurality of gesture sensors, identify a specific person based on comparing said one or a plurality of sensed sounds to a voice signature of the specific person, verify, based on comparing said one or a plurality of sensed gestures, to a gesture signature of the specific person that the one or a plurality sensed gestures were performed by the specific person and generate an output signal corresponding to the input to the controlled device only if it was verified that the one or a plurality of sensed gestures were performed by the specific person.

According to some embodiments of the present invention, there is provided a method for gesture and voice-control that includes sensing gestures of a user using one or a plurality of gesture sensors; sensing sounds made by the user using one or a plurality of audio sensors; and using a processor, obtaining one or a plurality of sensed gestures from said one or a plurality of gesture sensors and obtaining one or a plurality of sensed sounds from said one or a plurality of audio sensors, analyzing the one or a plurality of sensed gestures and the one or a plurality of sensed sounds to identify an input from the user, and generating an output signal corresponding to the input to a controlled device.

According to some embodiments of the present invention, there is provided a device for estimating a weight of an object, the device comprising: one or a plurality of biopotential sensors configured to be placed on a limb of a user and to measure one or more biopotential signals from one or more muscles and nerves of the limb; an inertial measurement unit (IMU) to measure one or more inertial properties of the limb, and a processor to obtain the measured one or more biopotential signals and one or more measured inertial properties and to estimate a weight of an object supported by the limb of the user or of a force applied by that limb based on said one or more biopotential signals and said one or more inertial parameters that were measured with respect to known weights or known forces.

According to some embodiments of the present invention, said one or more inertial properties is selected from the group of inertial properties consisting of: orientation, angular velocity, linear velocity and acceleration of the limb.

According to some embodiments of the present invention, the processor is further configured to identify from additionally measured one or more biopotential signals and additionally measured one or more measured inertial properties mimicking physical interaction with the object.

According to some embodiments of the present invention, the processor is configured to generate a feedback signal based on the additionally measured one or more biopotential signals and additionally measured one or more measured inertial properties.

According to some embodiments of the present invention, there is provided a gesture-controlled interface device comprising: one or a plurality of gesture sensors for sensing gestures of a user; and a processor configured to obtain one or a plurality of sensed gestures from said one or a plurality of gesture sensors and to analyze the one or a plurality of sensed gestures to identify an input from the user, and to generate an output signal corresponding to the input to a controlled device, wherein the processor is configured to identify an initiating cue in said one or a plurality of sensed gestures, to extract a first measured gesture value from said one or a plurality of sensed gestures, to extract a second measured gesture value from said one or a plurality of sensed gestures, and to generate the output signal based on the first measured gesture value and the second measured gesture value, wherein the initiating cue is used to select a function of a controlled device, wherein the first measured gesture value is used to select an initial state of a parameter of the function, and wherein the second measured gesture value is used to select a final state of the parameter of the function.

According to some embodiments of the present invention, the function is selected from the group of functions consisting of: volume of an audio device, temperature of a climate control device, size of a virtual object, displacement of a virtual object and zooming in or zooming out.

According to some embodiments of the present invention, there is provided a gesture-controlled interface device comprising: one or a plurality of gesture sensors for sensing gestures of a user; and a processor configured to obtain one or a plurality of sensed gestures from said one or a plurality of gesture sensors and to analyze the one or a plurality of sensed gestures to identify an input from the user, and to generate an output signal corresponding to the input to a controlled device that is modulated by a modulating function according to one or more properties of the one or a plurality of sensed gestures.

According to some embodiments of the present invention, the modulating function simulates a physical parameter relating to a virtual object or a virtual environment.

According to some embodiments of the present invention, the physical parameter is selected from the group consisting of: weight, texture, friction and resistance.

According to some embodiments of the present invention, the processor is configured to use the modulation function to modulate one or more properties of the one or a plurality of sensed gestures and use the modulated one or more properties of the one or a plurality of sensed gestures to provide feedback to the user using a feedback device.

According to some embodiments of the present invention, there is provided a method for estimating a weight of an object or an applied force, the method comprising: measuring one or more biopotential signals from one or more muscles and nerves of a limb of a user, using one or a plurality of biopotential sensors configured to be placed on the limb of the user; obtaining, using a processor, the measured one or more biopotential signals; and estimating, using the processor, a weight of an object supported by the limb of the user or of a force applied by that limb based on one or more biopotential signals that were measured with respect to known weights or known forces.

According to some embodiments of the present invention, there is provided a method for gesture-control comprising: sensing gestures of a user using one or a plurality of gesture sensors; and using a processor, obtaining one or a plurality of sensed gestures from said one or a plurality of gesture sensors, analyzing the one or a plurality of sensed gesture to identify an input from the user, generating an output signal corresponding to the input to a controlled device, identifying an initiating cue in said one or a plurality of sensed gestures, extracting a first measured gesture value from said one or a plurality of sensed gestures, extracting a second measured gesture value from said one or a plurality of sensed gestures; and generating the output signal based on the first measured gesture value and the second measured gesture value.

According to some embodiments of the present invention, the method further includes using the processor, selecting, based on the initiating cue, a function of a controlled device, selecting, using the first measured gesture value, an initial state of a parameter of the function, and selecting, using the second measured gesture value, a final state of the parameter of the function.

According to some embodiments of the present invention, the function is selected from the group of functions consisting of: volume of an audio device, temperature of a climate control device, size of a virtual object, displacement of a virtual object and zooming in or zooming out.

According to some embodiments of the present invention, said one or a plurality of gesture sensors comprises one or more sensors selected from the group of sensors consisting of: reflectometer sensor, biopotential sensor, electro-myography (EMG) sensor, surface nerve conductance (SNC) sensor, electro-oculogram (EOG) sensor, pressure sensor, inertial measurement unit (IMU) sensor, optical sensor and imaging sensor.

According to some embodiments of the present invention, there is provided a method for gesture-control comprising: sensing gestures of a user using one or a plurality of gesture sensors; and using a processor, obtaining one or a plurality of sensed gestures from said one or a plurality of gesture sensors, analyzing the one or a plurality of sensed gestures to identify an input from the user, and generating an output signal corresponding to the input to a controlled device, wherein the output signal is modulated by a modulating function.

According to some embodiments of the present invention, the modulating function simulates a physical parameter relating to a virtual object or a virtual environment.

According to some embodiments of the present invention, there is provided a gesture-controlled interface device comprising: one or a plurality of gesture sensors for sensing gestures of a user; and a processor configured to obtain one or a plurality of sensed gestures from said one or a plurality of gesture sensors and to analyze the one or a plurality of sensed gestures to identify a specific person based on comparing said one or a plurality of sensed gestures, to a gesture signature of the specific person that the one or a plurality sensed gestures were performed by the specific person.

According to some embodiments of the present invention, the plurality of sensed gestures are selected from the group of sensors biopotential sensors, SNC sensors, EMG sensors, EEG sensors, EOG sensors.

According to some embodiments of the present invention, the processor is configured to map gesture samples from users into a metric space, such that same gestures are mapped close to each other into regions with perimeter, and the samples of gestures of different users are mapped at a distance from each other.

BRIEF DESCRIPTION OF THE DRAWINGS

In order for the present invention to be better understood and for its practical applications to be appreciated, the following Figures are provided and referenced hereafter. It should be noted that the Figures are given as examples only and in no way limit the scope of the invention. Like components are denoted by like reference numerals.

FIG. 32A is a schematic view of a hand of a user lifting an object, the hand wearing an interface device for estimating weight of the object, in accordance with some embodiments of the present invention.

FIG. 32B is a graph showing measurements of force of the hand of FIG. 32A for estimating weight of the object of FIG. 32A, in accordance with some embodiments of the present invention.

FIG. 32C is a graph showing measurements of speed of the hand of FIG. 32A for estimating weight of the object of FIG. 32A, in accordance with some embodiments of the present invention.

DETAILED DESCRIPTION OF THE INVENTION

Figure 1A:
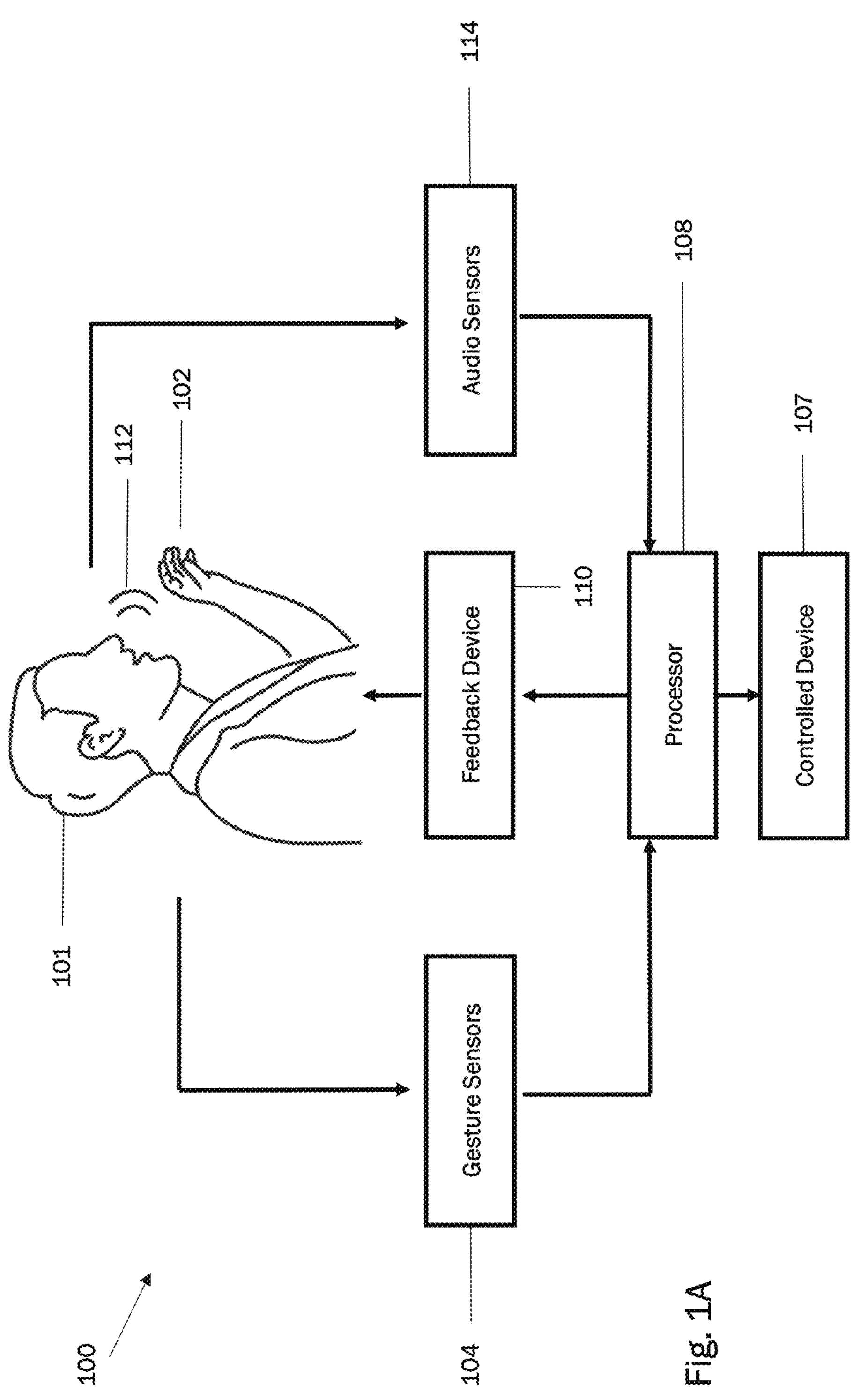
FIG. 1A is a schematic view of a gesture and voice-controlled interface device, in accordance with some embodiments of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

In some embodiments of the present invention, a gesture and voice-controlled interface device for an electronic device may be configured to sense voice and gestures of a user, identifying an input from the sensed voice and gestures of the user and generate an output signal to a controlled electronic device. A user of the interface device may use a vocal signal, a gesture and/or a combination of voice and gesture to control an electronic device. The use of voice may be concurrent with and/or separate from the performance of the gesture. For example, the user may utter a command such as "increase volume" and then lift their hand to perform a gesture that causes the volume to increase to a desired level. The interface device may capture, via an audio sensor (e.g., microphone), the voice of the user and interpret, using a processor, the voice of the user as a command or information for controlling the electronic device (e.g., smart speaker). The interface device may also identify a gesture of the user, e.g., identify a gesture of hand being lifted, and translate a detected distance traveled by the hand as an extent (e.g., level) of a parameter to be adjusted (e.g., increasing volume of the speaker).

In some embodiments of the present invention, the interface device may include a repository of recognized gestures and voice commands associated with commands and functions. The interface device may be configured to identify a gesture and/or a voice command of the user and associate a command or function from the repository with the gesture and/or voice command.

In some embodiments of the present invention, the interface device may sense gestures of the user. Gesture sensors of the interface device may sense gestures performed by the user such as gestures in space. A gesture of a user may refer to an action or movement performed by the user such as pressure applied (e.g., maintaining, increasing or decreasing pressure) between fingers of the users, pressure applied between a finger of the user and palm of the user (or an object), movement of fingers of the users (such as increasing or decreasing distance between fingers or finger parts of the user), movement of the user or parts of the user (such as movement or tilt of head of the user, movement or rotation of hands or parts of hands of the user, movement of torso of the user), movement of eyes of the user, static gestures of hands of the user (e.g., fisting and/or holding one or a plurality of fingers up), swiping motions of finger or hand of the user and the like. A gesture in space may refer to a gesture performed in space by the user without actively touching an input device such as a touch screen, pointing device (e.g., computer mouse) or keyboard. For example, the gesture sensors may sense gestures in space, such as increasing and decreasing distance between fingers of the user to control adjustment of a parameter (e.g., volume, temperature, etc.). While a gesture performed on an input device (e.g., touch screen) may have a clear beginning of gesture (e.g., when the user touches the touch screen) and a clear end of gesture (e.g., when the user removes their hand from the touch screen), it may be difficult to identify the gesture in space (e.g., a beginning and an end of the gesture in space). The interface device may continuously sense gestures of the user (the user is continuously moving), and it may be difficult to clearly identify when the gesture begins, when the gesture ends and if the gesture was intentional or random.

It may be desired to make sure that gestures and movements of the user that were not meant to be interpreted as actuating gestures are indeed not identified as such. To avoid interpreting a random movement as a command, the interface device may be configured to perform rigorous evaluation of gestures of the user and require the performance of very specific gestures to be identified and interpreted as commands. The interface device may be configured to identify a beginning, an end, a full performance of a gesture, and determine that a specific gesture was successfully performed.

It may be desired to define gestures that are unlikely to be random gestures (e.g., everyday types of random movements). The interface device may comprise a repository of predefined gestures that are unlikely to be performed randomly by the user.

In some embodiments of the present invention, the interface device may identify if the gesture of the user is a gesture for interfacing with an electronic device. The interface device may identify a command from the user by associating a gesture of the user with a gesture from a set of predetermined gestures that the interface device recognizes. For example, a user snapping their fingers once may be an arbitrary movement. A user snapping their fingers twice in succession (e.g., within a predetermined time duration) may be a recognized gesture that is associated with a command, e.g., a command to turn on lights in a certain room.

In some embodiments of the present invention, the interface device may provide feedback to the user. The interface device may include an audio output device (e.g., speaker and/or an interface to a speaker), a visual output device (e.g., a screen, lights) and/or one or more haptic feedback actuators for providing feedback to the user. The interface device may provide feedback (e.g., audio, visual, tactile) to the user to indicate that an input from the user is recognized. The interface device may provide feedback to the user to indicate that sensed movement and/or voice from the user is not recognized as an input. The interface device may provide instructive or suggestive feedback to the user for performing movements and sentences that are considered by the interface device as input.

In some embodiments of the present invention, the interface device may include sensors for detecting audio signals generated by the user and/or gestures of the user. The interface device may include one or a plurality of audio sensors (e.g., microphones) for detecting voice signals (e.g., sounds, verbal messages) of the user. The interface device may include a voice identification unit linked to the one or a plurality of audio sensors for detecting voice commands of the user. The voice identification unit may be implemented in hardware (e.g., processor) and/or in software. The voice identification unit may receive sensed voice signals from the audio sensors and analyze it to determine whether it is noise or a signal designated as a voice command of the user. The voice identification unit may be connected to a processor. The voice identification unit may communicate with the processor for sending information relating to the sensed voice data. The voice identification device may communicate with the processor by sending a signal indicating that the obtained voice data was identified as an intended voice command from the user.

In some embodiments of the present inventio, the interface device may include one or a plurality of gesture sensors for sensing gestures of a user. For example, the interface device can include one or a plurality of cameras as sensors for tracking and detecting gestures of the user. The one or more cameras may be linked to a video analyzing unit for analyzing video obtained by the one or more cameras and for detecting in the obtained video gestures of the user. In some embodiments the interface device may include one or a plurality of depth sensors for sensing gestures of the user.

In some embodiments of the present invention, the interface device may include a wearable device to be worn by the user. The wearable device may include one or a plurality of sensors for detecting gestures.

In some embodiments of the present invention, the wearable device may comprise a flexible user interface. The flexible user interface may comprise a Printed Circuit Board (PCB) with multiple elements configured to allow an interface between the user and a processor. The PCB of the flexible user interface may be integrated into an elastic band, so that the flexible user interface may be transfigured in order to achieve a cylindrical shape capable of fitting onto a limb of a user (such as a flexible band for a wristwatch).

In some embodiments of the present invention, the PCB of the flexible user interface may comprise a plurality of bio-potential sensors and an array of haptic feedback actuators, with a conducting strip having corresponding wiring for bio-potential sensors and/or for the haptic feedback actuators. Each bio-potential sensor may include at least two electrodes configured to be in direct contact with the skin of the user.

In some embodiments of the present invention, the biopotential sensors may be surface electromyography (sEMG) sensors, and the conducting strip may have several conducting layers for electrical power transfer and also for signal transfer. In some embodiments, other sensors may be used instead of sEMG, for example capacitive electromyography (cEMG) sensors. It should be noted that electromyography sensors are capable of detecting signals derived from muscle movement, wherein these signals may be transportable along the limbs.

In some embodiments of the present invention, the biopotential sensors may be surface nerve conduction (SNC) sensors, capable of detecting nerve signals from the carpus, wherein these signals are caused by movement and/or movement intention of the user (e.g., when the user intends to make a movement, the biopotential sensors may sense signals of an intention to make a move). For example, the SNC sensors may be configured to detect signals from three main nerves: the median nerve, the ulnar nerve, and the radial nerve, as performed in standard medical diagnostic nerve conduction studies. In some embodiments comprising SNC sensors, at least three SNC sensors may be required in order to accurately detect the nerve activity from the three main nerves (e.g., one sensor for each main nerve). In some embodiments of the present invention, one or more SNC sensors may be required to detect nerve activity.

In some embodiments of the present invention, the gesture sensors may be pressure sensors, photoplethysmogram (PPG) sensors and RF sensors. Pressure sensors may be used for detecting tendon movement. For example, the interface device may identify a gesture of the user by analyzing tendon movement. PPG sensors such as sensor based on light emitting diode technology, may be used to measure changes in volume of the wrist during movements of the wrist tendons.

In some embodiments of the present invention, the biopotential sensors may be aligned in a configuration of multiple pairs in order to detect different sources of electric activity, since each nerve creates a signal in a specific location (for instance a sensor on the back side of an arm may not detect signals on the front of the arm).

In some embodiments of the present invention, the sensors may have a differential configuration, corresponding to the nature of the detected signal, and capable of detecting the electrical action potential generated in proximity to these sensors, by measuring the voltage difference between at least two corresponding electrodes for each sensor. Such electrodes are typically dry electrodes that may engage the skin of the user without requiring an additional substance (such as a gel) to improve skin conductivity. When the biopotential sensors are attached to the body of the user, the gestures and/or force applied by the user may be detected by the biopotential sensors due to the generated electrical action potential.

In some embodiments of the present invention, the PCB of the flexible user interface may comprise an array of haptic feedback actuators. The array of haptic feedback actuators may be used as a user haptic feedback mechanism, instead of a screen based visual feedback, for creating a closed loop feedback. Closed loop feedback may be learned by users with minimal conscious effort and may provide an important layer in human adaptation to such interface. The interface device (and the closed loop feedback) may be used in gaming (such as video games and virtual reality simulators or the metaverse) to control the game and/or simulation and to give the user a sense of augmented or virtual reality.

In some embodiments of the present invention, the PCB may comprise a wireless communication controller for providing wireless communication (e.g., with a Bluetooth transceiver) to nearby devices. For example, the wireless communication controller may be a Bluetooth Low Energy (BLE) controller providing reduced power consumption for wireless communication.

In some embodiments of the present invention, the PCB may comprise motion sensors. The motion sensors may be Micro-Electro-Mechanical Systems (MEMS) and may include an accelerometer (detecting acceleration), a gyroscope (detecting orientation), a magnetometer or any other combination of suitable sensors.

In some embodiments of the present invention, the gesture sensors of the wearable device may comprise an IMU such as a gyroscope and an accelerometer for detecting movement. The gesture sensors of the wearable device may comprise electrodes for sensing electrical signals of the user indicative of movement.

In some embodiments of the present invention, the system may include a gesture identification unit connected to the one or plurality of gesture sensors for identifying gestures of the user. The gesture identification unit (and any dedicated movement detection unit such as video analysis unit or depth analysis unit) may comprise a dedicated hardware (e.g., processor) and/or software component. The gesture identification unit may receive sensed gesture data from the gesture sensors and detect if the gesture data is noise or a recognized gesture that corresponds to a particular command or function. The gesture identification unit may communicate with the processor for sending information regarding the detected gesture.

In some embodiments of the present invention, the interface device may include a processor. The processor may be configured to obtain sensed data from the one or a plurality of gesture sensors and sensed data from the one or a plurality of audio sensors. The processor may be configured to recognize a command from sensed gesture and sensed audio signal. For example, the processor may receive a command from the user regarding an inquiry. For example, the user may inquire regarding the time or the weather. In some embodiments of the present invention, the gesture and voice-controlled interface device may have one or a plurality of processors, e.g., a dedicated processor configured to obtain sensed data from the one or a plurality of gesture sensors, and another dedicated processor configured to obtain sensed data from the one or a plurality of audio sensors.

In some embodiments of the present invention, the interface device may be connected to the internet and retrieve information requested by the user. For example, the processor may receive a command from the user to set up a reminder or update a calendar of the user. The interface device may have access to information of the user (e.g., access to contents of a smartphone of the user), such as emails, contact lists and calendars. The interface device may include virtual assistant AI technology.

In some embodiments of the present invention, the interface device may connect to one or a plurality of controlled devices. For example, the interface device may connect to electronic devices of a residence of the user, such as air conditioner, lights, kitchen appliances and Internet of Things (IOT) enabled devices. The interface device may be configured to communicate and/or send an output signal to one or a plurality of controlled devices. The interface device may control the controlled electronic devices. For example, the controller may turn a media screen on and off, change channels and change the volume. The interface device may communicate with climate control devices, such as air conditioners, smart fans and smart heaters. The interface device may communicate with electronic devices that are IoT enabled such as smart speakers, smart kitchen appliances smart house devices, etc. The interface device may receive feedback from controlled electronic devices, such as receiving acknowledgment from an electronic device on the reception of an output of the interface device.

FIG. 1A is a schematic view of a gesture and voice-controlled interface device, in accordance with some embodiments of the present invention. Interface device 100 may include one or a plurality of gesture sensors 104 linked to processor 108, and one or a plurality of audio sensors 114 linked to processor 108. User 101 may utter a sound 112 and make a gesture 102. Processor 108 may obtain sound and gesture signals from the gesture and sound sensors, analyze these signals to determine whether the user has produced these audio and gesture signals for an intended input (e.g., command, data) and if so, generate an output signal to a controlled device 107. Processor 108 may connect to feedback device 110 (e.g., display) for providing feedback to the user.

Figure 1B:
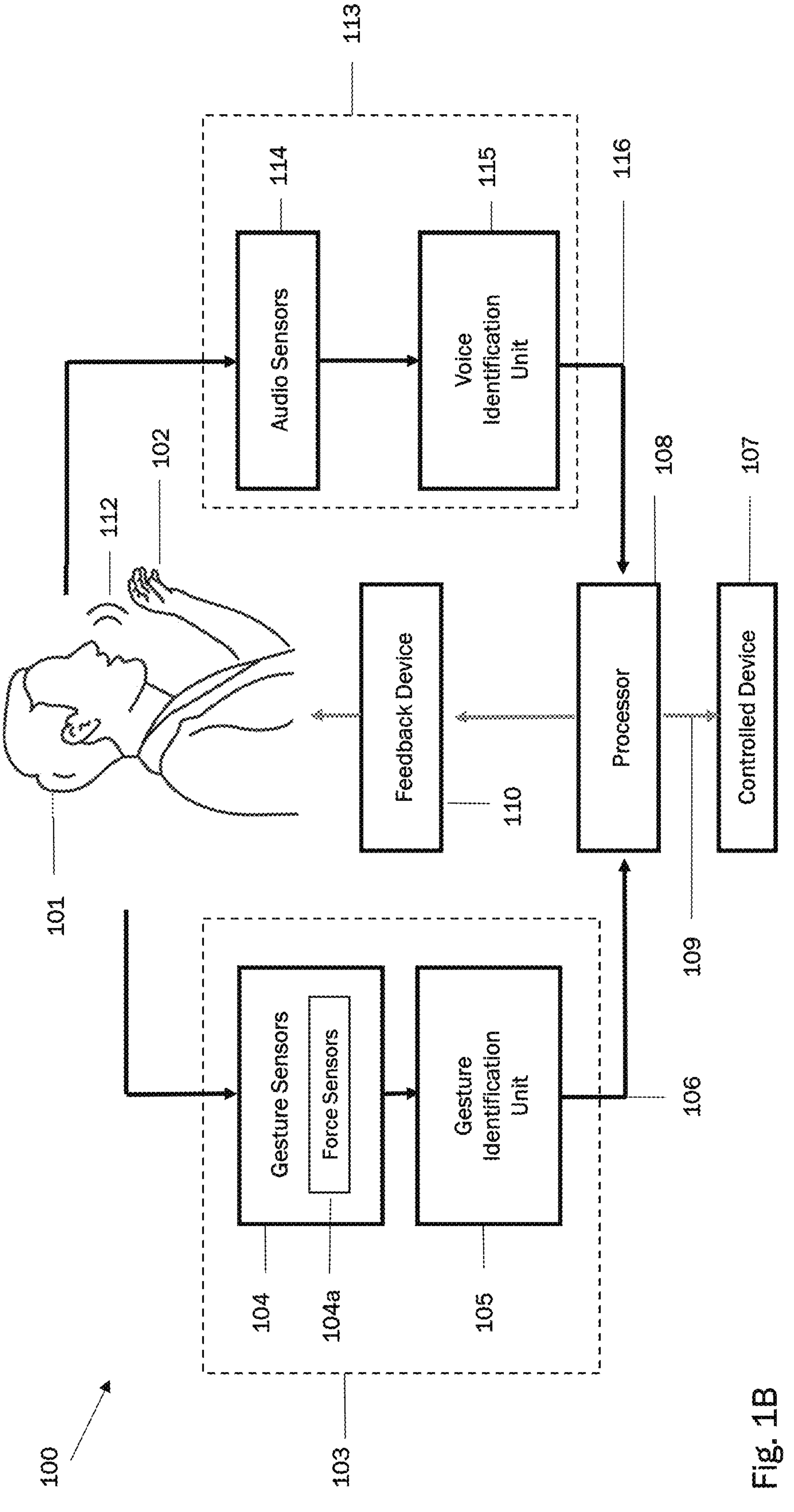
FIG. 1B is a schematic view of a gesture and voice-controlled interface device, including a gesture identification unit and a voice identification unit, in accordance with some embodiments of the present invention.

FIG. 1B is a schematic view of a gesture and voice-controlled interface device for an electronic device, in accordance with some embodiments of the present invention, with separate gesture identification unit 105 and voice identification unit 115. Interface device 100 may include audio unit 113 and gesture unit 103. Audio unit 113 may include one or a plurality of audio sensors 114 configured to sense voice 112 of user 101 by. Voice identification unit 115 may be configured to analyze audio picked up by the one or a plurality of audio sensors 114 to detect the voice of the user. Audio unit 113 may be linked to processor 108.

Interface device 100 may also include a gesture unit 103. Gesture unit 103 may be configured to sense and identify a gesture 102 performed by user 101. Gesture unit 103 may include one or a plurality of gesture sensors 104, e.g., a camera, an imaging device, depth sensor, depth imaging camera, proximity sensor etc. Gesture sensors 104 may include force sensors 104*a* (e.g., biopotential sensors) for sensing force applied by the user (e.g., force applied by fingers of the user). Gesture sensors 104 may be configured to sense gestures of user 101. Gesture identification unit 105 may be connected to gesture sensors 104. Gesture identification unit 105 may obtain sensed data from gesture sensors 104. Gesture identification unit 105 may analyze the sensed data and identify one or a plurality of gestures of the user. For example, the gesture identification unit 105 may be configured to detect a gesture, compare the detected gesture to a set of predetermined gestures, e.g., saved in a repository, and if similarity is determined, identify the sensed gesture as a gesture from the set of predetermined gestures. In another example, gesture identification unit 105 may analyze the sensed gesture and based on that analysis determine whether the sensed gesture is a recognized gesture from the set of predetermined gestures. Gesture unit 103 may be linked to processor 108. Processor 108 may obtain an indication of an identified gesture 106 from gesture unit 103.

In some embodiments of the present invention, processor 108 may send output 109 to a controlled device 107. Processor 108 may connect wirelessly (e.g., WIFI, Bluetooth) or via wiring to controlled device 107 and issue the intended input (e.g., data, command or function) to the controlled device.

In some embodiments of the present invention, interface device 100 may be configured to sense voice and gestures from one or a plurality of users. Interface device 100 may be configured to identify different users and associate sensed audio data and sensed movement data with the different users. For example, interface device 100 may identify distinctive speech features such as pitch and tone of different users, and associate sensed audio with a particular user. Interface device 100 may be used to obtain inputs from different users.

In some embodiments of the present invention, Interface device 100 may include feedback device 110 connected to processor 108 for providing feedback to the user. For example, the feedback device may include a display configured to provide visual feedback to the user.

Figure 1D:
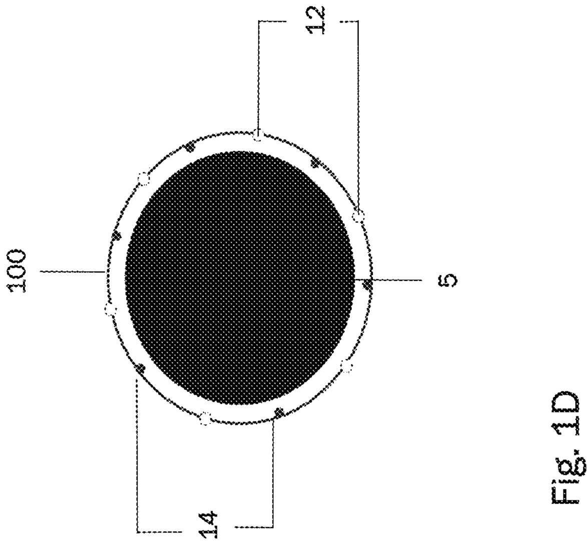
FIG. 1D is a lateral view of the gesture and voice-controlled interface device of FIG. 1C on a wrist of a user.
Figure 1C:
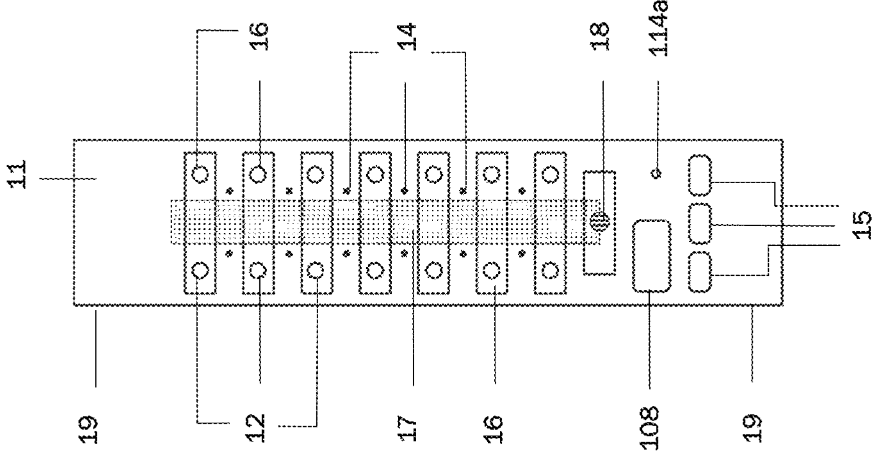
FIG. 1C is an isometric view of a gesture and voice-controlled interface device, in accordance with some embodiments of the present invention.
Figure 1C:
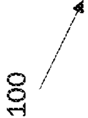

FIG. 1C is an isometric view of a gesture and voice-controlled interface device, in accordance with some embodiments of the present invention. FIG. 1D is a lateral view of the gesture and voice-controlled interface device of FIG. 1C on a wrist of a user. Interface device 100 may comprise elastic band 11 that can be wrapped around wrist 5 of the user by connecting edges 19 of interface device 100. Interface device 100 may sense gestures of the user with biopotential sensors 12 having biopotential electrodes 16, and with motion sensor 15 (e.g., inertial measurement unit). The biopotential sensors may be connected to reference driver 18 through connective strip 17 (e.g., for providing a reference voltage to biopotential sensors 16). Microphone 114*a* may sense sound uttered by the user. Processor 108 may obtain sensed gestures and sound of the user. Interface device 100 may have feedback devices such as haptic actuators 14 for providing vibration as feedback to the user. In some embodiments of the present invention interface device 100 may fully or partially wrap the wrist of the user (e.g., interface device 100 may not fully wrap around the wrist of the user). In some embodiments of the present invention, the interface device may be configured to be worn by the user. The interface device may be configured to be strapped to a hand of the user. The interface device may be configured to be strapped to a wrist of the user. The interface device may be configured to be a strap of a wristwatch.

In some embodiments of the present invention, interface device 100 may include one or a plurality of gesture sensors such as biopotential sensors 12 for sensing gestures of a user. interface device 100 may include one or a plurality of audio sensors such as microphone 114*a* for sensing sounds (and voices) made by the user. Interface device 100 may include a processor 108 configured to obtain one or a plurality of sensed gestures from said one or a plurality of gesture sensors and to obtain one or a plurality of sensed sounds from said one or a plurality of audio sensors. Processor 108 may be configured to analyze the sensed gesture and sensed sounds to identify an input from the user, and to generate an output signal corresponding to the input to a controlled device.

In some embodiments of the present invention, processor 108 may be configured to identify the input only if said one or a plurality of sensed gestures and said one or a plurality of sensed sounds were sensed within a predetermined period of time. The one or a plurality of sensed gestures may be sensed before said one or a plurality of sensed sounds. The one or a plurality of sensed gestures may be sensed after said one or a plurality of sensed sounds. The one or a plurality of sensed gestures may be concurrently sensed with said one or a plurality of sensed sounds.

In some embodiments of the present invention, the one or a plurality of gesture sensors (e.g., sensors 12) for sensing gestures of a user are configured to sense one or more parameters of the group of parameters consisting of: displacement of the user, displacement of a limb of the user, displacement of a finger of the user, values of biopotentials from nerves or muscle of a limb or finger of the user, and eye movement of the user.

In some embodiments of the present invention, the one or a plurality of gesture sensors may comprise one or more sensors selected from the group of sensors consisting of: reflectometer sensor, biopotential sensor, electro-myography (EMG) sensor, surface nerve conductance (SNC) sensor, electro-oculogram (EOG) sensor, pressure sensor, inertial measurement unit (IMU) sensor, optical sensor and imaging sensor.

Figure 2:
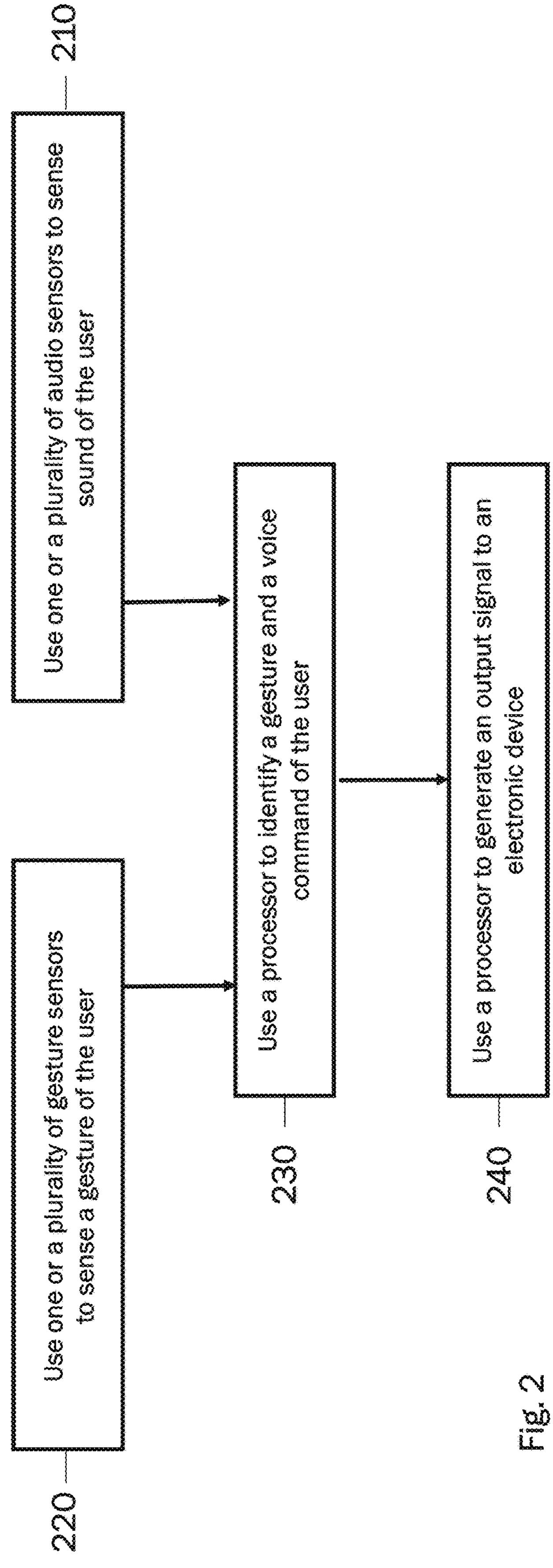
FIG. 2 is a flowchart of a method for gesture and voice-controlled interfacing with an electronic device, in accordance with some embodiments of the present invention.

FIG. 2 is a flowchart of a method for combined gesture and voice control of electronic devices, in accordance with some embodiments of the present invention. The method may comprise using one or a plurality of audio sensors to sense a sound of the user 210.

In some embodiments of the present invention, the method for combined gesture and voice control of an electronic device may comprise, using one or a plurality of gesture sensors to sense a gesture of the user 220.

In some embodiments of the present invention, the method for combined gesture and voice control of electronic devices, may comprise, using a processor to identify a gesture and a voice command from the user 230 by analyzing the sensed gesture and sound. In some embodiments of the present invention, the method may comprise sensing the sound of the user concurrently with or separately from sensing the gesture of the user. The method may comprise associating the sensed sound and gesture with an input, e.g., a query, command, function or data for inputting to an electronic device.

In some embodiments of the present invention, the method may also include generating an output signal to a controlled electronic device 240. The method may include controlling the controlled device according to the input from the user that was determined from the analyzed user sound and gesture. The method may comprise associating an input of the user with a query, command, function, data for the controlled device. For example, a user may use a gesture and voice-controlled input device according to some embodiments of the invention to inquire and obtain from a controlled air conditioner data regarding temperature settings of the air conditioner. The user may also use the gesture and voice-controlled input device to adjust the temperature settings of the air conditioner. The user may also use the gesture and voice-controlled input device to set a climate control plan to be activated at a later time on the air conditioner.

In some embodiments of the present invention the processor may verify based on comparing one or a plurality of sensed gestures or voices of a specific person to a signature (e.g., gesture signature, voice signature, personal profile signature) of said specific person, that the gesture or voice were performed by said specific person. A signature of a person (or a user) may be derived from obtaining samples and data of the user such as gestures, sound and images of the user. The processor may generate database related to data obtained from the user and calculate (e.g., using neural network program, artificial intelligence and such) a signature of the user. For example, the processor may be configured to map gesture samples from users into a metric space such that same gestures are mapped close to each other into regions, and the samples of gestures of different users are mapped at a distance from each other. Samples of a specific user performing a specific gesture may be mapped inside the mapping region of the specific gesture into a smaller region with a center and radius-perimeter-excluding all other users, who will be mapped outside the perimeter such that it may be possible to attribute a gesture to a specific user by mapping his gesture sample into that space, and verifying whether it falls within that perimeter of the samples of that user for that gesture. Similarly, the processor may be configured to map sound samples from users into a metric space such that same sounds are mapped close to each other into regions, and the samples of sounds of different users are mapped at a distance from each other. Sound samples of a specific user may be mapped inside the mapping region of the specific sound into a smaller region with a center and radius-perimeter-excluding all other users, who will be mapped outside the perimeter such that it may be possible to attribute a sound to a specific user by mapping his sound sample into that space, and verifying whether it falls within that perimeter of the samples of that user for that sound.

The processor may identify the specific person using gestures and voice of said specific person. The processor may allow or deny the user from interfacing with a digital device or a function of the digital device. For example, the interface device may be configured to allow a user (such as an owner of the vehicle) to interface with the vehicle, and to prevent other users from interfacing with the vehicle. The interface device may allow a group of users to interface with digital devices and prevent another group of users from using said digital devices. For example, the interface device may identify that the user is from a group of allowed users (by comparing the gestures of the user to the signature of the user) and allow said user to operate the digital device (such as accessing specific content on the digital device or operating specific functions of the digital device). The interface device may allow different levels of access to different groups of users.

In some embodiments of the present invention, the processor may be configured to identify a specific person based on comparing said one or a plurality of sensed sounds to a voice signature of the specific person. The processor may be configured to verify, based on comparing said one or a plurality of sensed gestures, to a gesture signature of the specific person that the one or a plurality sensed gestures were performed by the specific person. The processor may be configured to generate an output signal corresponding to the input to the controlled device only if it was verified that the one or a plurality of sensed gestures were performed by the specific person.

Figure 3:
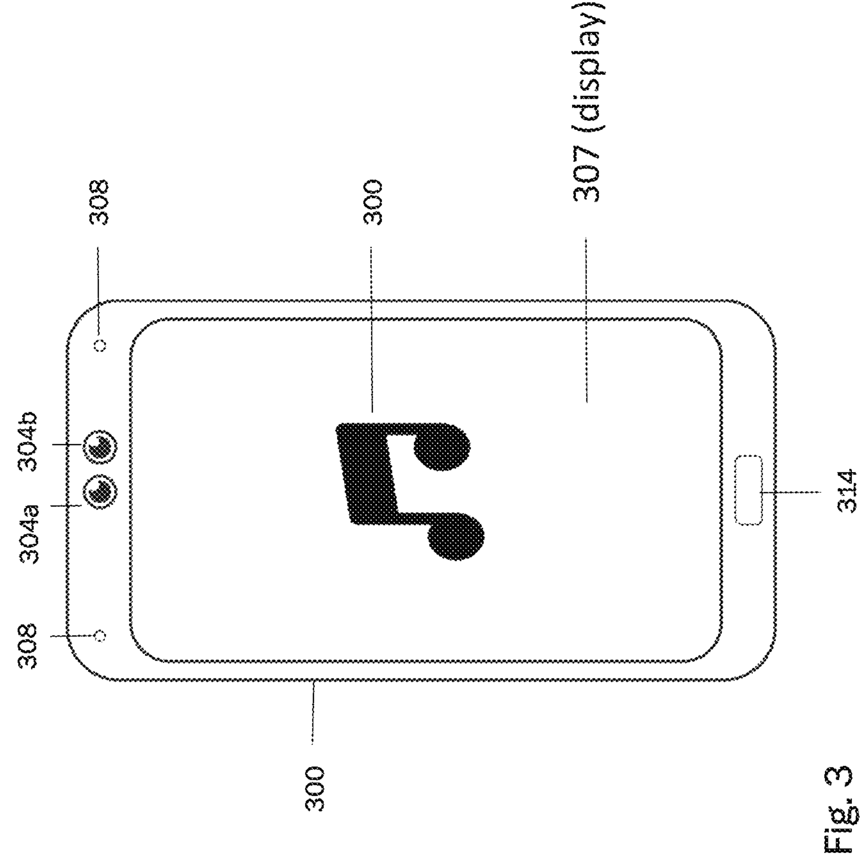
FIG. 3 is a schematic view of a smartphone configured to act as a gesture and voice-controlled interface device for electronic devices, in accordance with some embodiments of the present invention.

FIG. 3 is an illustration of a smartphone 300 configured to serve as a device for combined gesture and voice-controlled interface device, in accordance with some embodiments of the present invention. Interface device 300 may include camera 304*a*. Camera 304*a* may be used for capturing video of a user. The captured video may be analyzed to detect and identify a gesture of the user. Interface device 300 may include a plurality of cameras (304*a*, 304*b*).

In some embodiments of the present invention, interface device 300 may include a microphone 314 for sensing voice signal of the user. Interface device 300 may include display 307. Interface device 300 may be configured to provide visual feedback to the user via display 307. Interface device 300 may also have one or a plurality of speakers 308 for providing audio feedback to the user.

In some embodiments of the present invention, interface device 300 may include hardware and or software components for detecting gestures and voice of the user. Interface device 300 may include a processor for analyzing the sensed voice and gestures of the user.

In some embodiments of the present invention an interface device (such as interface device 100 of FIG. 1A-D) may be coupled to (e.g., Bluetooth, wireless connection, wired connection) or combined with an electronic device such as a smartphone or a smart watch. Some of the functions related to obtaining and identifying gestures, obtaining and analyzing voice, and obtaining output signals to a controlled device may be performed by the electronic device.

Figure 4:
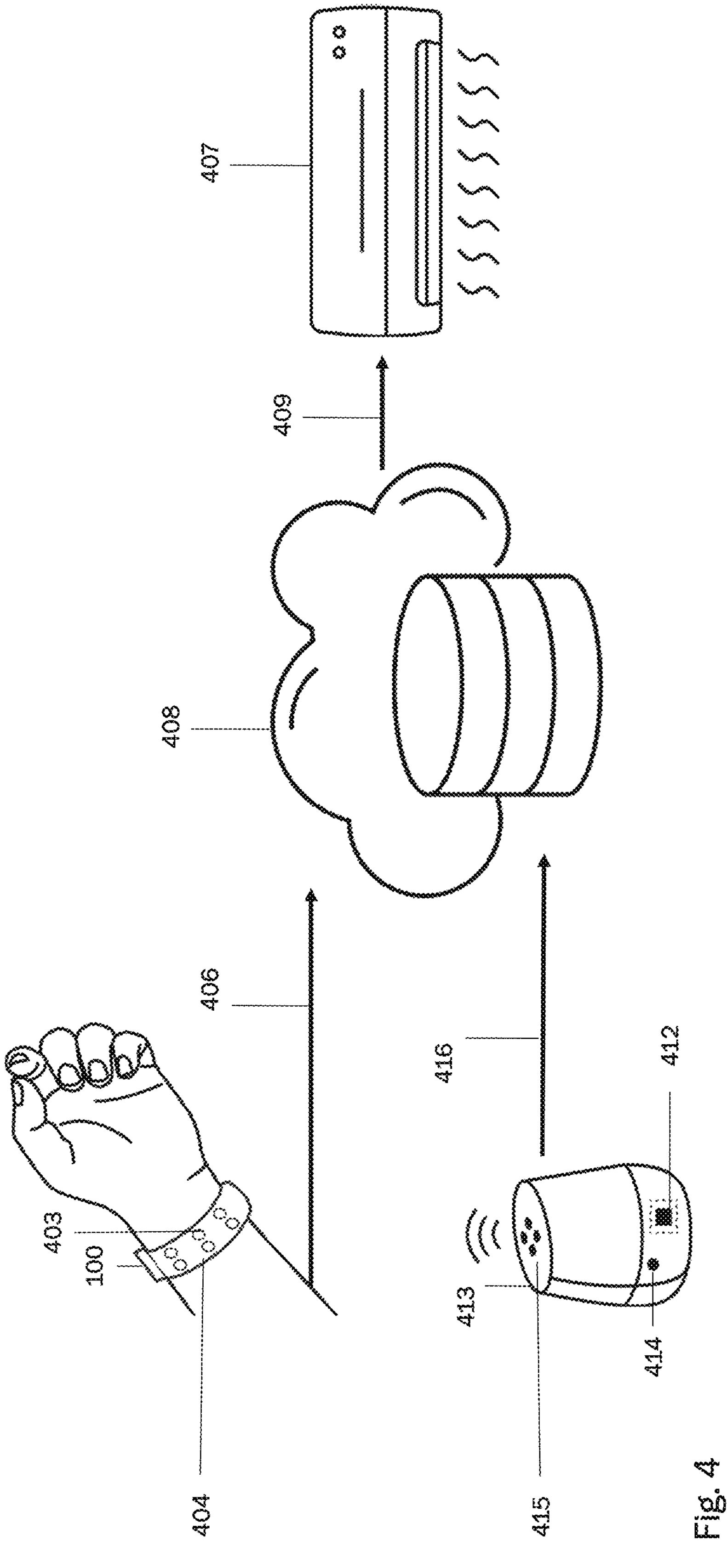
FIG. 4 is a schematic view of a gesture and voice-controlled interface device, and a controlled device, in accordance with some embodiments of the present invention.

FIG. 4 is an illustration of a distributed combined gesture and voice-controlled interface device for electronic devices, and a controlled device, in accordance with some embodiments of the present invention. Interface device 100 may have band 404 that comprises electrodes and sensors 403 for sensing hand gestures of a user wearing the wearable device. Interface device 100 may detect movement of the hand and fingers of the user, may detect how strong a user is pressing their fingers together-generally referred hereinafter as a gesture or gestures of the user. Interface device 100 may send sensed data and/or gesture identification data 406 to cloud 408 (e.g., wireless network). Cloud 408 may include one or a plurality of servers, remote computers, cloud services and other remote computing systems. Cloud 408 may have computation capabilities for receiving input from a user that is generated based on a sensed gesture of the user.

In some embodiments of the present invention, interface device 100 may be linked to a smart speaker 413. Smart speaker 413 may include a microphone 414 for obtaining sensed audio data of the user, and a speaker 415 for producing sound (e.g., feedback to the user). Smart speaker 413 may include a voice identification unit 412. The voice identification unit 412 may be a dedicated hardware component (e.g., audio processor), and/or a software component. Speaker 413 may be configured to send obtained sensed audio data 416 or user voice data to cloud 408.

In some embodiments of the present invention, cloud 408 may analyze (e.g., using a processor or processors on remote one or more servers) gesture and voice of the user. Cloud 408 may be configured to receive input from the user based on the sensed gesture and voice. Cloud 408 may be connected to a controlled device 407 (e.g., an air conditioner). Cloud 408 may send output 409 to controlled devices 407 according to input determined from the user gesture and voice. Cloud 408 may communicate with controlled device 407. Cloud 408 may connect to one or a plurality of controlled devices 407.

Figure 5:
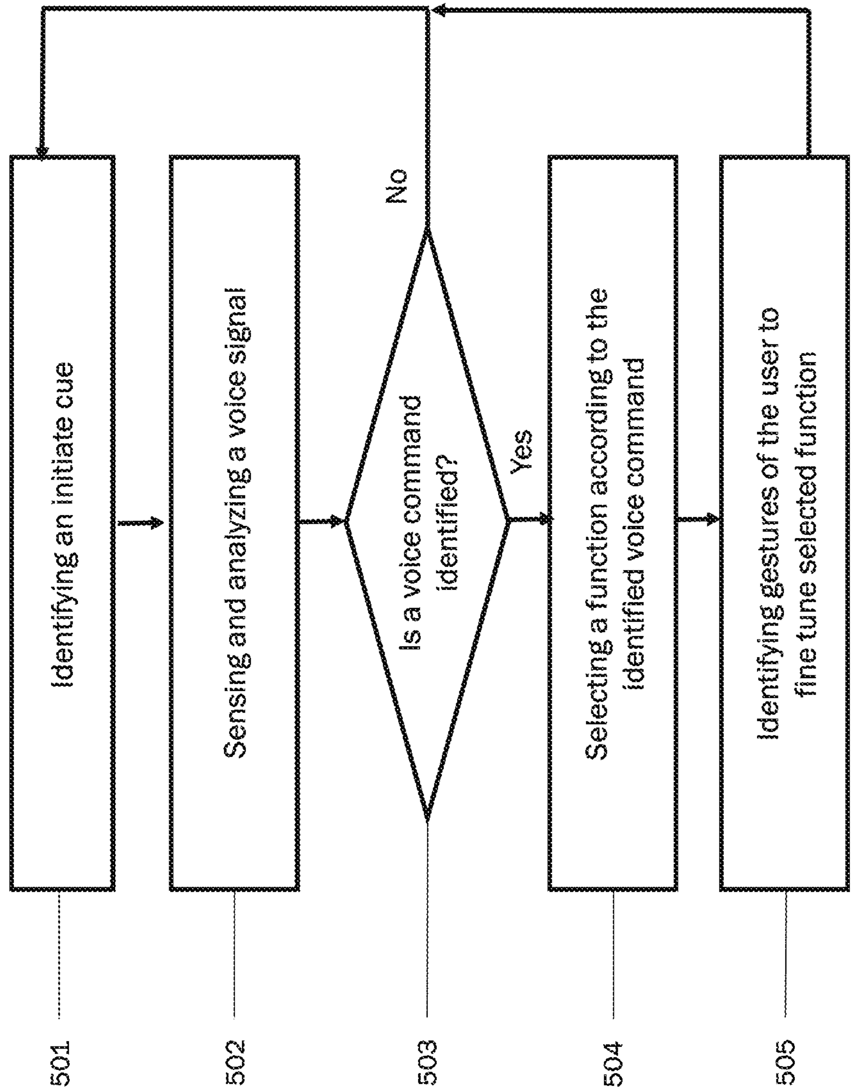
FIG. 5 is a flowchart of a method for gesture and voice-controlled interface device for electronic devices, including detecting a user performing an initiating cue, in accordance with some embodiments of the present invention.
Figure 5:
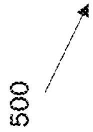

FIG. 5 is a flowchart of a method for gesture and voice control of an electronic device, wherein the user performs an initiating cue, in accordance with some embodiments of the present invention. Method 500 may comprise identifying an initiating cue 501, by a gesture and voice-controlled interface device for an electronic device. An initiating cue such as a power-on gesture may be designed to power up a controlled electronic device that the user wishes to interact with. Method 500, according to some embodiments of the present invention, include identifying an initiating cue 501 performed by a user. The interface device may be configured to identify one or a plurality of gestures, voice commands, distance from a sensor, position of the user, force applied by the user (e.g., on their fingers) and/or a cue generated by the interface device as initiating cues. The initiating cue may be distinct from other cues and gestures. For example, an up and down movement of a hand of the user may signify a cue and it may also likely be a random movement. An initiating cue may be a gesture that a user is not likely to perform, such as a combination of unique gestures. For example, an initiating cue may include pressing the index finger against the thumb, together with moving the hand across. In another example, the user may gesture a pinch with both of their hands and move their hands apart to perform an initiating cue.

In some embodiments of the present invention, the interface device may continuously monitor the movement of the user in anticipation for an initiating cue. There may be one or a plurality of initiating cues associated with one or a plurality of functions. For example, a gesture of pressing the middle of the index finger with a thumb (e.g., mimicking a thumb press on a remote control) may indicate to the interface device that the user is gesturing an initiating cue with an intent to control a certain electronic device, e.g., a media screen. In another example, a gesture of closing and opening the first twice may indicate to the interface device that the user is performing a different initiating cue, aimed at controlling room lights. Once the interface device identifies an initiating cue the interface device may anticipate a command from the user associated with that initiating cue.

In some embodiments of the present invention, method 500 may include sensing a voice signal 502. The voice signal may be analyzed to identify a voice command from the user. The interface device may check if a voice command is identified 503. For example, the user may perform an initiating cue and also utter a command to control an electronic device. The interface device may wait until the interface device senses a voice signal from the user.

In some embodiments of the present invention the interface device may have a predetermined period of time for waiting until a voice command from the user is identified. For example, the interface device may have a timer that counts elapsed time from the instance the interface device identifies an initiating cue (e.g., 10 seconds). If a voice command is not identified (e.g., after a period of time has passed from the initiating cue), the interface device idles until a new initiating cue is identified 501. For example, a user may perform an initiating cue but fail to provide a voice command. In another example, the interface device may erroneously identify a movement of the user as an initiating cue. When the interface device does not identify a voice command after an initiating cue is identified, the interface device be idle until the user performs a new initiating cue.

The interface device may be configured to pick up a voice command uttered by a user (e.g., during and/or after performing an initiating cue). In some embodiments of the present invention, method 500 may comprise selecting a function according to the identified voice command 504. For example, the user may wish to select a function of the air conditioner such as adjusting the temperature settings. The user may utter a voice command, such as, "change temperature". The interface device may identify the voice command and select the temperature settings of the air conditioner function.

In some embodiments of the present invention, the interface device may generate an output signal to the controlled electronic device (e.g., Air conditioner) for selecting the function (e.g., temperature settings function). The interface device may remain idle until the interface device obtains from the user, parameters of the selected function, before communicating with the controlled electronic device. For example, the interface device may wait for the user to communicate what temperature they wish the air conditioner to have and send an output to the air conditioner for adjusting the temperature according to the user's command. The interface device may select a function for one or a plurality of controlled devices. For example, the interface device may select (e.g., according to a command from the user) to turn on the lights in multiple rooms. For another example, the interface device may select to adjust the temperature settings of multiple air conditioners concurrently (e.g., according to selected air conditioners of the user).

In some embodiments of the present invention, method 500 may comprise identifying a gesture of the user to fine tune the selected function 505. After the selection of a function (e.g., using a voice command to select a function), the user may perform a gesture to adjust parameters of the function and fine tune the selected function. The interface device may identify the gesture of the user and control the electronic device (e.g., operate the selected function of the electronic device), according to the gesture of the user. For example, if the user selected the Air conditioner's temperature setting function, the user may lift their hand or lower it to indicate that they wish to increase or decrease the temperature settings respectively.

In some embodiments of the present invention, the interface device may identify a gesture of the user, for adjusting the selected function, and send an output signal to the controlled electronic device. The interface device may send an output to the controlled electronic device once the gesture is concluded (e.g., the interface device may change the temperature of the air conditioner until the user stops their hand movement). In some embodiments, the interface device may continue to adjust the controlled function of the electronic device during the gesture of the user, until the conclusion of the gesture. For example, the interface device may lower the temperature setting concurrently with the movement of the user's hand.

In some embodiments of the present invention, method 500 may comprise idling until a new initiating cue is identified (e.g., returning to step 501), for example after an output signal is generated for the controlled electronic device or once step 505 is concluded.

Figure 6:
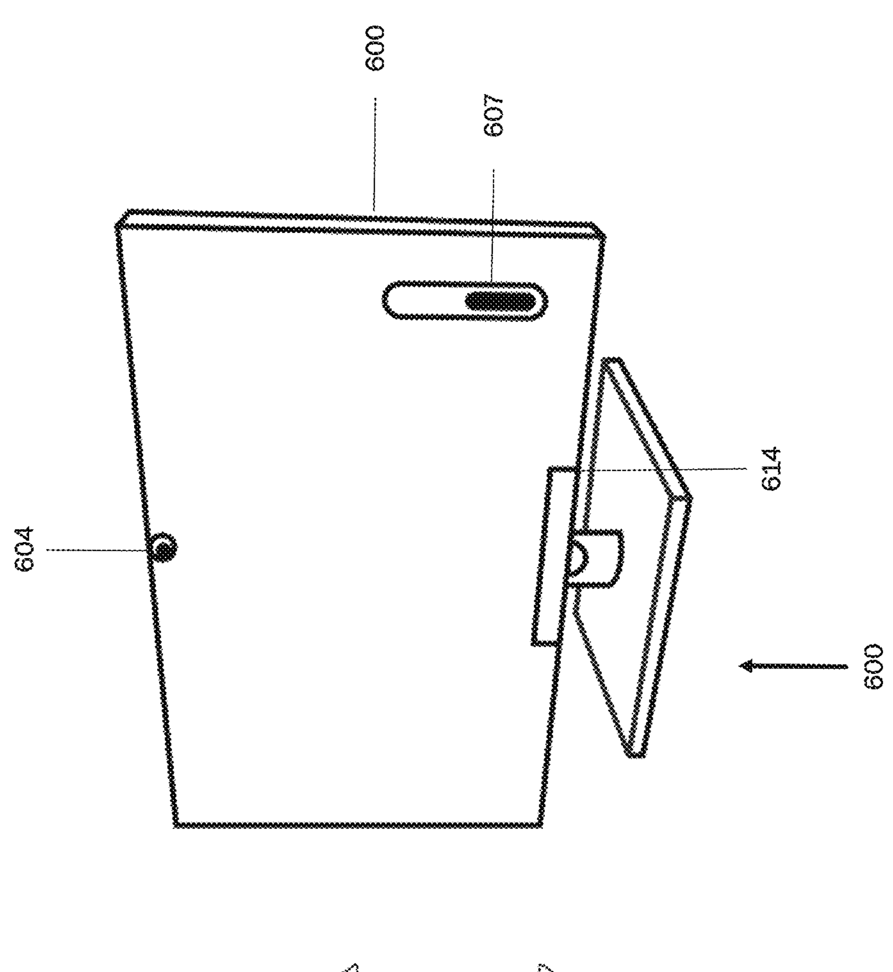
FIG. 6 is a schematic view of a user using a combination of gesture and voice to adjust the sound volume of a media screen, in accordance with some embodiments of the present invention.
Figure 6:
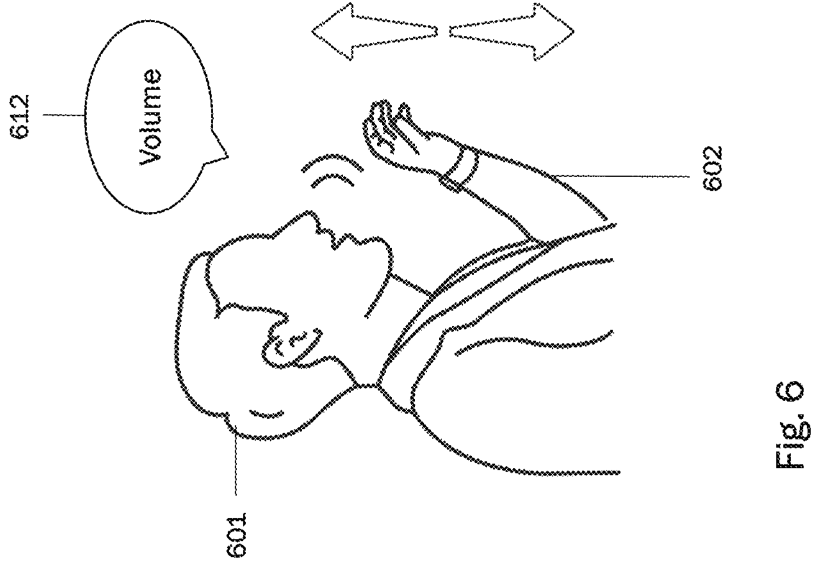

FIG. 6 is a schematic view of a user using a combination of gesture and voice to adjust the sound volume of a media screen, in accordance with some embodiments of the present invention. A gesture and voice-controlled interface device 600 for electronic devices may sense gesture and voice commands from the user for controlling the media screen. User 601 may perform an initiating cue. Camera 604 may obtain video footage of the user. The interface device 600 may identify the initiating cue performed by the user. Once the interface device 600 has identified the initiating cue, the interface device may wait for a period of time until the interface device 600 identifies a voice command from the user. The user may also use a voice command 612 to select a function of the media screen 600 (e.g., change channel, adjust volume, change brightness, etc.). The interface device 600 may identify the voice command of the user using microphone 614. The interface device 600 may identify the voice command of the user and control the media screen to select the adjust volume function 607. The interface device may wait for a period of time, until the interface device 600 identifies a gesture from the user, to adjust the selected function (E.g., to change parameters of the selected function, such as lower and/or increase the volume of the media screen). The interface device 600 may generate an output signal to adjust the volume of the media screen. For example, the user may raise their hand to affect an increase in the volume level. The user may lower their hand to affect lowering of the volume level. After concluding the control of the electronic device (e.g., Media screen), the interface device may remain idle until a new initiating cue is identified.

Figure 7:
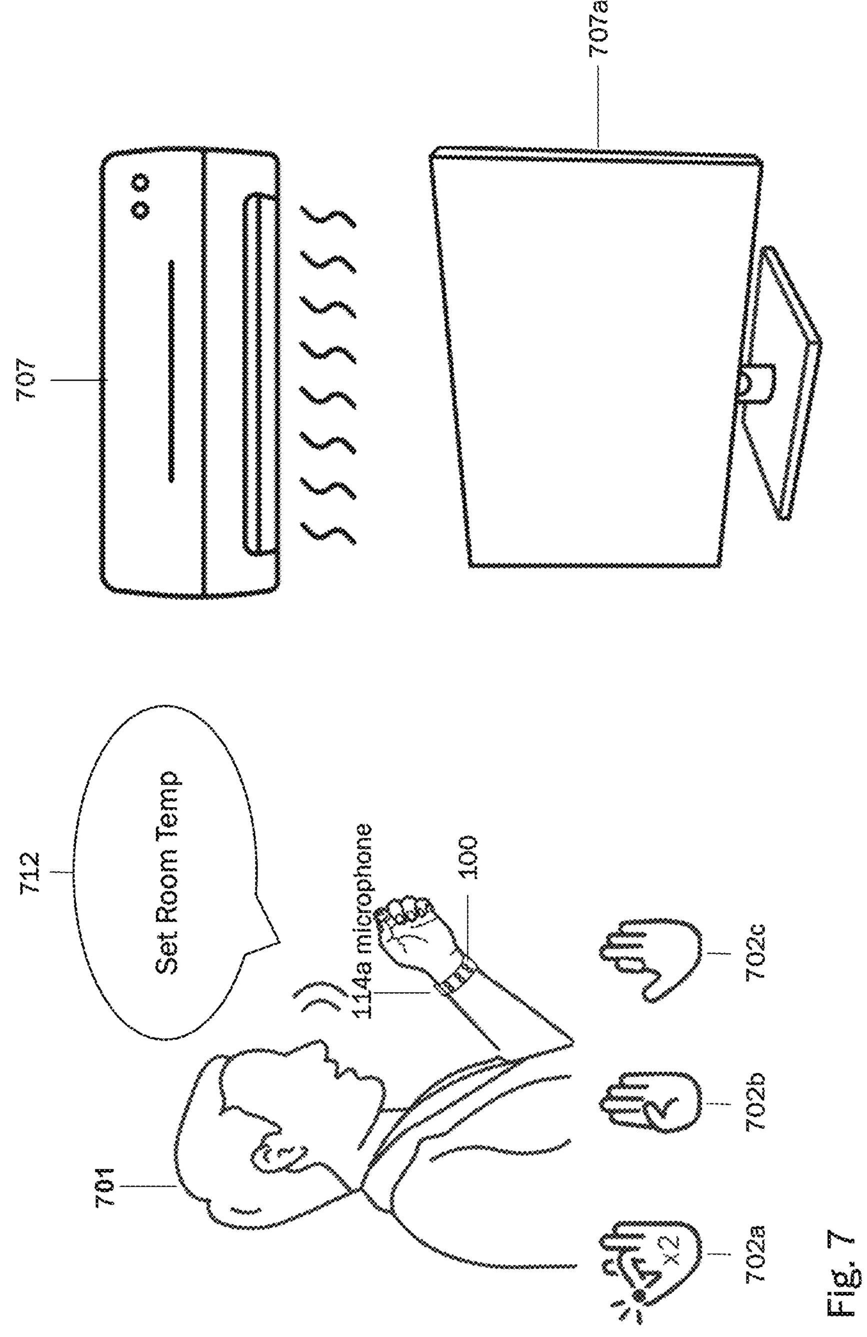
FIG. 7 is a schematic view of a user using a combination of gesture and voice to adjust the temperature of an air conditioner, in accordance with some embodiments of the present invention.

FIG. 7 is a schematic view of a user using a combination of gesture and voice to adjust the temperature of an air conditioner, in accordance with some embodiments of the present invention. User 701 may wish to control air conditioner 707. A gesture and voice-controlled interface device, according to some embodiments of the invention may sense gesture and voice signals of the user 701 for controlling air conditioner 707. User 701 may wear interface device 100 that comprises microphone **114*a* and a band 404. Band 404 may comprise gesture sensors 403. User 701 may perform an initiating cue by pressing and holding their index finger against their thumb as in 702*a*, to wake up the interface device. The interface device 100** may sense and detect an initiating cue and wait for a voice command of the user to follow.

In some embodiments of the invention, interface device 100 may be configured to sense and identify the voice and/or voice commands of the user 701, if the user 701 releases pressure of this fingers (e.g., if the user disconnects their index finger from their thumb, and/or if the user relaxes the pressure of their pressed fingers). Interface device 100 may also wait for a new initiating cue from the user. Interface device 100 may be configured to sense and detect voice commands and/or gestures of the user as long as the user is maintaining an initiating cue, or within a predetermined period of time thereafter. In some embodiments there will be no time limit, and any time after the initiating cue was performed a voice command may be received and acted upon.

While the user 701 presses their fingers together the user may utter a voice signal, e.g., a verbal command, for example, "select the air conditioner" and "set room temp" to select the air conditioner 707 and to select the temperature function of the air conditioner 707 (respectively). Interface device 100 may identify the voice command "set room temp" of the user and may select the air conditioner closest to the user (e.g., an air conditioner in a room where the user is standing). Interface device 100 may select air conditioner 707 as the controlled device and select a function from at least one controlled device functions available. For example, interface device 100 may have one or a plurality of controlled devices and functions available such as air conditioner 707 (and functions of air conditioner 707) and media screen 707A (and respective functions of media screen 707A). Interface device 100 may generate an output to air conditioner 707 for controlling air conditioner 707 and select the temperature setting function of air conditioner 707.

After selecting the air conditioner temperature setting function, the user may flex their thumb once 702*b* to raise the temperature by one degree. The user may flex their index finger 702*c* to affect a reduction of the temperature by one degree. The user may perform one or a plurality of gestures for increasing or decreasing the temperature. For example, interface device 100 may detect and identify gestures for increasing or decreasing the temperature setting by one degree (e.g., by a gesture involving moving the thumb 702*b*) and/or by five degrees (e.g., a gesture involving moving the pointing finger 702*c*). Once a desired temperature is reached, the user may perform a finish gesture, e.g., by tapping their fingers 702*a*, indicating to interface device 100 that the user has concluded their desired control command. Interface device 100 may also release control of the electronic device (e.g., release control of the air conditioner 707), and remain idle until a new initiating cue is sensed and detected.

Figure 8:
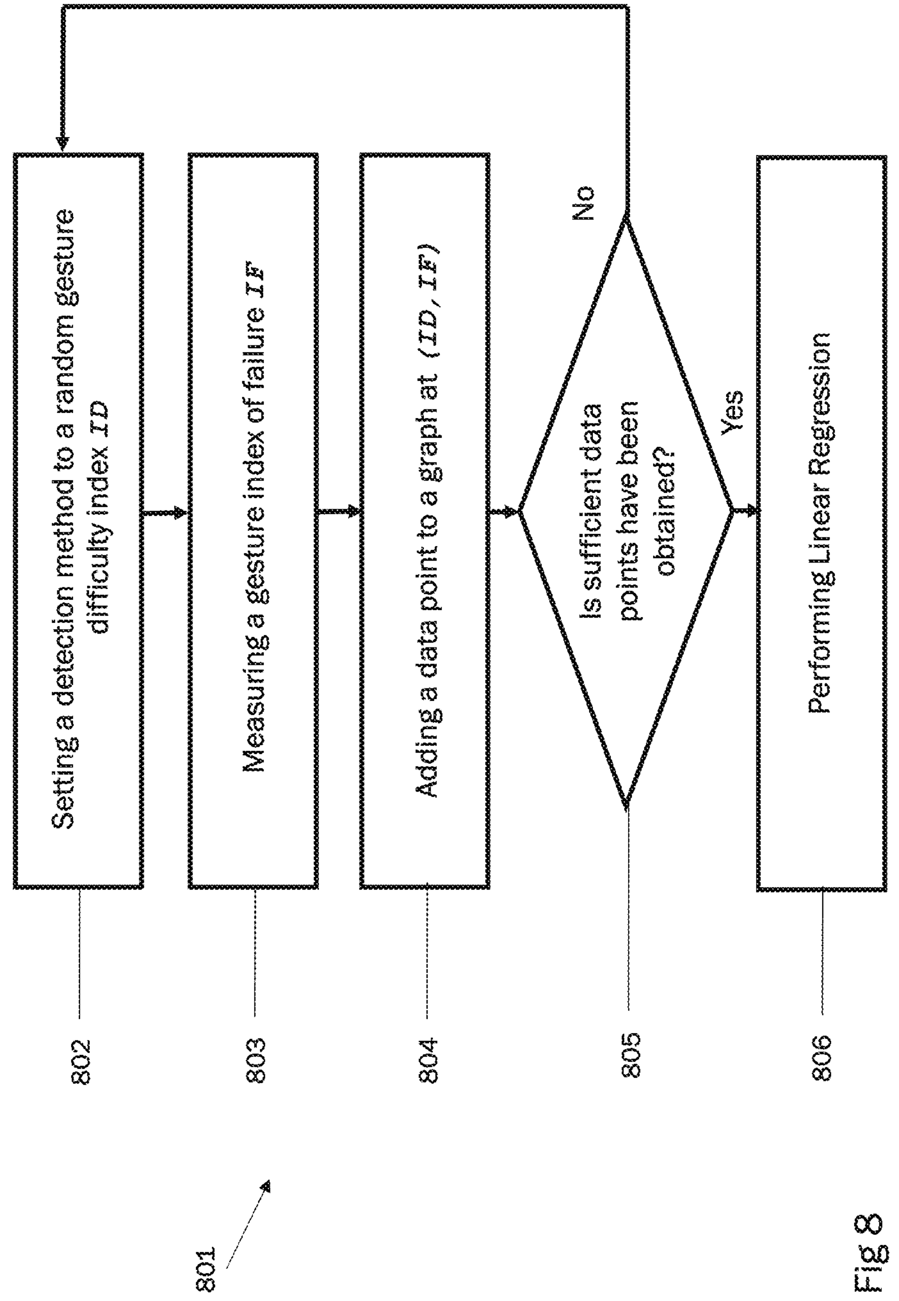
FIG. 8 is a flowchart of a method for assessing quality criteria of gestures used for interfacing with an electronic device, in accordance with some embodiments of the present invention.

FIG. 8 is a flowchart of a method for measuring and modeling human gestures, in accordance with some embodiments of the present invention. Fitts law may be used for modelling human-computer interactions. Fitts law may be used to evaluate pointing devices in a setting where a user employs a pointing device such as a computer mouse to move a cursor on a computer screen along a distance to select a target. A target with a random width W may be drawn on a screen at a random distance D from the cursor. The target may have an index of difficulty ID calculated according to the formula:

$$ID = \log_2\left(\frac{2D}{W}\right) \tag{1}$$

Time t may be measured as the time it takes a user to move the cursor to the target and select it. Multiple iterations of moving the cursor to the target may be made to get multiple measurements of the time it takes for the user to move the cursor to the selected target. Linear regression may be applied on the measurements to find line parameters a and b describing a relationship between estimated time MT and index of difficulty ID:

$$MT = a + b \times ID \tag{2}$$

FIG. 8 shows a flowchart of method 801 for assessing quality criteria of gestures used for interfacing with an electronic device, according to some embodiments of the present invention. Method 801 may be used for modelling a plurality of gestures. Modelled gestures may include static gestures where the user may for example hold their hand in a fist, and/or dynamic gestures where the user may for example press their fingers together while moving their hand along a line. The method may evaluate gestural interfaces for systems, devices, and methods in which a substantially linear relationship exists between a gesture Index of Failure (IF) and a gesture Index of Difficulty (ID). The relationship between the index of failure and the index of difficulty may be estimated using linear regression applied to the measurements of the index of failure of gestures having a variable index of difficulty.

In some embodiments of the present invention, method 801 may comprise, setting a detection method to a random gesture difficulty index ID 802. Gesture index of difficulty ID may be set to a random level by setting variations of gesture duration d and required confidence c according to:

$$ID = d \times c \tag{3}$$

Equation (3) above may describe a relationship between ID and parameters associated with ID such as duration d and required confidence level c. ID may be a product of multiplication between the duration and the required confidence level. A gesture may be more difficult for a user to perform as the duration of the gesture increases. For example, a gesture of holding the hand of the user up over a long period of time may be more difficult to perform than performing the same gesture over a shorter period of time. A gesture may be more difficult for a user as the required confidence level of the gesture increases. For example, if the required confidence level for a gesture is higher, a margin of error by the user may be smaller, the interface device may not identify a gesture due to small differences between a required gesture and a movement actually performed by the user. The required confidence level c may be described by dividing a constant k by a sensitivity level s:

$$c = \frac{k}{s} \tag{4}$$

In some embodiments of the present invention, the method may comprise, measuring, for a performed gesture, a gesture index of failure IF 803. Repeated measurements of the index of failure may be made by repeatedly performing the gesture. For each gesture performed, false negative (fail to detect a gesture) and true positive (correctly detecting a gesture) are counted together. Additionally, when performing other actions that are not the gesture, the index of failure IF may be calculated from the counted false positives (falsely detecting random movements as gestures) and true negatives. The more difficult a gesture is to a user, the more failed attempts may be expected to be counted, with more false negative detection and less successful attempts (true positive detections). It may also be expected that the more difficult a gesture is, the less false positives and more true negatives will be counted. The index of failure may have a relationship with false negative detections FN, false positive detections FP, true positive detections TP and true negative detections TN as follows:

$$IF \propto FN, FP, \frac{1}{TN}, \frac{1}{TP} \tag{5}$$

In some embodiments of the present invention, method 801 may comprise, adding a data point to a graph at (ID, IF) 804. When a data point of (ID, IF) is obtained, the data point may be added to a data structure for storage and/or display, such as a graph, array, table and other data structures suitable for data storage and/or display. The data point or plurality of data points of (ID, IF) may describe a relationship between IF and ID. A graph comprised of data points of (ID, IF) may describe a relationship between IF and ID at coordinates x=ID, y=IF.

In some embodiments of the present invention, method 801 may comprise checking if sufficient data points have been obtained 805. If the datapoints are not sufficient (e.g., the relationship between IF and ID is not clear according to a metric), steps 802-804 may be repeated multiple times. When steps 802-804 are repeated the data represented in the graph (and other data structures) may present a clearer relationship between ID and IF. For example, when more data points are acquired, a signal to noise ratio is increased. In some embodiments of the present invention a Monte-Carlo style sampling may be applied to decide how many times steps 802-804 should be repeated to meet a threshold of relationship quality between ID and IF.

In some embodiments of the present invention, the method may further comprise performing linear regression 806 to estimate the relationship between ID and IF. Linear regression may be applied on the measurements to find line parameters a and b describing a relationship between the index of failure IF and index of difficulty ID:

$$IF = a \times ID + b \tag{6}$$

Figure 9:
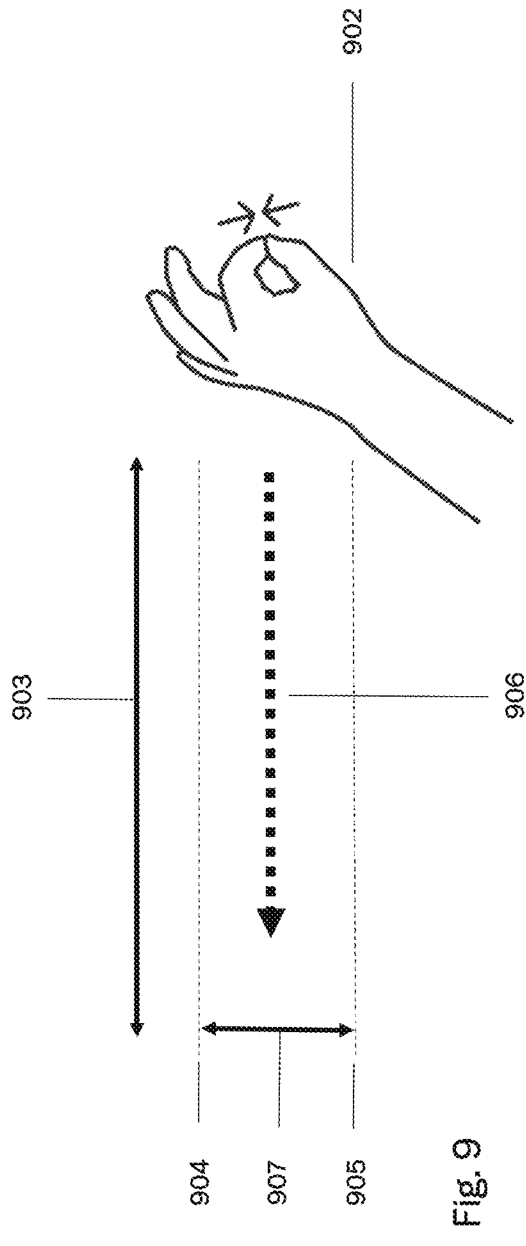
FIG. 9 is a schematic illustration of a continuous hand gesture, showing horizontal and vertical dimensions of the gesture, for consideration when measuring that gesture, in accordance with some embodiments of the present invention.

FIG. 9 is a schematic view of a continuous hand gesture, showing horizontal and vertical dimensions of the gesture, for consideration when measuring that gesture, in accordance with some embodiments of the present invention. A user may perform a continuous gesture. For example, in order to properly identify a gesture, the user may be required to press their index finger against their thumb 902 while moving their hand along arrow 906 for a predetermined distance 903, without crossing border lines 904 and 905. Border lines 904 and 905 may be spaced apart by distance 907. For example, if the user crosses either line 905 or line 904, the gesture may not be registered as a recognized gesture. For another example, if the user does not complete swiping the hand across the entire distance 903, the gesture may not be registered as a recognized gesture. Distance 907 may represent a sensitivity of the gesture detection method. Greater distance 907 is the easier it may be for a user to register a gesture. Additionally, the greater distance 907 is, the easier it may be for random movements to be falsely registered as qualified gestures. The smaller distance 907 is, more concentration may be required from the user to successfully accomplish the task (e.g., the harder it may be for a user to register a gesture). Also, the smaller distance 907 is, the harder it may be for random movements to be falsely registered as qualified gestures.

In some embodiments of the present invention, distance 903 may represent a duration of a gesture. The longer the distance 903 is, the longer the duration the user may need to remain concentrated to avoid crossing line 904 or line 905. The longer the distance 903 is, the harder it may be for a user to register a gesture. Additionally, the longer the distance 903 is, the harder it may be for a random movement to be falsely registered as a gesture. The shorter distance 903 is, the easier it may be for a user to register a gesture. Also, the shorter distance 903 is, the easier it may be for a random movement to be falsely registered as a gesture.

In order to estimate a gesture ID in this example, the required confidence c may be described as a constant k divided by distance 907 denoted as d1:

$$c = \frac{k}{d1} \tag{7}$$

The index of difficulty ID may be expressed as the product of multiplication between the duration that relates here to distance 903 denoted as d2, and the confidence requirement c:

$$ID = d2 \times c \tag{8}$$

The index of difficulty may thus be expressed as a function of distance 903 denoted as d2 and distance 907 denoted as d1 as follows:

$$ID = d2 \times \frac{k}{d1} \tag{9}$$

Figure 10B:
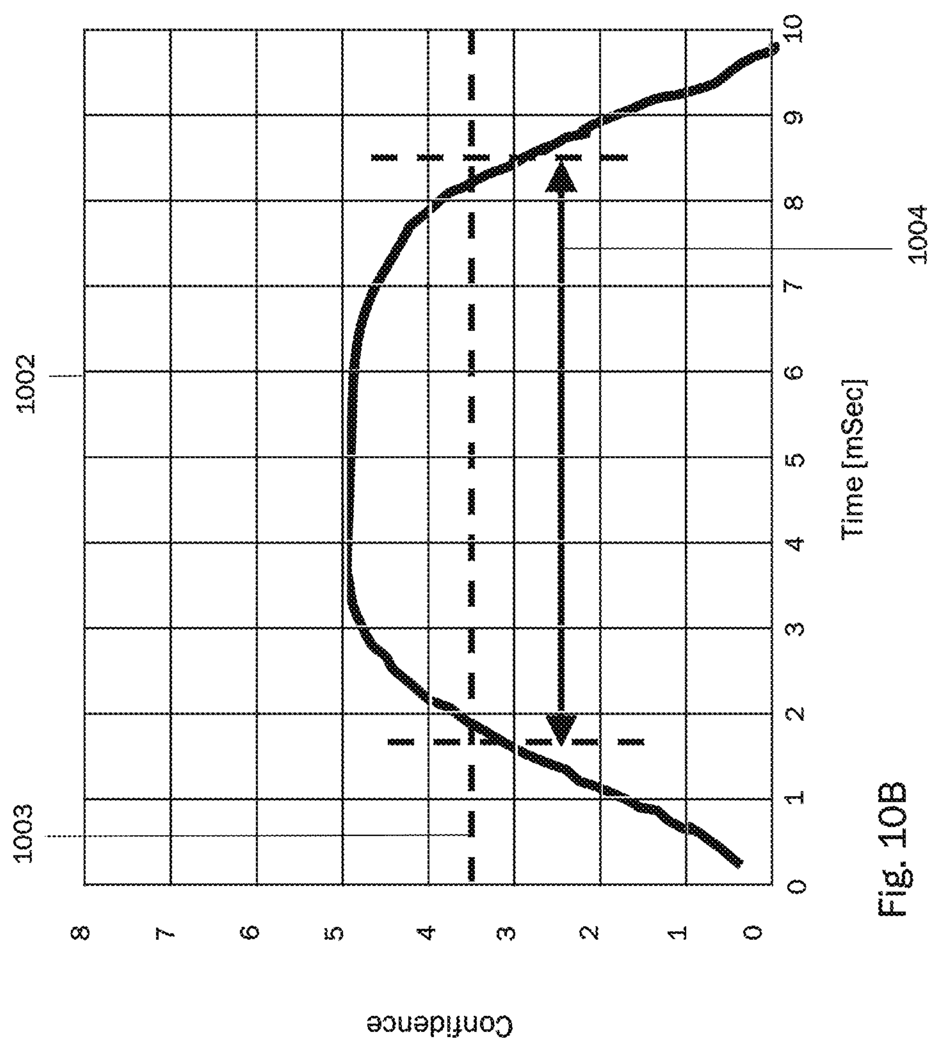
FIG. 10B is a chart illustrating the level of confidence in the identification of a gesture with respect to time.
Figure 10A:
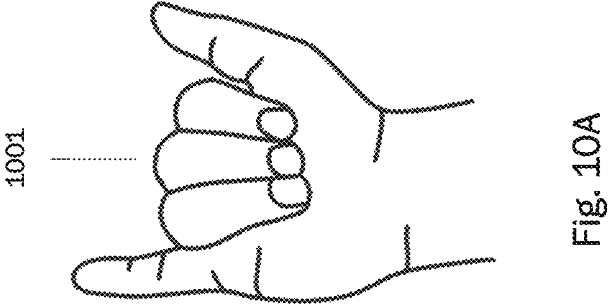
FIG. 10A is a schematic illustration of a discrete hand gesture, in accordance with some embodiments of the present invention.

FIG. 10A is a schematic view of a discrete hand gesture, in accordance with some embodiments of the present invention. FIG. 10B is a chart illustrating the level of confidence in the identification of a gesture with respect to time. In some embodiments of the present invention, a user may make a discrete gesture 1001. For example, the user may hold their hand up with their thumb and little finger extended and their other fingers flexed. Graph 1002 may show an example of a level of confidence (of correctly identifying the gesture, e.g., the level of confidence may be a value calculated by an algorithm for detecting gestures) over time, relating to a certain gesture (e.g., gesture 1001). A gesture may be registered (identified) once the level of confidence is greater than a confidence threshold 1003 for a certain duration of time. The time duration required of the confidence level to remain above confidence threshold 1003 for the gesture to be registered, may be longer than a minimal duration above time threshold 1004.

In some embodiments of the present invention, the longer the time threshold 1004 is, the harder it may be for a user to register a gesture. Additionally, the longer the time threshold 1004 is, the harder it may be for a random movement to be falsely registered as a gesture. The shorter time threshold 1004 is, the easier it may be for a user to register a gesture. Additionally, the shorter time threshold 1004 is, the easier it may be for a random movement to be falsely registered as a gesture.

In some embodiments of the present invention, the higher the confidence threshold 1003 is, the harder it may be for a user to register a gesture. Additionally, the higher the confidence threshold 1003 is, the harder it may be for a random movement to be falsely registered as a gesture. The lower the confidence threshold 1003 is, the easier it may be for a user to register a gesture. Also, the lower confidence threshold 1003 is, the easier it may be for a random movement to be falsely registered as a gesture.

In order to estimate a gesture Index of difficulty ID in this example, ID may be expressed as the product of multiplication between the duration that relates here to the time threshold 1004 denoted as d, and the confidence requirement c that relates here to the confidence threshold 1003:

$$ID = d \times c \tag{10}$$

Figure 11:
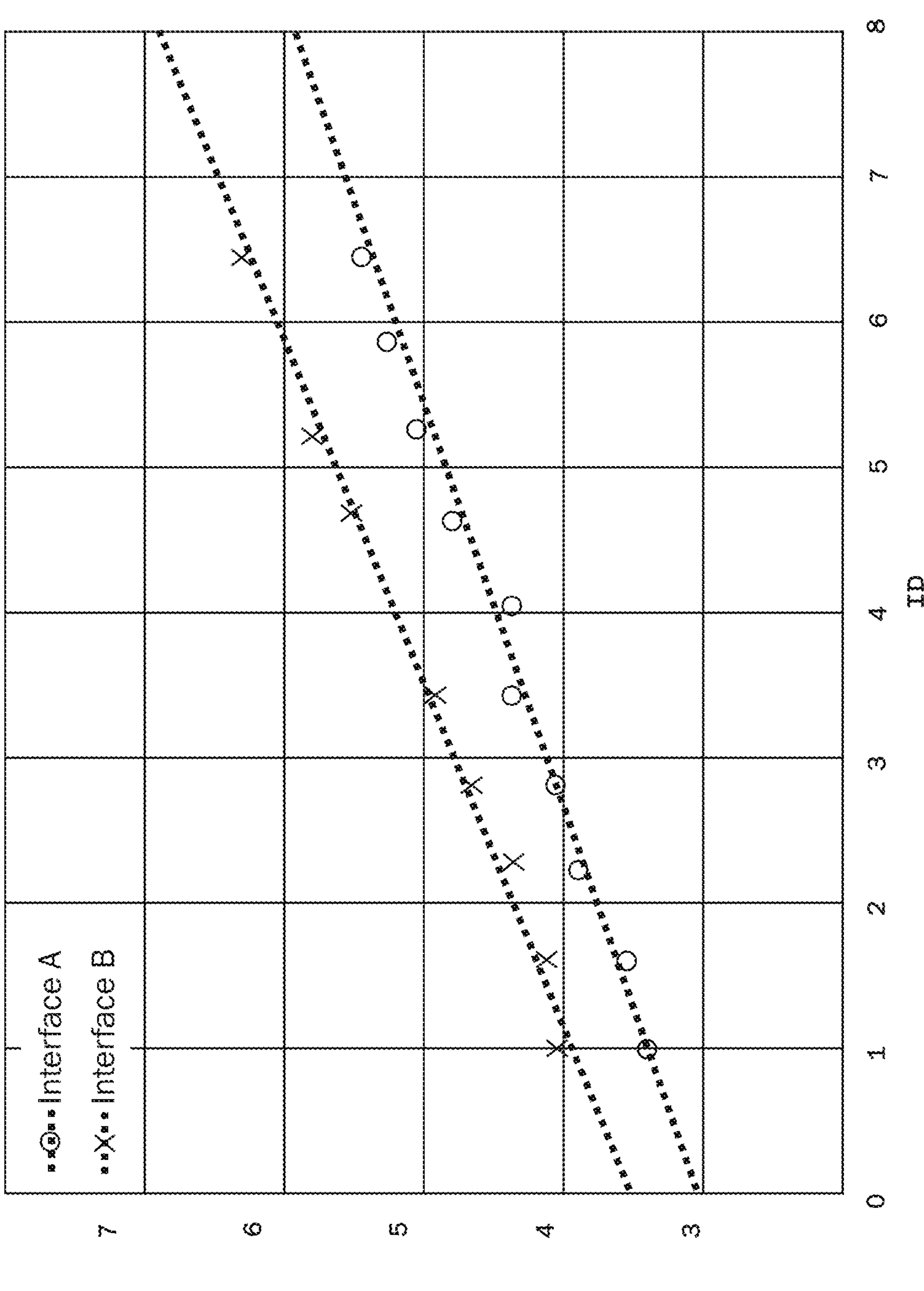
FIG. 11 is a graph demonstrating and comparing two interfaces, the graph showing a relationship between an index of difficulty (ID) and an index of failure (IF) for each of the two interfaces, in accordance with some embodiments of the present invention.

FIG. 11 is a graph demonstrating a comparison of two interfaces, showing a relationship between an index of difficulty (ID) and an index of failure (IF) for each of the two interfaces, in accordance with some embodiments of the present invention. Data points of (ID, IF) for interface A and interface B may be gathered and presented in a graph. The relationship between the index of failure and the index of difficulty for each interface may be estimated using linear regression applied to the measurements of (ID, IF). Properties of interface A and interface B may be derived from the graph. For example, it may be possible to determine whether interface B is more user friendly than interface A, according to the graph. It may be possible to determine the user friendliness property of an interface according to the inclination of the (ID, IF) relation of the interface. The inclination of an (ID, IF) relationship can be extrapolated by performing a linear regression on the (ID, IF) data points of an interface. The linear regression on the (ID, IF) data points may yield the relationship between ID and IF:

$$IF = a \times ID + b \tag{11}$$

The extrapolated parameter a may represent an inclination of the relationship that may be associated with user friendliness of the interface. For example, if a is larger, the interface may be said to be less user friendly and if a is smaller, the interface may be said to be more user friendly.

Figure 12:
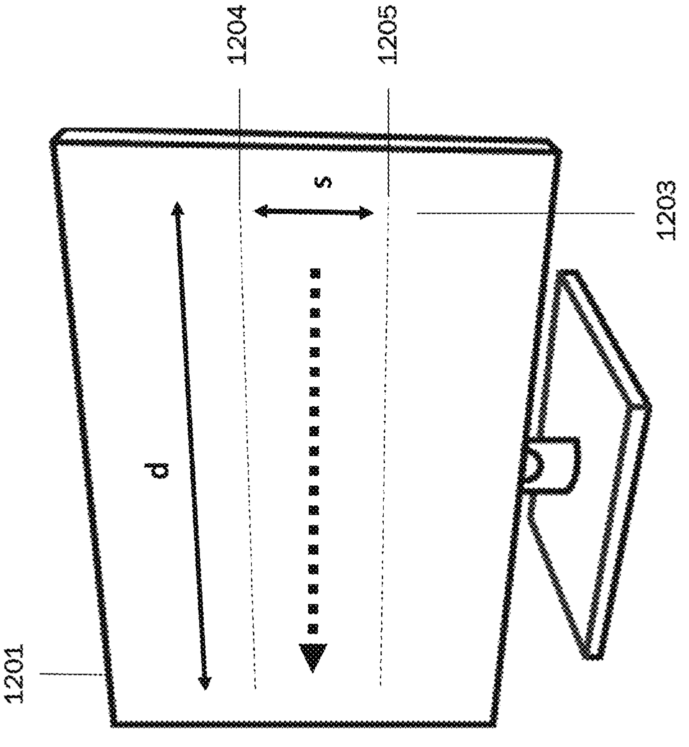
FIG. 12 is a schematic illustration of a continuous gesture performed by a user following an example of a gesture displayed on a display, in accordance with some embodiments of the present invention.
Figure 12:
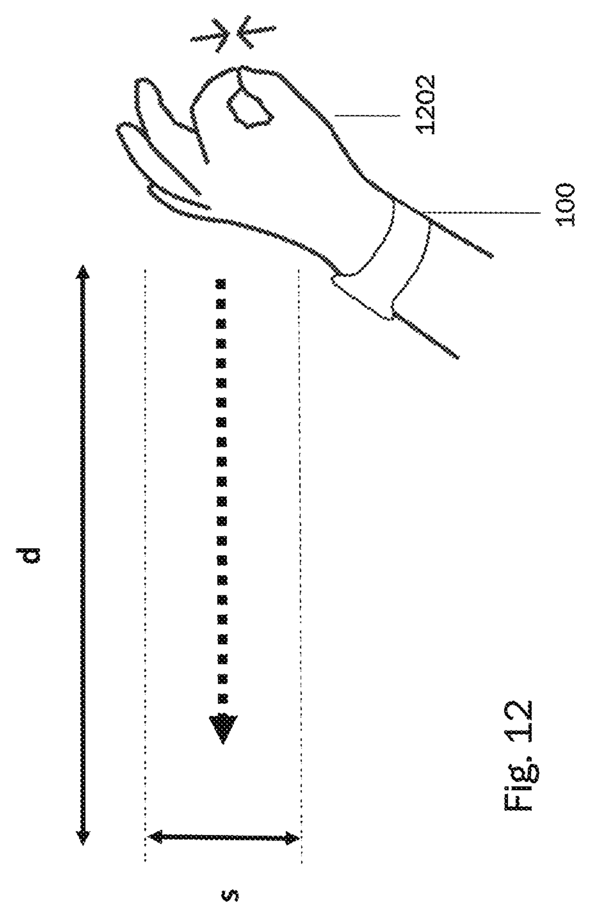

FIG. 12 is a schematic view of a continuous gesture performed by a user following a displayed example of that gesture on a display, in accordance with some embodiments of the present invention. The user may wear interface device 100 on their wrist and perform gesture 1202 following instructions displayed on display 1201. The interface device may evaluate the index of difficulty (ID) and an index of failure (IF) of gesture 1202. The interface device may provide visual feedback to the user for indicating if the user is performing gesture 1202 according to instructions 1203. For example, the interface device may provide feedback if the user is performing gesture 1202 within allowed border limits 1204 and 1205.

Figure 13:
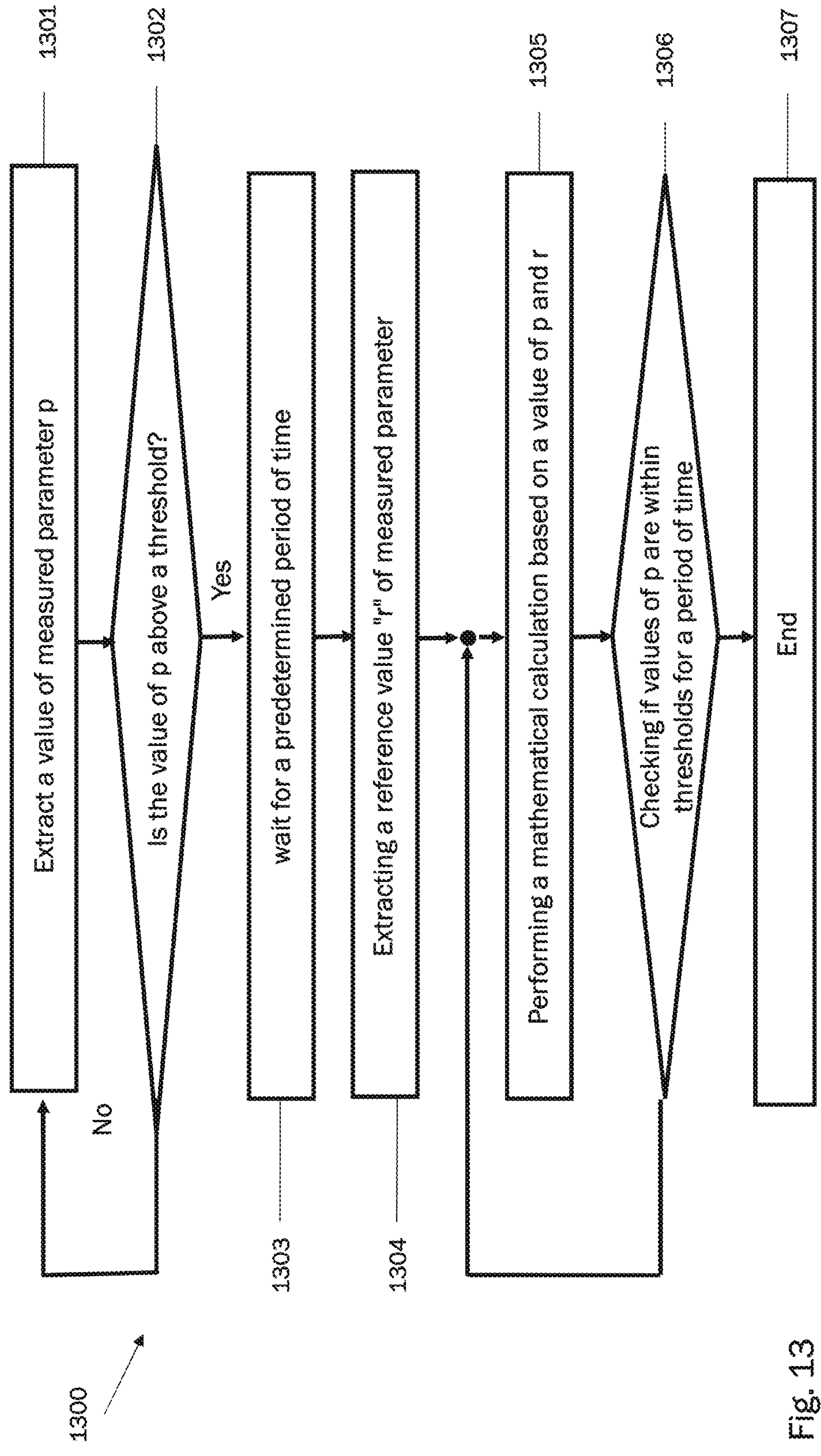
FIG. 13 is a flowchart of a method for detecting a continuous adjustment gesture using an interface device, by measuring force applied by a user, in accordance with some embodiments of the present invention.

FIG. 13 is a flowchart of method 1300 for detecting a continuous adjustment gesture using an interface device, by measuring force applied by a user, in accordance with some embodiments of the present invention.

A continuous adjustment gesture such as a pinch-to-zoom gesture, may refer to a continuous gesture that a user performs in order to adjust a parameter of an electronic device. For example, the user may elevate or lower their hand, increase or decrease distance between their fingers, increase or decrease pressure applied between their fingers and perform similar continuous gestures to adjust a parameter of an electronic device (e.g., increase or decrease volume, increase or decrease temperature, zoom in or out, etc.).

A pinch-to-zoom gesture may be a gesture in which a user pinches two fingers (e.g., that a user performs to command increasing and/or decreasing a value of a function of an electronic device). In a pinch-to-zoom gesture the user may move their index finger closer to and/or away from their thumb in a pinching manner. For example, a user using a touch screen displaying an image, may put their thumb and index finger on an image displayed on a touch screen and move their fingers away or closer in order to increase or decrease, respectively, a size of the image (zooming in or zooming out). The user may put their thumb and index finger on the image, at a first distance (also referred to as reference distance). The user may slide these fingers over the touch screen to increase the distance between their thumb and index finger, thereby zooming into the image. The user may decrease the distance between their thumb and index finger by sliding these fingers over the touch screen closer to each other to zoom out. The image may be made bigger or smaller by calculating a ratio between the initial distance between the thumb and index finger of the user and the final distance between the thumb and index finger of the user when the gesture is completed.

It may be difficult to detect a continuous adjustment gesture in space (e.g., the user performs a continuous adjustment gesture in the air, and not while touching a touch screen). For example, when performing a pinch-to-zoom gesture, a reference distance between fingers of the user and a final distance between fingers of the user may be easily obtained on a touch screen, but it may be required to identify an intended reference distance and an intended final distance between fingers of the user when said gesture is performed in space.

According to some embodiments of the invention, continuous adjustment gestures may be used for a variety of commands and applications, where the user may desire to increase or decrease a value. For example, the user may use a continuous adjustment gesture as a command to increase or decrease volume level of a speaker (such as in a media screen or smart speaker). In another example, the user may use a continuous adjustment gesture as a command to increase or decrease temperature setting of an air conditioner.

In some embodiments of the present invention a gesture and voice-controlled interface device may be used to detect a continuous adjustment gesture performed by the user. The interface device may continuously monitor the user for detecting a continuous adjustment gesture. The interface device may sense gestures (e.g., using video feed obtained by a camera, using biopotential sensors, etc.) and/or sensed voice signal of the user (e.g., sensing audio using a microphone).

In some embodiments of the present invention, method 1300 may comprise extracting a value of a measured parameter, e.g., distance between the fingers, force applied between the fingers etc., 1301 from one or a plurality of sensed gestures performed by the user. In some embodiments of the present invention, method 1300 may comprise identifying an initiating cue such as checking if the value of the measured parameter is above threshold 1302. The user may perform movements and gestures. The interface device may obtain movement data of the user. For example, the interface device may comprise a camera and/or a wearable device (e.g., a smartwatch) comprising a plurality of biopotential sensors. The interface device may extract a value of force or other measured parameter (e.g., distance between fingers) as a function of time. The extracted value of the measured parameter may represent a force the user is applying between their index finger and thumb. The extracted value of measured parameter may relate to the distance between the index finger and the thumb of the user. For example, when a user moves their thumb and index finger apart, the measured parameter may be the changing distance between the fingers as recorded by a camera, the force applied between fingers, the measured force applied by the user's muscles to move the fingers away or towards each other, measured by bio-potential sensors.

In some embodiments of the present invention, the interface device may continuously obtain measurements of the measured parameter. For example, the interface device may check if the user is pressing their thumb and index finger together hard enough (e.g., applying a force over a predetermined threshold, thereby meeting a first condition). The user may press their thumb and index finger together hard enough to indicate to the interface device that the user wishes to perform a continuous adjustment gesture.

If the initiating cue was not detected, for example, the extracted value of the measured parameter is not above a threshold, the interface device may go back to sensing gestures and extracting a value of force 1301. If the initiating cue is identified, for example, the extracted value of measured parameter is above a threshold, the interface device may wait for a predetermined period of time 1303 (e.g., a first period of time, denoted as dt, such as milli-seconds). For example, the first period of time may span a few milli-seconds to a few seconds. The user may move the index finger and thumb during the first period of time, so that, for example, a tip of the index finger and a tip of the thumb are at an initial distance (e.g., reference distance) from each other. The interface device may use an extracted value of measured parameter indicative of the reference distance between the index finger and thumb of the user for determining later on parameters of the continuous adjustment gesture (e.g., an extent of zoom in or zoom out). In some embodiments of the present invention, the interface device may extract a reference value “r” of measured parameter 1304. After a first period of time has elapsed, the interface device may extract a reference value of force, corresponding to the reference distance between the index finger and thumb of the user or pressure applied between fingers of the user or a distance measured by the camera.

In some embodiments of the present invention, the interface device may perform step 1305 by performing mathematical calculations based on a value of force and r. After the interface device performed step 1304 (e.g., extracted a reference value r), the interface device may continuously extract values of force. The interface device may continuously monitor the distance between the index finger and thumb of the user, or extract values of force. The interface device may calculate a ratio between an extracted value of force and r (e.g., for calculating an output signal). The ratio between the extracted value of force and r may determine an output signal of the continuous adjustment gesture. For example, if the ratio is bigger than 1, it may be associated with the user increasing the distance between the index finger and thumb (e.g., for zooming in). If the ratio is smaller than 1, it may be associated with the user decreasing the distance between the index finger and thumb (e.g., for zooming out). The interface device may continuously control an electronic device during the continuous adjustment gesture. For example, the interface device may continuously increase a size of a displayed image, while the user increases the distance between the thumb and index finger (e.g., until the zoom-to-pinch gesture is concluded).

In some embodiments of the present invention, the interface device may extract a second extracted value of force e.g., for performing a mathematical calculation to generate a final output signal. The interface device may extract the second value if extracted values of force are within thresholds for a period of time 1306. If the extracted values of force are between predetermined thresholds for a predetermined period of time, the interface device may end the interaction 1307 (and generate the output signal) or go back to extracting values of force 1305. For example, the user may stabilize their fingers for a predetermined period of time for indicating to the interface device that the user wishes to conclude the continuous adjustment gesture.

In some embodiments of the present invention, the device may provide feedback to the user for indicating the performance and/or completion of one or more actions of method 1300. The device may provide feedback to the user when the extracted value of force is above a threshold, e.g., the device may provide audio and/or visual and/or tactile feedback. The feedback may help the user to properly perform the required gesture, e.g., adjust the distance between the thumb and index finger for setting the reference distance to extract r. The interface device may provide feedback to the user when the interface device extracts the value of r (e.g., step 1304). The interface device may provide feedback to the user when the continuous adjustment gesture is concluded (e.g., step 1307).

Figure 14:
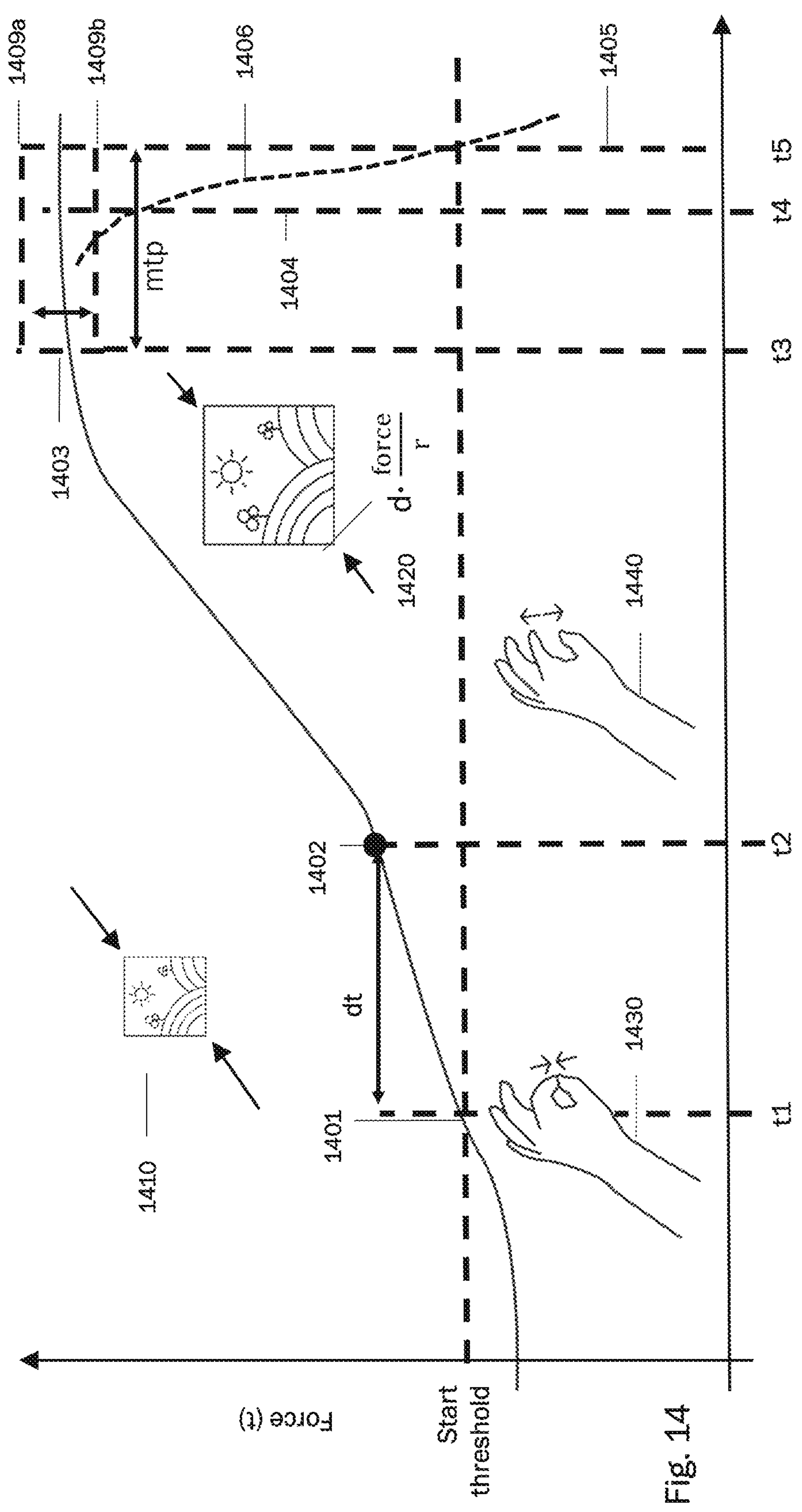
FIG. 14 is a graph showing values of force extracted from sensed pinch-to-zoom (zoom out) gestures of a user as a function of time, in accordance with some embodiments of the present invention.

FIG. 14 is a graph showing extracted values of force obtained from sensed pinch-to-zoom in gestures of a user over time, in accordance with some embodiments of the present invention. A user may perform a continuous adjustment gesture such as a pinch-to-zoom-in gesture to zoom on image 1410.

In some embodiments of the present invention, the interface device may continuously sense gestures of the user. The device may extract values of force. The extracted values of force may relate to how much force is applied by the user between their index finger and thumb. The extracted values of force may increase when the user presses hard the index finger against the thumb and decrease when the user reduces the pressure and/or increases the distance between the index finger and the thumb. It may be appreciated by a person skilled in the art that the user may use other pairs of fingers for performing a continuous adjustment gesture. For example, the user may use the thumb together with the middle finger, or the index finger together with the little finger.

In some embodiments of the present invention, the user may press the thumb against the index finger 1430, to initiate a continuous adjustment gesture. At time t1 the extracted value of force may be equal or above a start-threshold 1401. The device may wait for a first period of time (e.g., dt of some milli seconds), wherein the user may adjust the distance (or applied force) between the index finger and thumb for setting a reference distance. After the first period of time has elapsed (e.g., at t2) 1402, the device may extract a reference value of force r related to the reference distance.

In some embodiments of the present invention, the interface device may sense that the user has reduced the pressure and/or has increased the distance between the index finger and thumb 1440. The displayed portion of the image may increase as a result 1420.

In some embodiments of the present invention, the user may stabilize the index finger and thumb finger over time t3 1403, for indicating to the device that they wish to conclude the pinch-to-zoom gesture. The interface device may check whether the extracted values of force remain for a predetermined duration of time (between t3 1403 and t5 1405), within upper threshold 1409*a* and lower threshold 1409*b* (defining a relative range within which the graph of force (t) may be considered to be flat). The device may detect fluctuations in force (t) and automatically determine whether force (t) remains within limits 1409*a* and 1409*b* according to the detected fluctuations.

In some embodiments of the present invention, the user may discard the continuous adjustment gesture at time t4 1404, to indicate to the device that the pinch-to-zoom gesture is completed. The interface device may determine whether the slope of the extracted values of force (dotted line 1406) is greater than a predetermined sloping value, and/or if the extracted values of force are dropping beyond a predetermined threshold between time t4 (border line 1404) and time t5 (border line 1405).

In some embodiments of the present invention, the processor (such as processor 108 of FIG. 1C) of the interface device may be configured to identify an initiating cue in said one or a plurality of sensed gestures, to extract a first measured gesture value from said one or a plurality of sensed gestures, to extract a second measured gesture value from said one or a plurality of sensed gestures, and to generate the output signal based on the first measured gesture value and the second measured gesture value. The initiating cue may be used to select a function of a controlled device, wherein the first measured gesture value is used to select an initial state of a parameter of the function, and wherein the second measured gesture value is used to select a final state of the parameter of the function. The function is selected from the group of functions consisting of: volume of an audio device, temperature of a climate control device, size of a virtual object, displacement of a virtual object and zooming in or zooming out.

Figure 15:
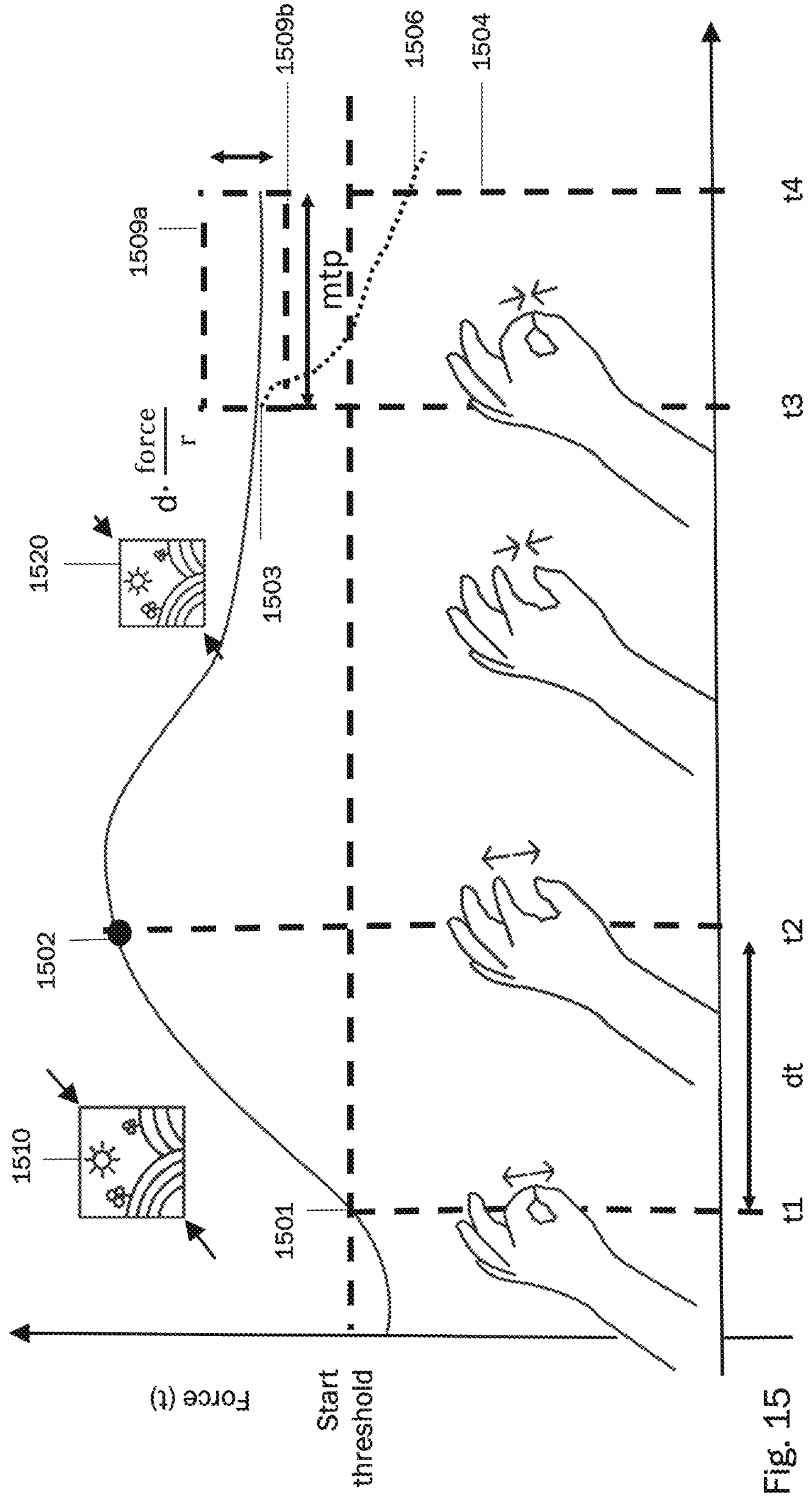
FIG. 15 is a graph showing values of force extracted from sensed pinch-to-zoom (zoom-in) gestures of a user as a function of time, in accordance with some embodiments of the present invention.

FIG. 15 is a graph showing extracted values of force extracted from sensed pinch-to-zoom out gestures of a user as a function of time, in accordance with some embodiments of the present invention. A user may perform a continuous adjustment gesture to decrease the size of the displayed portion of image 1510 (e.g., pinch-to-zoom-out gesture).

In some embodiments of the present invention, the user may press the thumb and index finger together, to indicate to the device an initiation of a continuous adjustment gesture. At time t1 the extracted value of force may be equal or above a start-threshold 1501. The device may wait for a first period of time (e.g., dt milli seconds), wherein the user may adjust the distance between the index finger and thumb finger for setting a reference distance. After the first period of time has passed (e.g., at t2) 1502, the device may extract a reference force value r (related to the reference distance).

In some embodiments of the present invention, the user may decrease the distance between their index finger and thumb. The displayed portion of the image may decrease 1520. The displayed portion of the image may be decreased by shrinking the image so that the diameter d is decreased. The diameter d of the image may decrease by multiplying the diameter by the ratio of an extracted value force to the reference force value r (e.g., the ratio may be smaller than 1 for zooming out).

In some embodiments of the present invention, the user may stabilize the index finger and thumb finger at time t3 1503, for indicating to the device that they wish to end the continuous adjustment gesture. The interface device may determine, for the conclusion of the continuous adjustment gesture, whether the extracted values of force remain flat for a predetermined duration of time (between t3 1503 and t4 1504, and within limits 1509*a* and 1509*b*). The interface device may alternatively or additionally check whether the extracted values of force drop sharply as shown by dotted line 1506 between t3 1503 and t4 1504.

Figure 16:
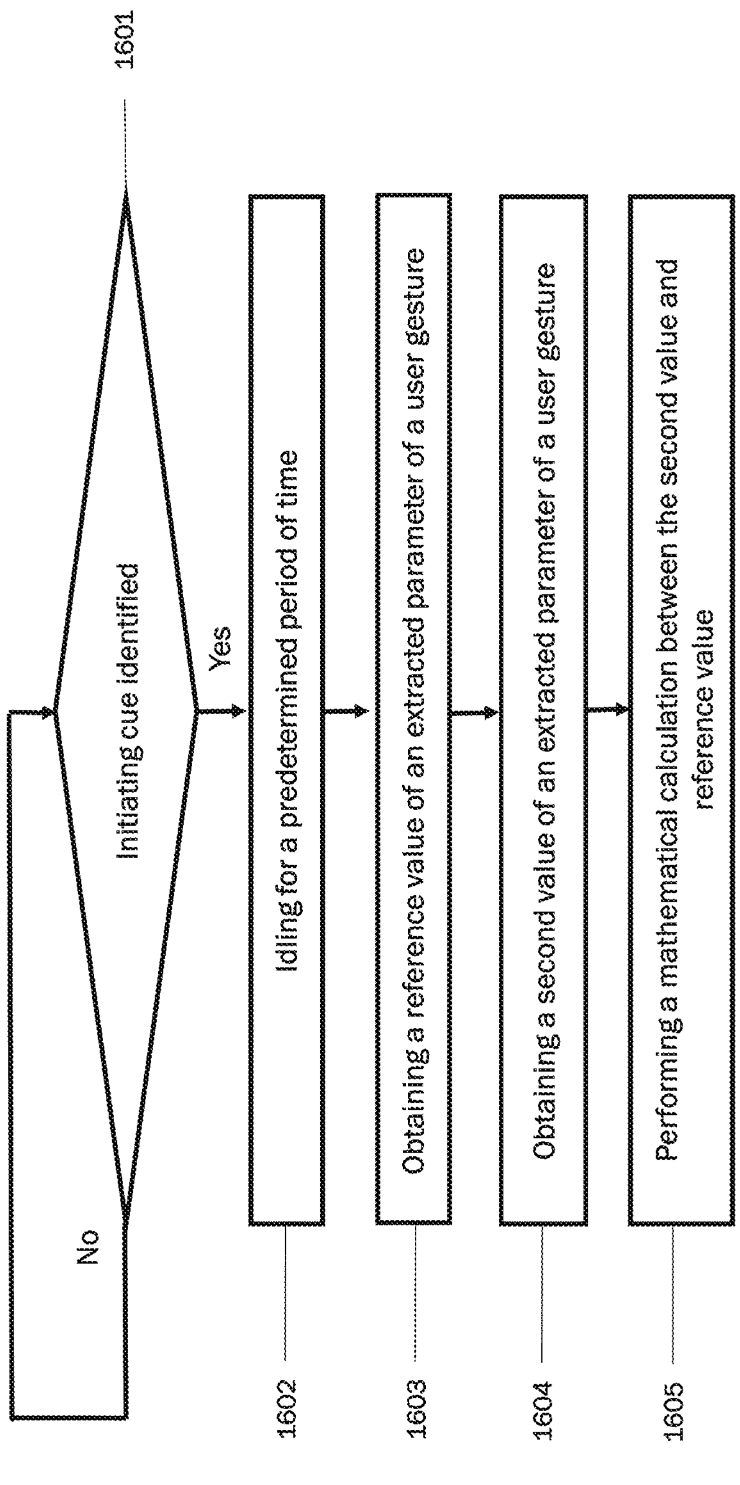
FIG. 16 is a flowchart of a method for detecting a continuous adjustment gesture using an interface device, in accordance with some embodiments of the present invention.

FIG. 16 is a flowchart of a method for detecting a continuous adjustment gesture using an interface device, in accordance with some embodiments of the present invention. Method 1600 may comprise Identifying an initiating cue 1601. The initiating cue may be a combination of a voice command, a gesture, position (e.g., using positional tracking), a cue generated by the interface device and/or checking if an extracted value of force is above a threshold. Method 1600 may comprise idling for a predetermined period of time 1602.

In some embodiments of the present invention method 1600 may comprise obtaining a reference value such as a first value of an extracted parameter of a user gesture or a measured value from a gesture of the user 1603. The reference value may be an extracted value of force at the end of the predetermined period of time. The extracted parameter may be related to how much force the user applies on their fingers. The extracted parameter may be related to the distance between the index finger and thumb of the user. The extracted parameter may be related to the amount of force the user is applying when pressing the thumb and index finger together. The extracted parameter may be related to distance of the user from a sensor and/or position of the user.

In some embodiments of the present invention, method 1600 may include obtaining a second value of an extracted parameter of a user gesture or of a measured value from a gesture of the user 1604. The second value may be obtained after the device obtained the reference value.

In some embodiments of the present invention, method 1600 may include performing a mathematical calculation between the second value and the reference value 1605. The interface device may generate output signal based on the mathematical calculation. The output signal may be sent to a controlled electronic device for controlling the controlled electronic device. The mathematical calculation may involve ratio, addition, subtraction, multiplication, division, or any mathematical transformation.

In some embodiments of the present invention, the interface device may identify a voice command of the user for identifying the initiating cue, prompting the interface device to idle for a first period of time (e.g., 1303 of method 1300). For example, the user may say “pinch to zoom” for indicating to the device that they wish to initiate a pinch-to-zoom gesture.

In some embodiments of the present invention, the interface device may be configured to receive voice commands, sounds, keywords and tones of the user for identifying the initiating cue (e.g., the device may have a bank or repository of predetermined voice commands and keywords associated with the first condition).

In some embodiments of the present invention, the interface device may identify a gesture of the user for identifying the initiating cue, prompting the interface device to idle for a first period of time. For example, the user may press their index finger and thumb swiftly (or twice) indicating to the device that he wishes to initiate a continuous adjustment gesture. The interface device may be configured to identify gestures and movements of the user for identifying the initiating cue (e.g., the device may have a bank or a repository of predetermined gestures and movements associated with the initiating cue).

In some embodiments of the present invention, the interface device may sense positional tracking data of the user for identifying the initiating cue. The initiating cue may be identified when the interface device detects if a position (e.g., on a display) the user is pointing to is within a region (e.g., using positional tracking). For example, the user may point to an object on a monitor using their hand. The device may be configured to perform positional tracking (e.g., by sensing movements and gestures of the user) and detect where the user is pointing to. When the device detects that the user is pointing to a position within a region (e.g., the user is pointing to an image on the display, or to a button) the first condition may be met.

In some embodiments of the present invention, the interface device may have a bank or repository of predetermined regions and buttons associated with the initiating cue. For another example, the interface device may be configured to identify the initiating cue if the user points to an object (e.g., image) for a period of time.

In some embodiments of the present invention, the processor (such as processor 108 of FIG. 1C) of the interface device, may be configured to identify an initiating cue in the one or a plurality of sensed gestures or in the one or a plurality of sensed sounds. The processor may be configured to extract a first measured gesture value from said one or a plurality of sensed gestures, to extract a second measured gesture value from said one or a plurality of sensed gestures, and to generate the output signal based on the first measured gesture value and the second measured gesture value.

In some embodiments of the present invention, the initiating cue may be used to select a function of a controlled device, wherein the first measured gesture value is used to select an initial state of a parameter of the function. The second measured gesture value may be used to select a final state of the parameter of the function. The function may be selected from the group of functions consisting of volume of an audio device, temperature of a climate control device, size of a virtual object, displacement of a virtual object and zooming in or zooming out.

In some embodiments of the present invention, the processor may be configured to identify the initiating cue based on at least one cue from the group of cues consisting of: a sound of the user, a gesture of the user, a value of force measured from the user and a signal generated by the processor. The processor may be configured, after identifying the initiating cue, to wait for a predetermined period of time before extracting the first measured parameter.

In some embodiments of the present invention, the processor may be configured to identify a terminating cue in said one or a plurality of sensed gestures or in said one or a plurality of sensed sounds. The processor may be configured to identify the terminating cue based on identifying exiting a predetermined parameter range or identifying a stabilization within a predetermined parameter range.

In some embodiments of the present invention, the processor may be configured to generate the output signal based on a mathematical relation selected from the group of mathematical relations consisting of ratio, addition, subtraction, multiplication and division.

Figure 17:
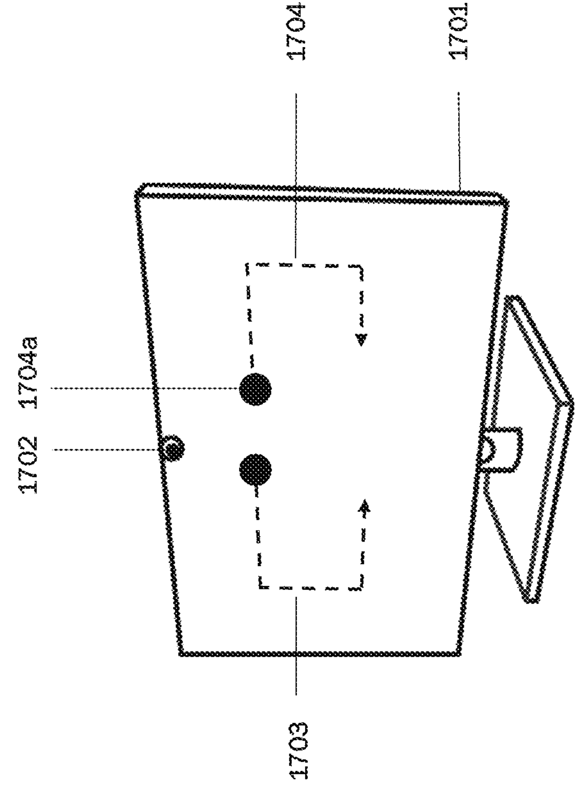
FIG. 17 is a schematic view of a user, making a gesture following a pattern displayed on a display, in accordance with some embodiments of the present invention.
Figure 17:
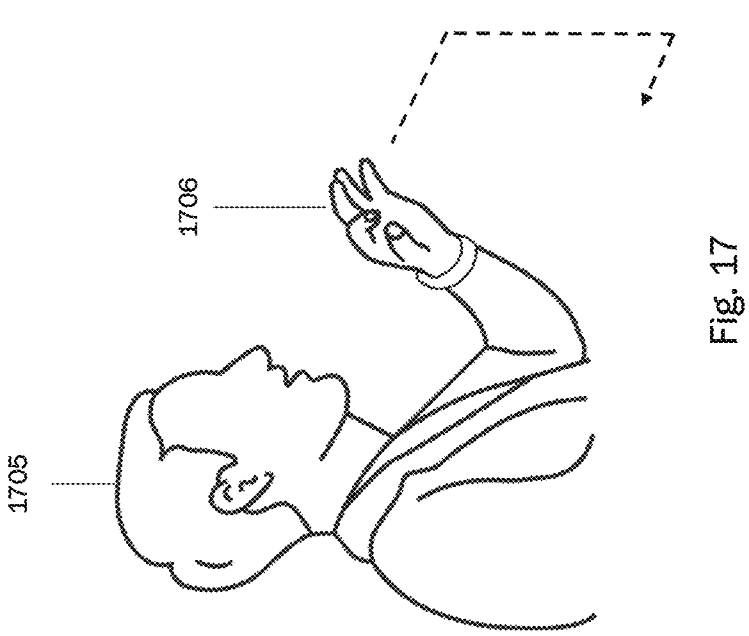

FIG. 17 is an illustration of a user making a gesture while mimicking a pattern from one or more patterns displayed on a display, in accordance with some embodiments of the present invention. In some embodiments of the present invention a gesture and/or voice-controlled interface device for electronic devices may detect rhythmic path mimicry. Rhythmic path mimicry detection may relate to sensing one or a plurality of continuous gestures (such as a combination of movement and applied force by the user) performed by a user, calculating a similarity measure between the one or a plurality of gestures and a predetermined gesture, and checking if the similarity measure is above a threshold. If the similarity measure is above a threshold, the interface device may generate an output signal to a controlled electronic device.

In some embodiments of the present invention, the display 1701 may present one or more predefined gestures such as gestures displayed as patterns to the user, so that the user may mimic and/or follow one or more of these patterns. For example, display 1701 may present first pattern 1703 and second pattern 1704 to user 1705. For example, first pattern 1703 may indicate an instruction to user 1705 to perform a counterclockwise movement of the hand. Second pattern 1704 may indicate an instruction to user 1705 to perform a clockwise movement of the hand.

In some embodiments of the present invention, the patterns displayed on display 1701 may relate, each, to a specific command (e.g., different commands, like “turn device on”, “select channel”, “display menu”, etc., and/or in some examples, contradicting commands, for example, “turn volume up” or “turn volume down”, “increase luminosity” or decrease luminosity”, etc.) and may be selected from a database of predetermined gestures and/or patterns repository.

According to some embodiments, the user may be invited to select the desired command by choosing which pattern to mimic. It may be required for a user to mimic the pattern by following and synchronizing with the pattern. For example, when the user choses to mimic pattern 1704, the user may be required to move their hand (while pressing their fingers) along pattern 1704 and in synchronization with movement of ball **1704*a* (ball 1704*a* may move along displayed pattern 1704** at a predetermined movement rate).

In some embodiments of the present invention, Camera 1702 may obtain video footage of user 1705. The interface device may comprise a video analysis algorithm for identifying gestures and movements of the user. User 1705 may perform gesture 1706, mimicking second pattern 1704. The interface device may detect and identify gesture 1706 using video obtained from camera 1702 performing video analysis on the obtained video and comparing the sensed gesture 1706 to gestures from a database of predetermined patterns and gesture repository.

In some embodiments of the present invention, the interface device may calculate the similarity measure between the sensed gestures (e.g., movement and applied force) and the predetermined gesture (presented as a pattern) based on synchronization between the sensed gestures and the predetermined gesture. The interface device may calculate the similarity measure using mathematical operations such as correlation, parametric comparison, polynomial extraction, moving average and comparing frames of the sensed gestures and the predetermined gesture. When the interface device determines that the similarity measure is above a predetermined threshold, mimicry is detected, and the interface device may generate an output signal to control an electronic device. The interface device may provide feedback to the user (e.g., via display 1701) indicating that mimicry is detected.

In some embodiments of the present invention, the processor (such as processor 108 of FIG. 1C) of the interface device may be configured, to calculate a similarity measure between a gesture of said one or a plurality of sensed gestures and a predefined gesture, and to generate the output signal only when the similarity measure is above a predetermined threshold. The processor may be configured to present to the user a pattern to be mimicked that corresponds to the predefined gesture, via an output device. The processor may be configured to present to the user a plurality of patterns to choose from the pattern to be mimicked, via an output device. The predefined gesture may be a variation or an opposite of the pattern to be mimicked. The processor may be configured to generate the pattern and/or the pattern may be selected from a database of predefined patterns. A modality of the pattern may be selected from the modalities consisting of: sound, vision, tactile and haptic. The output device may be selected from the output devices consisting of: a display screen, headphones, earphones, a speaker, tactile actuator, and haptic actuator.

In some embodiments of the present invention, the one or a plurality of sensed gestures may comprise sensing pressure applied between fingers or sensing pressure resulting from fisting. The said one or a plurality of sensed gestures may also comprise sensing motion of a forearm of the user, wherein said motion is selected from the group of motions consisting of: roll, pitch and yaw. The processor may be configured to determine whether the sensed pressure and the sensed motion are synchronized.

Figures 18A, 18B, 18C, 18D:
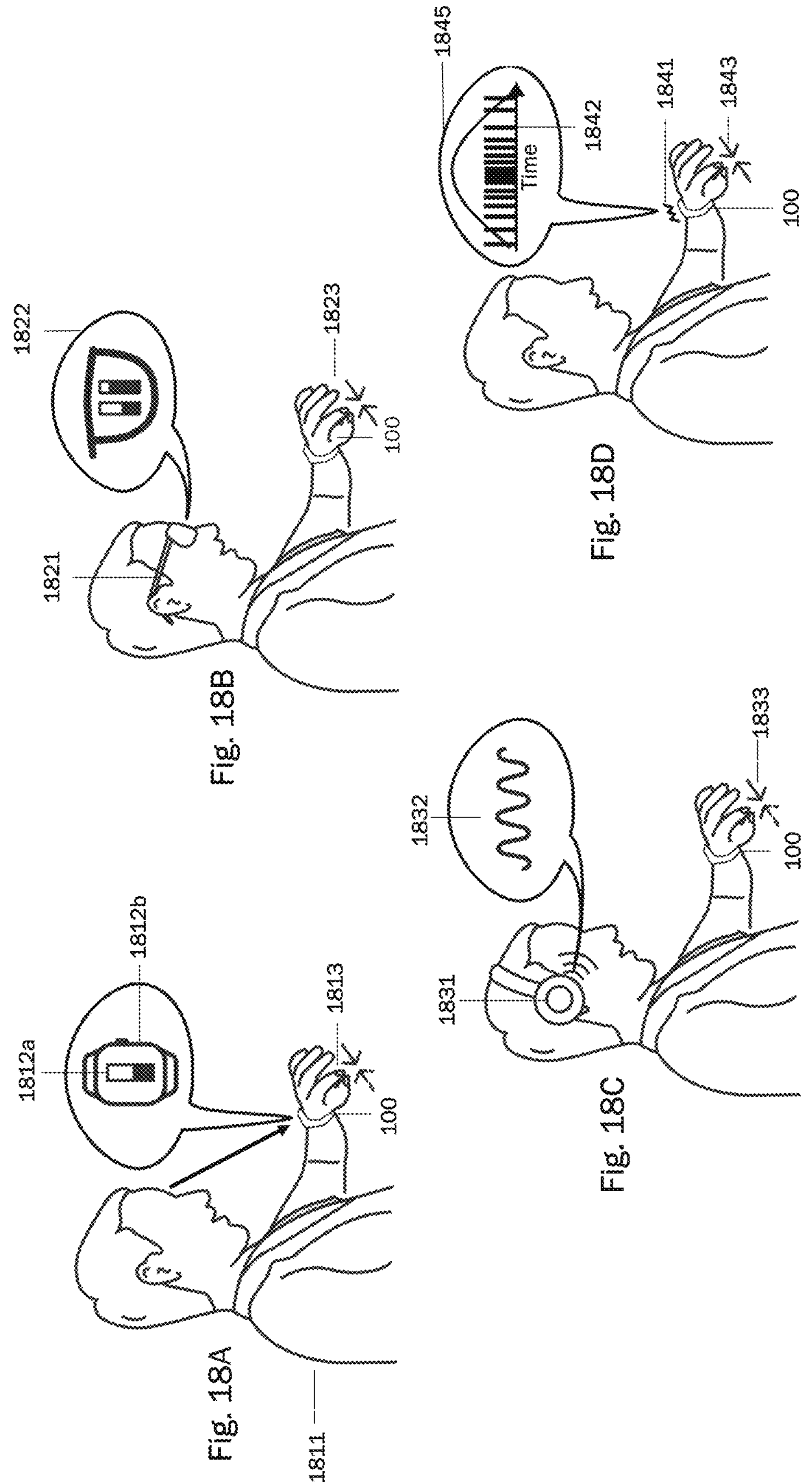
FIG. 18A is an illustration of a user wearing an interface device, pressing their fingers together, in response to an instruction on a display of the interface device, in accordance with some embodiments of the present invention.
FIG. 18B is an illustration of a user wearing an interface device, pressing their fingers together in response to an instruction displayed on augmented reality glasses, in accordance with some embodiments of the present invention.
FIG. 18C is a schematic view of a user wearing an interface device, pressing their fingers together in response to a sound from an audio headset, in accordance with some embodiments of the present invention.
FIG. 18D is a schematic view of a user wearing an interface device, pressing their fingers together in response to a vibration signal generated by the interface device, in accordance with some embodiments of the present invention.

FIG. 18A is an illustration of a user wearing an interface device, pressing their fingers together at an intensity, following an instruction on a display of the interface device, in accordance with some embodiments of the present invention. User 1811 may wear interface device 100. Interface device 100 may include a display 1812*b*. The interface device may present on the display one or a plurality of patterns (e.g., from a database of patterns). The one or a plurality of patterns may be presented to the user visually on a display of the interface device 100. For example, the display 1812*b* may visually present a pattern for the user to mimic. The display may show, for example, gauge bar 1812*a*. The bar 1812*a* may indicate to the user how strongly the user should press their fingers together 1813. A full bar may indicate a high pressure between the pressed fingers. An empty bar may indicate a low pressure between the pressed fingers 1813. User 1811 may mimic the pattern shown by bar 1812*a* on the display, for example, pressing their fingers together in synchronization with the state of the bar 1812*a*. If the bar is full, the user intuitively may press hard their fingers, and if the bar is empty the user may intuitively release the pressure between their fingers. Any intermediate state of the bar may be met with an intermediate pressure being intuitively exerted by the user between their fingers. The device may detect rhythmic path mimicry if the pattern changes rhythmically, and the user mimics the pattern accordingly (e.g., synchronized with the pattern).

FIG. 18B is an illustration of a user wearing an interface device, pressing their fingers together at an intensity following an instruction from instructions on augmented reality glasses, in accordance with some embodiments of the present invention. The user may wear glasses 1821 (e.g., virtual reality and/or augmented reality glasses). Glasses 1821 may display one or a plurality of patterns. For example, glasses 1821 may display one or a plurality of bars, related to the one or plurality of patterns (or predetermined gestures). The interface device may sense the force exerted by the user between their fingers using the sensors interface device 100 (e.g., interface device 100 may comprise biopotential sensors, IMU and other gesture sensors). The user may mimic one of the one or a plurality of patterns displayed by the one or a plurality of bars on the display of the wearable device. The device may detect similarity (and/or synchronization) between the force that the user applies when he presses their fingers together 1823 and one of the one or a plurality of patterns.

FIG. 18C is a schematic view of a user wearing an interface device, pressing their fingers together at an intensity responding to a sound signal presented to the user via an audio headset 1831, in accordance with some embodiments of the present invention. The interface device 100 may include a database of one or a plurality of audio signal patterns saved in a memory of the device. For example, the headset 1831 may play to the user a sound signal 1832 going up and down in volume and/or in pitch indicating a pattern that goes up and down. The user may respond to the played audio signal by pressing their fingers together 1833 and adjusting the pressure according to the changing sound pattern 1832, thereby mimicking that pattern.

FIG. 18D is an illustration of a user wearing an interface device, pressing their fingers together at an alternating intensity following a vibration of alternating intensity produced by the interface device on the wrist of the user, in accordance with some embodiments of the present invention. The interface device may have a database of one or a plurality of vibration signal patterns saved on a memory of the device. Interface device 100 may include a haptic actuator unit 1841 (e.g., vibrating motor) for generating the vibration signal. The interface device 100 may generate one or a plurality of vibration signal patterns 1845 for the user to mimic. The interface device 100 may produce a vibration 1842 that goes up and down in intensity and/or in pulse rate for indicating a pattern that goes up and down in intensity. The user may mimic the vibration signal by pressing their fingers together 1843 in alternating pressure mimicking the pattern of the generated vibration signal.

Figure 19:
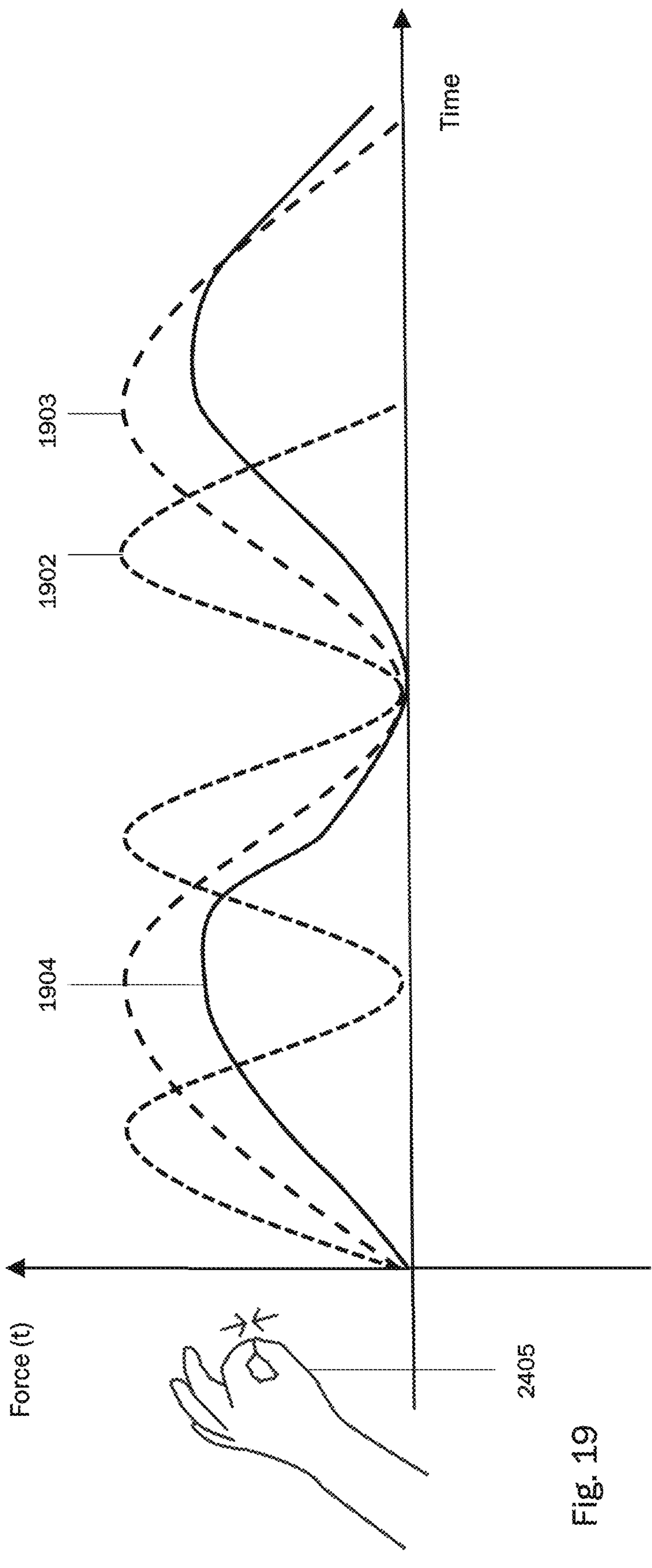
FIG. 19 is a graph showing patterns and values of measured force applied by a user, when pressing their fingers together as a function of time, in response to a pattern, in accordance with some embodiments of the present invention.

FIG. 19 is a graph showing patterns, and values of sensed pressure force applied by a user, pressing their fingers together as a function of time, following a pattern from a database of patterns, in accordance with some embodiments of the present invention. The interface device may present the user with a first pattern 1902 and a second pattern 1903. The user may alternate the pressure exerted between their fingers as presented by force line 1904, mimicking first pattern 1902. The interface device may compare between the measured force signal 1904 and patterns 1902 and 1903 to determine whether any of these patterns is actually being mimicked. The interface device may calculate a similarity measure between obtained values of force 1904 and each of the patterns 1902 and 1903. The interface device may determine that the sensed force signal 1904 is indeed similar to any of these patterns (in the present example—pattern 1903).

In some embodiments of the present invention, the interface device may calculate the similarity measures between the sensed force signal 1904 and each of the patterns that were presented to the user by the interface device. The interface device may detect similarity between the sensed force signal 1904 and a pattern found to be similar to that signal.

Figure 20:
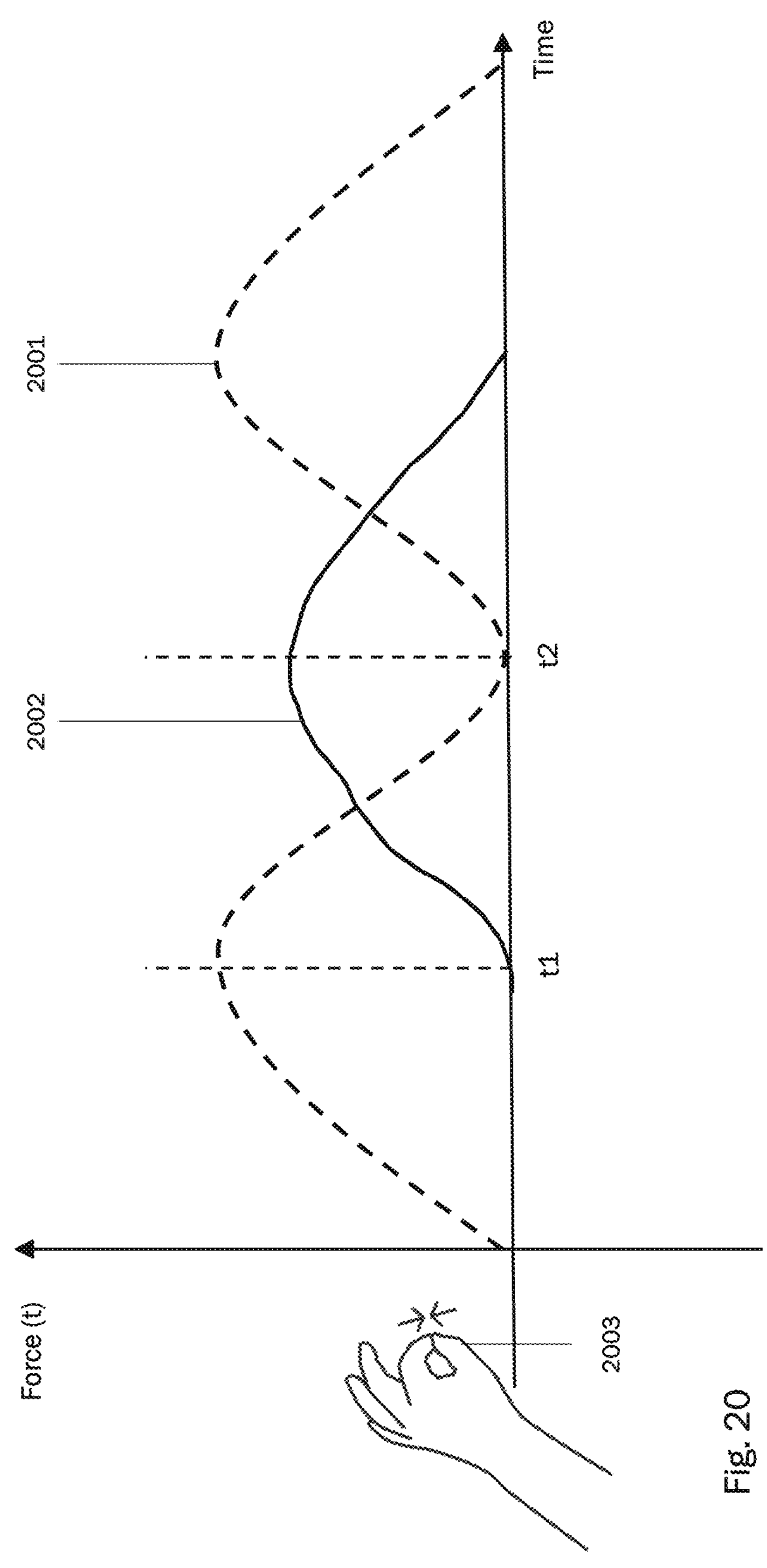
FIG. 20 is a graph showing a pattern, and values of measured force applied by a user, when pressing their fingers together inversely to a pattern as a function of time, in accordance with some embodiments of the present invention.

FIG. 20 is a graph showing a pattern, and a sensed force signal obtained from a user, pressing their fingers together inversely (in an offset phase) to the pattern as a function of time, in accordance with some embodiments of the present invention. The interface device may present pattern 2001 to the user. The user may press their fingers together 2003 at force 2002 which may be an opposite or a variation to pattern 2001 (e.g., the sensed gesture is a predefined gesture derived from a variation or an opposite of the pattern to be mimicked such as pattern 2001). For example, the interface device may present one pattern at a time, and the user may choose to mimic said pattern or the opposite of said pattern (e.g., in a phase of substantially 180 degrees related to the presented pattern). The interface device may sense the force 2002 and detect that there's a similarity between the opposite of pattern 2001 and force 2002. When the interface device detects similarity between the opposite of pattern 2001 and force 2002, the interface device may generate a first output signal, and when the interface device detects similarity between pattern 2001 (as presented) and force 2002, the interface device may generate a second output signal.

In other embodiments of the present invention, the interface device may detect similarity between force 2002 and the opposite of pattern 2001 and conclude that there is mimicry (the interface device may ignore a phase shift between force 2002 and pattern 2001).

In some embodiments of the present invention, an opposite or a variation of pattern 2001 may refer to a shift (E.g., 90, 180, 270 degrees shift) in relation to pattern 2001, a negative (e.g., substantially 180 degrees shift of a periodical pattern, or negative, mirrored and or biased patterns compared to pattern 2001)

Figure 21:
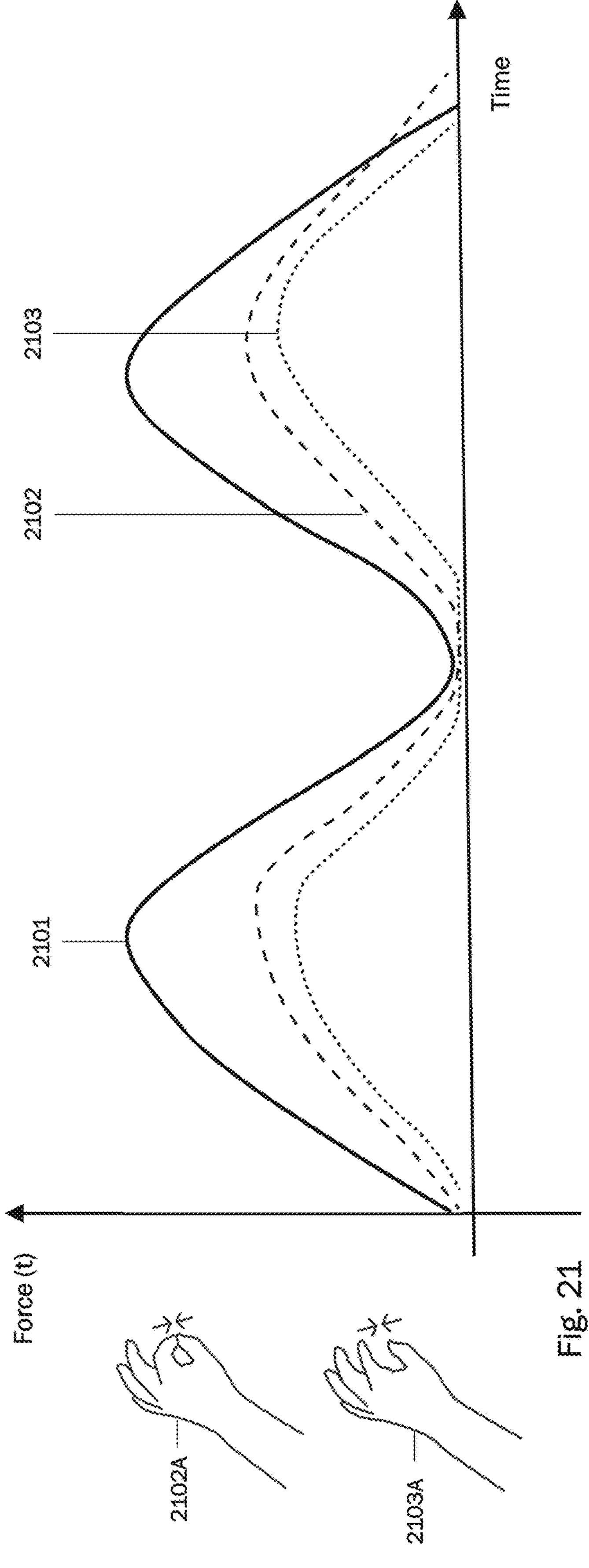
FIG. 21 is a graph showing a pattern, a first set of values of measured force applied by a user, pressing their middle finger and thumb together in response to the pattern, and a second set of values of measured force applied by the user, pressing their index finger and thumb together in response to the pattern, in accordance with some embodiments of the present invention.

FIG. 21 is a graph showing a pattern 2101, a first sensed force signal 2103 obtained from a user, pressing their middle finger and thumb together 2103A following the pattern, and a second sensed force signal 2102 obtained from the user, pressing their index finger and thumb together 2102A following that pattern, in accordance with some embodiments of the present invention. The device may obtain one or a plurality of sensed force signals. The device may obtain a first force signal 2102 and a second sensed force signal 2103.

In some embodiments of the present invention, the device may detect rhythmic path mimicry between the first sensed force signal and the second sensed force signal. The device may detect if there is similarity or correlation between two obtained sensed force signals (e.g., 2102 and 2103). The device may detect rhythmic path mimicry if the similarity measure between first set of force values 2102 and second set of force values 2103 is above a threshold.

In some embodiments of the present invention, the device may calculate a first similarity measure between the sensed force signal 2102 and pattern 2101 and may also calculate a second similarity measure between the second sensed force signal 2103 and pattern 2101. The device may generate an output signal to a controlled electronic device, based on the first similarity measure, based on the second similarity measure, or based on both. For example, the device may generate an output signal, if and only if both calculated similarity measures are above a certain threshold.

In some embodiments of the present invention, the device may calculate a similarity measure between different gestures such as hand movement, pressure applied on fingers of the user, position of the user, a predetermined pattern from a pattern repository and a pattern generated by the interface device.

Figures 22A, 22B, 22C:
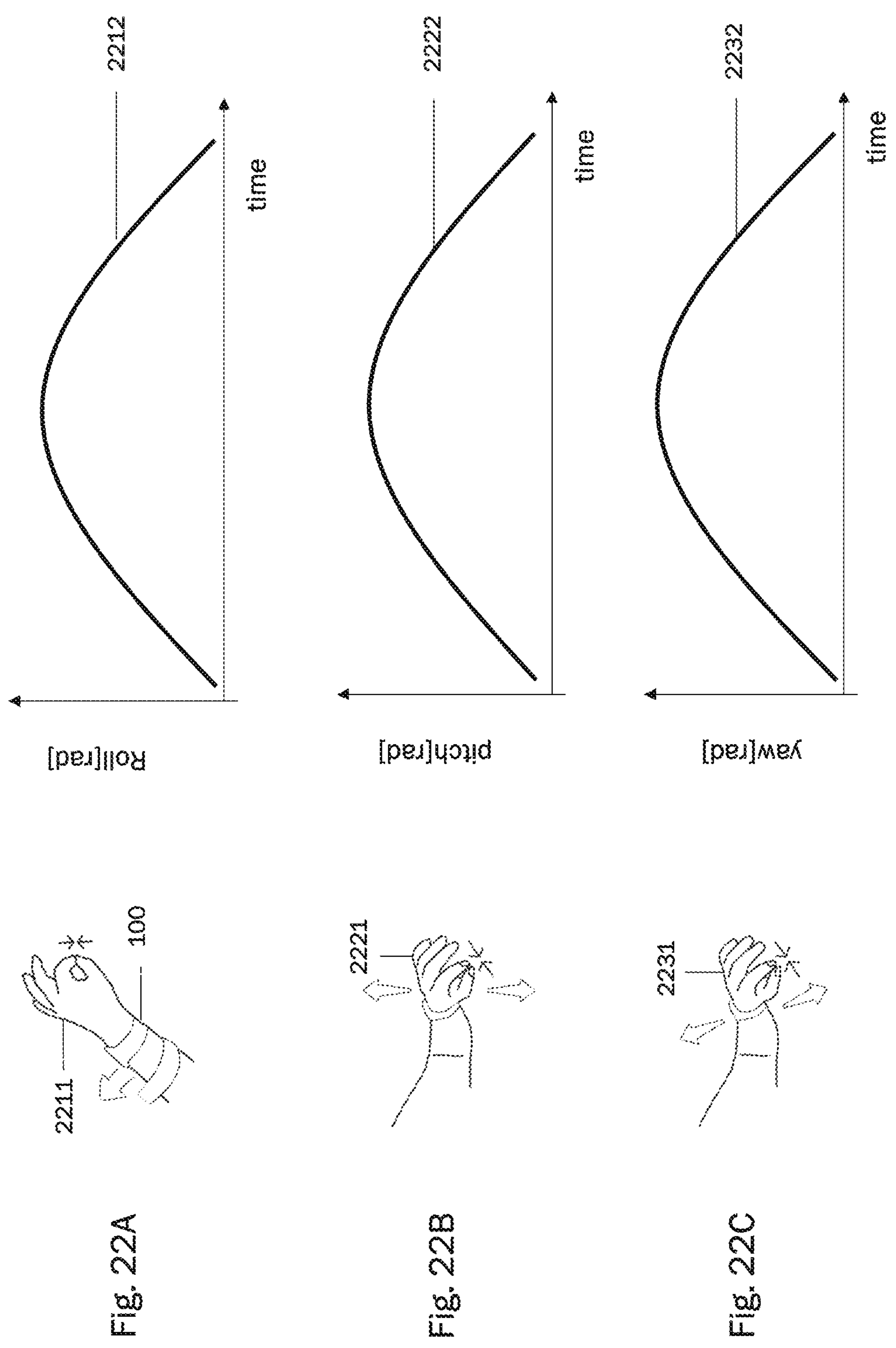
FIG. 22A is an illustration of a hand of a user performing a rolling gesture while pressing their fingers together, and a graph showing the hand roll as a function of time, in accordance with some embodiments of the present invention.
FIG. 22B is an illustration of a hand of a user moving their hand up and down while pressing their fingers together, and a graph showing a hand pitch as a function of time, in accordance with some embodiments of the present invention.
FIG. 22C is an illustration of a hand of a user moving their hand left and right while pressing their fingers together, and a graph showing the hand yaw as a function of time, in accordance with some embodiments of the present invention.

FIG. 22A is an illustration of a hand of a user performing a rolling gesture while pressing their fingers together, and a graph 2212 showing the hand roll as a function of time, in accordance with some embodiments of the present invention. Interface device 100 may detect similarity between the force measured of the user pinching their fingers and roll of rolling gesture 2211.

FIG. 22B is a schematic view of a hand of a user moving their hand vertically (up and down) while pressing their fingers together, and a graph 2222 showing the hand pitch as a function of time, in accordance with some embodiments of the present invention. Interface device 100 may detect similarity between force measured of the user pinching their fingers and pitch of hand of the user performing vertical gesture 2221.

FIG. 22C is a schematic view of a hand of a user moving their hand horizontally (left and right) while pressing their fingers together, and a graph 2232 showing the hand yaw as a function of time, in accordance with some embodiments of the present invention. Interface device 100 may detect similarity between force measured of the user pinching their fingers and yaw of hand of the user performing horizontal gesture 2231.

Figures 23A, 23B:
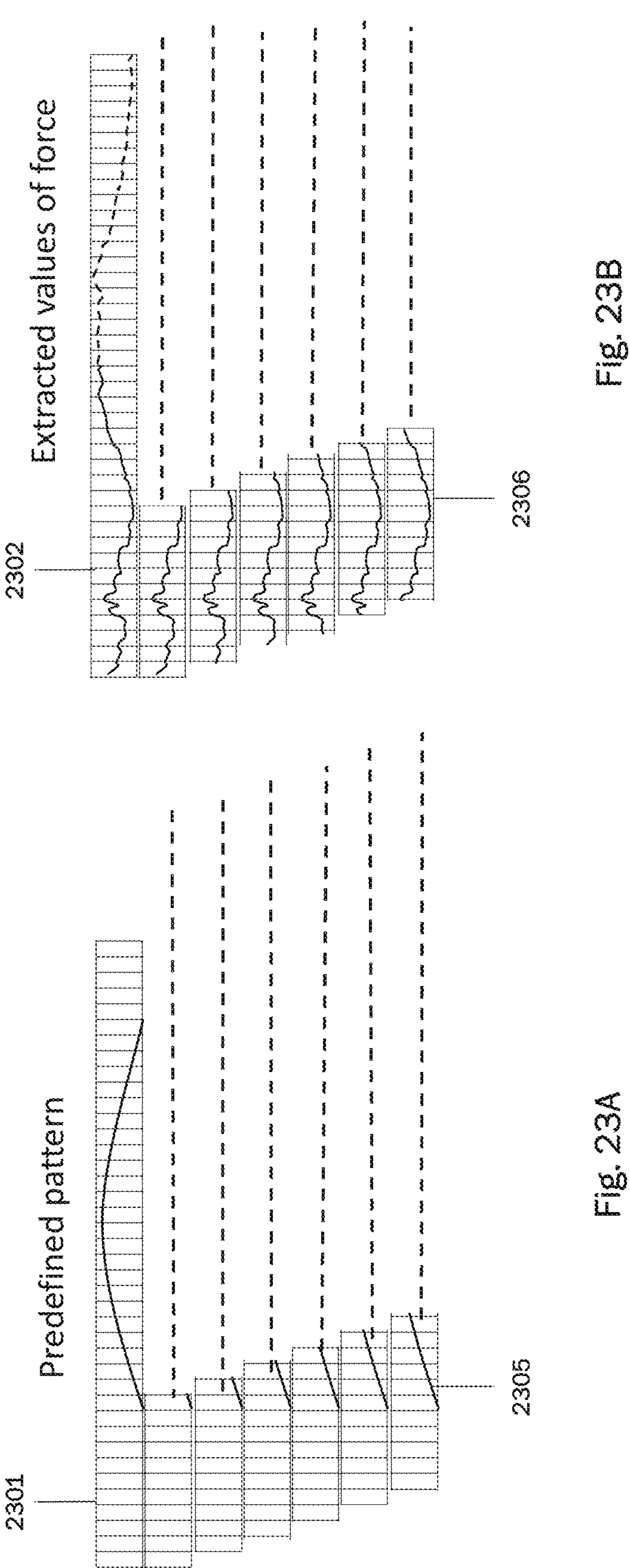
FIG. 23A is a graph showing values of force of a predefined pattern related to a predetermined gesture, in accordance with some embodiments of the present invention.
FIG. 23B is a graph showing measured values of force obtained from a continuous gesture performed by a user mimicking the predefined pattern of FIG. 23*a*.
Figure 23C:
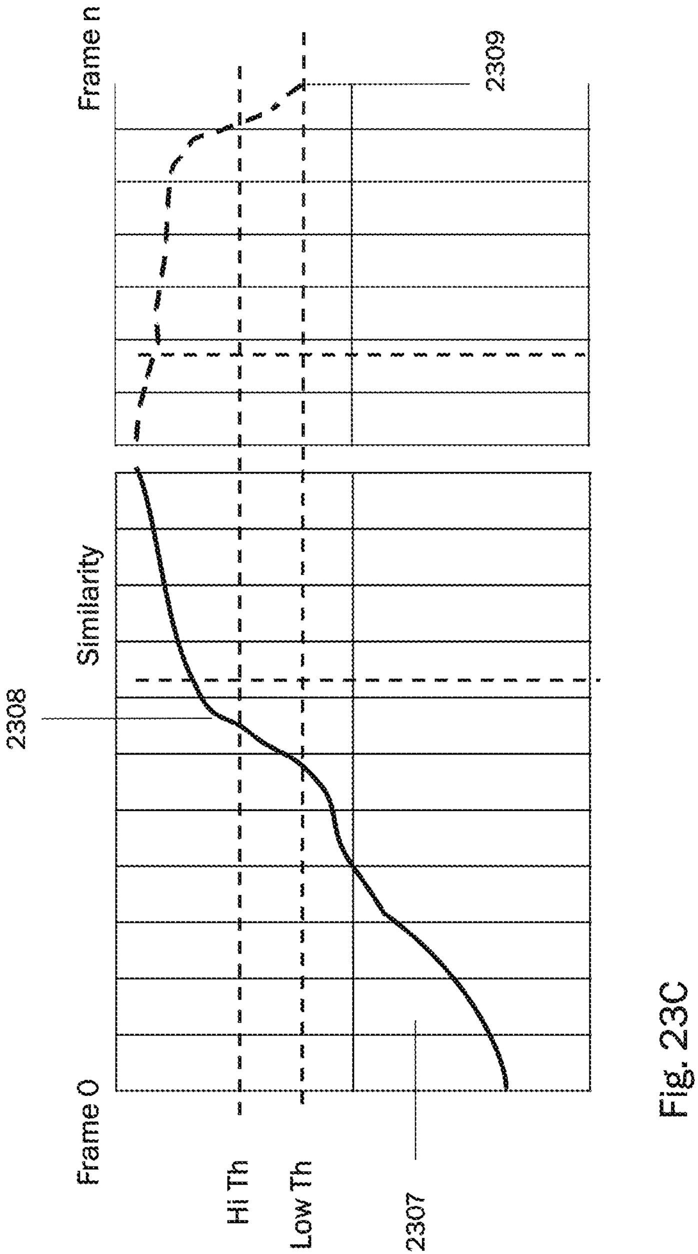
FIG. 23C is a graph showing calculated similarity measure between the predefined pattern of FIG. 23*a* and the measured values of force of FIG. 23*b*.

FIG. 23*a* is a graph showing values of force of a predefined pattern related to a predetermined gesture, in accordance with some embodiments of the present invention. FIG. 23*b* is a graph showing extracted values of force obtained from a continuous gesture performed by a user mimicking the predefined pattern of FIG. 23*a*. FIG. 23*c* is a graph showing calculated similarity measure between the predefined pattern of FIG. 23*a* and the measured values of force of FIG. 23*b*. First graph 2301 shows values of force of a predefined pattern related to a predetermined gesture. Second graph 2302 shows extracted values of force obtained from a continuous gesture performed by a user mimicking the predefined pattern of first graph 2301. The interface device may measure similarity between first set of frames 2305 of first graph 2301 and second set of frames 2306 of the second graph 2302. The first set of frames 2305 and the second set of frames 2306 may represent parts (e.g., time windows) of first graph 2301 and second graph 2302 respectively.

In some embodiments of the present invention, third graph 2307 may show a similarity measure calculation between the predetermined pattern shown in first graph 2301 and the extracted values of force obtained from the user shown in second graph 2302. A processor of the interface device may calculate similarity measure values between frames 2305 of the first graph 2301 and frames 2306 of second graph 2302. When the value of the similarity measure is above a high first threshold (denoted as Hi Th) at frame 2308, the processor may start counting frames. The processor may count the number of consecutive frames where the value of the similarity measure is above the high first threshold. The processor may stop counting the frames when the similarity measure is below a low second threshold at point 2309.

In some embodiments of the present invention, the processor may detect rhythmic path mimicry between the predetermined pattern and the gesture performed by the user if the number of counted frames is above a predetermined number N.

Figure 24:
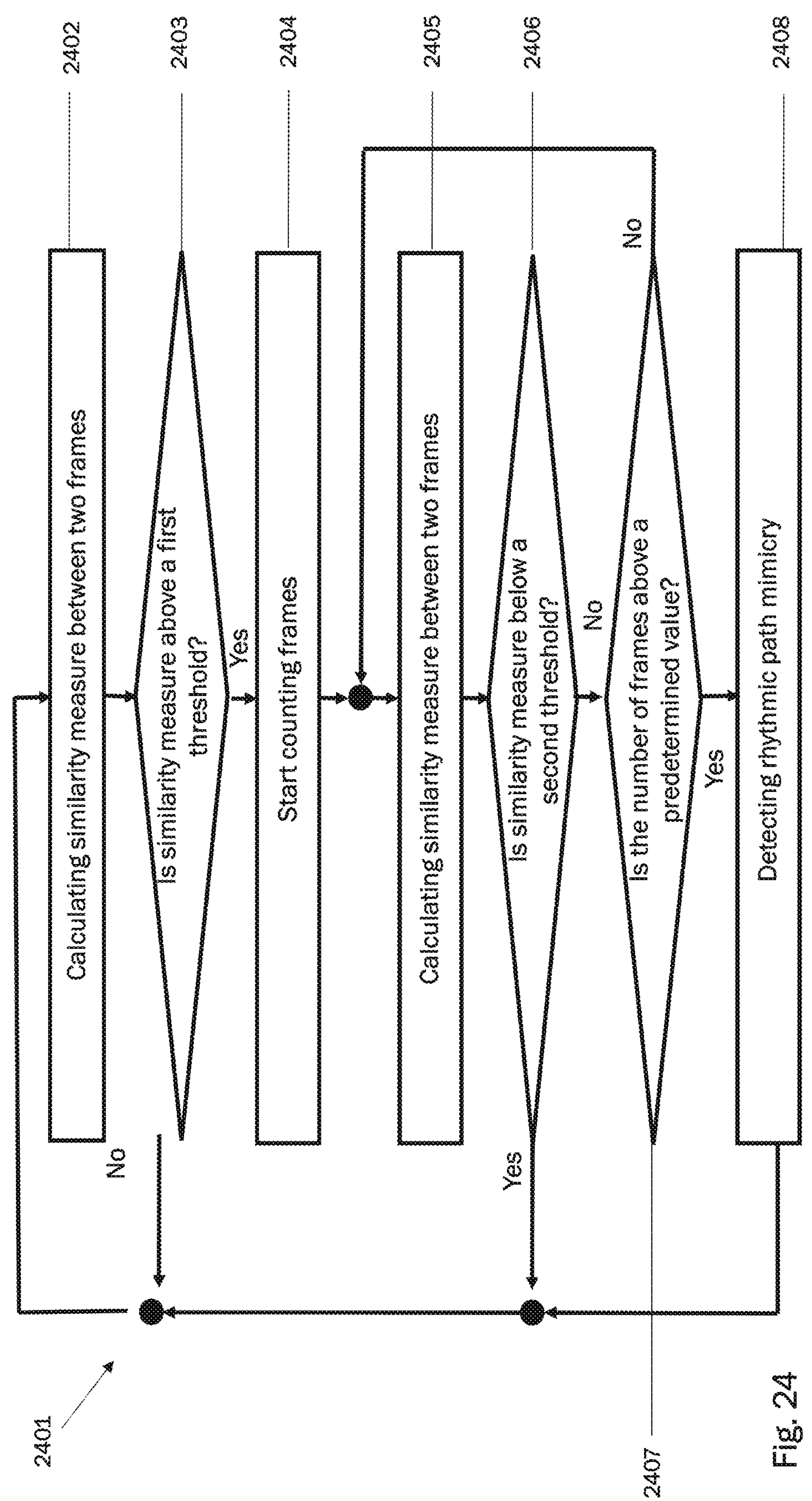
FIG. 24 is a flowchart of a method for detecting rhythmic path mimicry using an interface device in accordance with some embodiments of the present invention.

FIG. 24 is a flowchart of a method for detecting rhythmic path mimicry using an interface device, in accordance with some embodiments of the present invention. Method 2401 may comprise sensing gesture of a user to detect rhythmic path mimicry by calculating a similarity measure with a predefined gesture. Method 2401 may comprise calculating a similarity measure between two frames 2402, wherein one of the two frames may be a frame extracted from a sensed gesture of the user, and a second frame of the two frames may be a frame extracted from a predefined gesture (or pattern). Method 2401 may comprise checking by the interface device, if similarity measure is above a first threshold 2403 if so, the interface device may start counting frames 2404. Otherwise, the method may return to step 2402 until the similarity measure is above a threshold.

In some embodiments of the present invention, method 2401 may comprise calculating a similarity measure between two frames 2405, and checking by the interface device, if similarity measure is below a second threshold 2406. For the interface device to detect rhythmic path mimicry, the interface device may count a predefined number of frames where the similarity metric is not below a second threshold. If the similarity measure is below a second threshold (e.g., before reaching a count of predetermined number of frames), the method may return to calculating a similarity measure between two frames 2402 until the similarity method is above a first threshold 2403.

If the similarity measure is not below a second threshold, method 2401 may comprise checking by the interface device, if the number of frames is above a predetermined value 2407. If not, the method may go back to calculating a similarity measure between two frames 2405, until the number of frames is above a predetermined number. If the number of frames is above a predetermined value, method 2401 may comprise detecting rhythmic path mimicry 2408. When rhythmic path mimicry is detected, the interface device may generate an output signal to an electronic device, provide feedback to the user for indicating that rhythmic path mimicry was detected and returning to calculating a similarity measure between two frames 2402.

Figure 25:
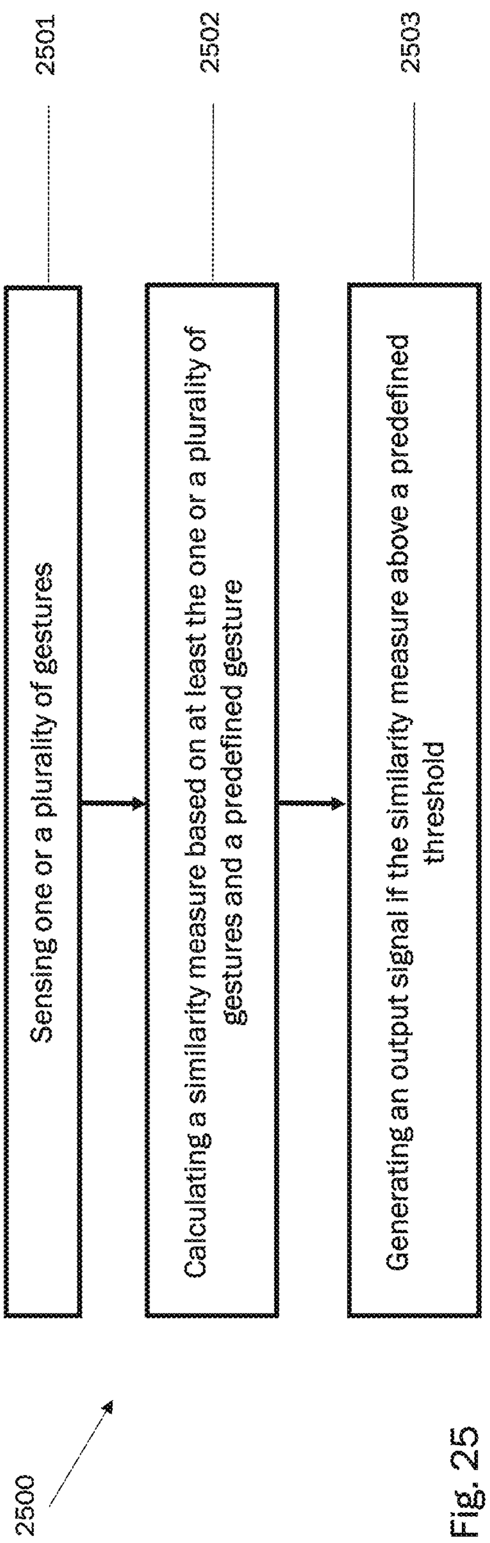
FIG. 25 is a flowchart of a method for detecting rhythmic path mimicry, in accordance with some embodiments of the present invention.

FIG. 25 is a flowchart of a method for detecting rhythmic path mimicry using an interface device, in accordance with some embodiments of the present invention. Method 2500 may comprise providing a pattern for a user. Method 2500 may comprise sensing one or a plurality of gestures 2501. method 2500 may comprise calculating a similarity measure based on at least the one or a plurality of gestures and a predefined gesture 2502 (e.g., provided to the user as a pattern). Method 2500 may comprise Generating an output signal if the similarity measure is above a predefined threshold.

Figure 26:
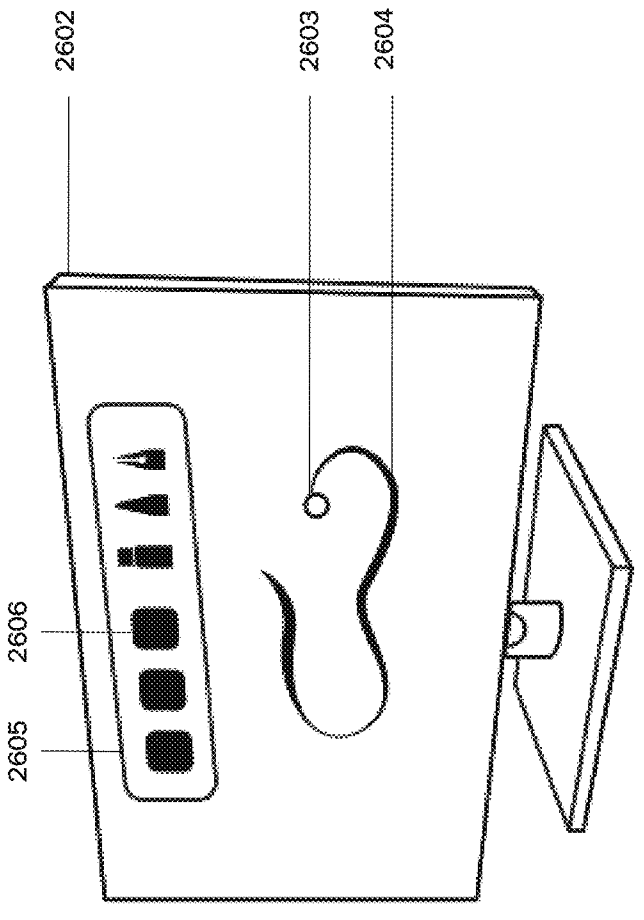
FIG. 26 is an illustration of a hand of user, wearing an interface device to control a cursor on a display, in accordance with some embodiments of the present invention.
Figure 26:
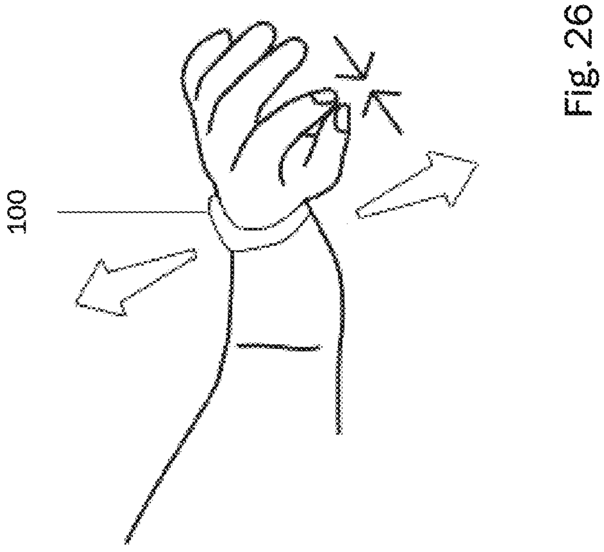

FIG. 26 is a schematic view of a hand of user, wearing an interface device to control a cursor on a display, in accordance with some embodiments of the present invention. In some embodiments of the present invention, a gesture and or voice-controlled interface device may control a cursor on a display (e.g., air mouse). The interface device may control the air mouse (e.g., move the cursor around and/or click) by identifying a gesture and/or force and/or movement of the user (e.g., using the IMU, biopotential sensors and/or camera). For example, the interface device may move the cursor according to the hand movement of the user. The interface device may perform a click according to an identified gesture of the user (e.g., pressing the index finger and thumb together), and or measured force of the user (e.g., if the measured force is above a threshold).

In some embodiments of the present invention the user may move cursor 2603 using the air mouse. When the user moves their hand, the IMU of interface device 100 may detect movements of the hand. The device may move cursor 2603 on display 2602, according to movements of the hand.

In some embodiments of the present invention, the user may select a function (e.g., pen type or brush) from toolbar 2605. For example, the user may select brush 2606 by moving cursor 2603 to brush 2606. The user may perform a gesture for choosing different functions and brushes. For example, the user may press their index finger and thumb together for choosing brush 2606. The user may select color of the brush 2606 by selecting the color using cursor 2603. The user may select color of brush 2606 using a gesture.

In some embodiments of the present invention, the user may draw shape 2604 by pressing their index finger and thumb together. The air-mouse device may begin to draw a line after the force measured from the user is above a threshold. For example, the device may draw a line after the user presses their index and thumb together and the measured force is above a threshold.

In some embodiments of the present invention, the user may change a width of the line according to how hard he applies force on their fingers. For example, when the user presses their index finger and thumb together strongly, the line may be wider. When the user presses their index finger and thumb together lightly, the line may be narrower.

Figure 27:
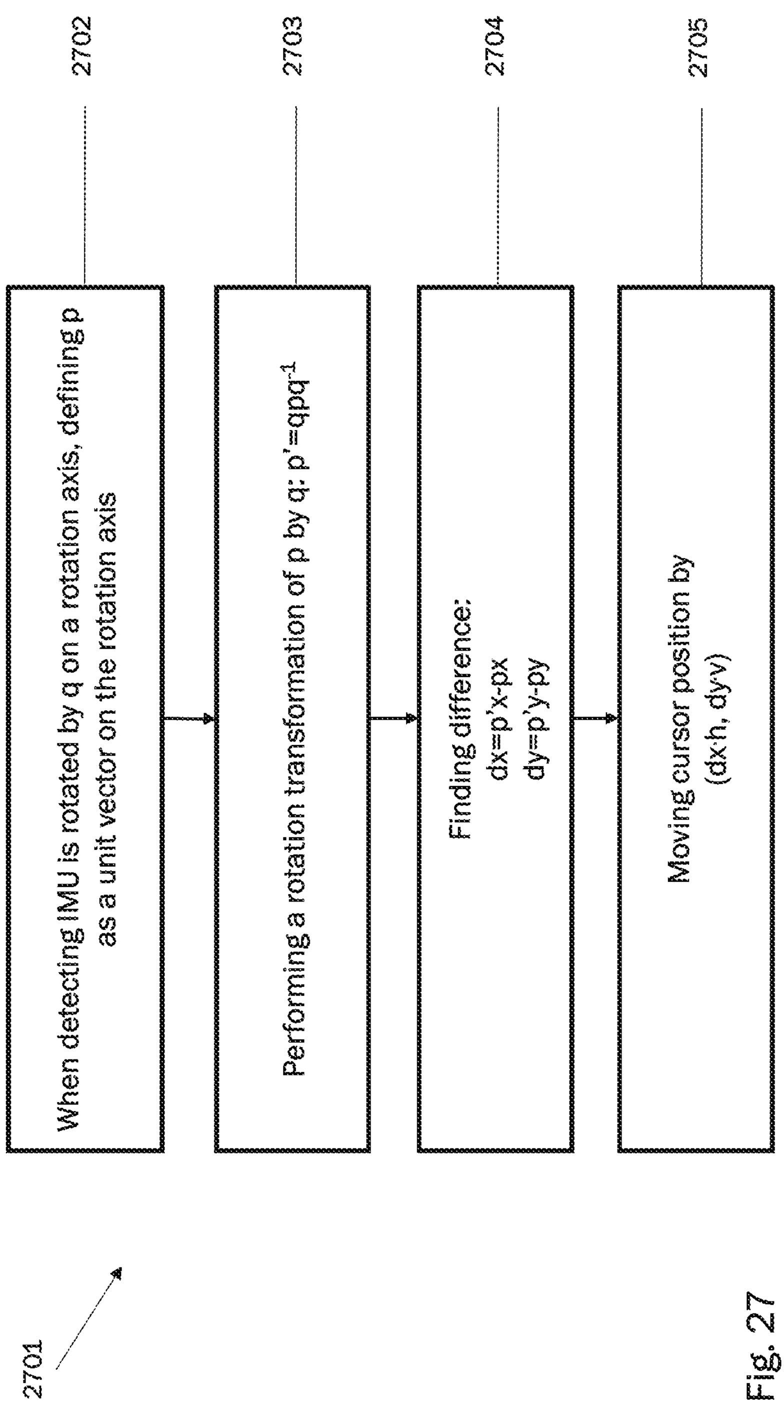
FIG. 27 is a flowchart of a method for moving a cursor using an interface device, compensating for rotation of an inertial measurement unit (IMU), in accordance with some embodiments of the present invention.

FIG. 27 is a flowchart of a method for moving a cursor using an interface device, compensating for rotation of the IMU, in accordance with some embodiments of the present invention. In some embodiments of the present invention the interface device may control a cursor according to movement measurements from the IMU. When the user moves their arm, the interface device may translate movements of the hand of the user, to movement of the cursor. The interface device may move the cursor while disregarding rotation of the IMU (e.g., when the IMU is rotated according to rotation of the hand of the user).

In some embodiments of the present invention method 2701 may include, when detecting that the IMU is rotated by q, defining p as a unit vector (e.g., the original unit vector) on the rotation axis 2702. The interface device may compensate for the rotation of the IMU about the rotation axis for preventing unintended movement of the cursor.

In some embodiments of the present invention, the interface device may perform a rotation transformation of the unit vector p by q according to:

$$p' = qpq^{-1} \tag{10}$$

In the rotation transformation equation (10), p' may denote a new unit vector that underwent a rotation transformation. The rotation of q about the rotation axis may be multiplied by p the original unit vector and multiplied by $q^{-1}$ denoting the inverse of q.

In some embodiments of the present invention, method 2701 may include finding difference between p and p' for determining movement of the cursor:

$$dx = p'_x - p_x \tag{11}$$

-continued $$dy = p'_y - p_y \quad (12)$$

dx may denote difference along x axis of the cursor, $$p'_x$$

may denote an x component of the rotated p' unit vector, and $p_x$ may denote an x component of the original unit vector p. dy may denote difference along y axis of the cursor, $$p'_y$$

denote an y component of the rotated p' unit vector, and $p_y$ may denote a y component of the original unit vector p.

In some embodiments of the present invention, method 2701 may include moving the cursor position by:

$$(dx \cdot h, dy \cdot v) \quad (13)$$

h may denote a parameter of movement factor of the cursor along the horizontal axis x of the cursor (e.g., horizontal speed). v may denote a parameter of movement factor of the cursor along the vertical axis y of the cursor (e.g., vertical speed).

Figure 28:
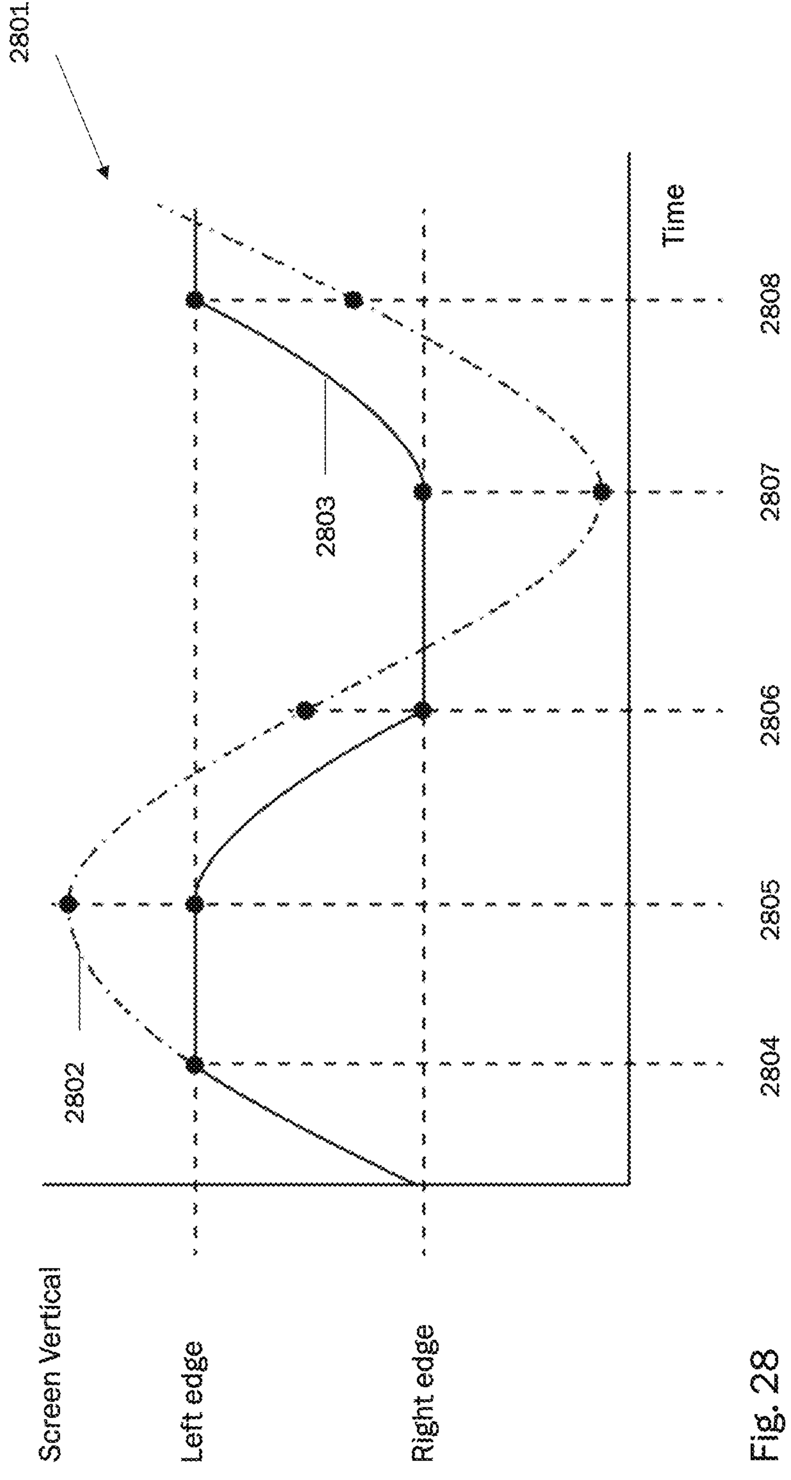
FIG. 28 is a graph showing horizontal movement of a cursor and horizontal movement of a hand of a user controlling the cursor, in accordance with some embodiments of the present invention.

FIG. 28 is a graph showing horizontal movement of a cursor and horizontal movement of a hand of a user controlling a cursor, in accordance with some embodiments of the present invention. Graph 2801 shows movement of a cursor along a vertical axis of a screen due time. Line 2803 is the movement of the cursor according to method 2701 wherein the interface device compensates for rotation of the IMU. Line 2802 is the movement of the cursor wherein the interface device moves the cursor according to rotation of the IMU.

Figure 29:
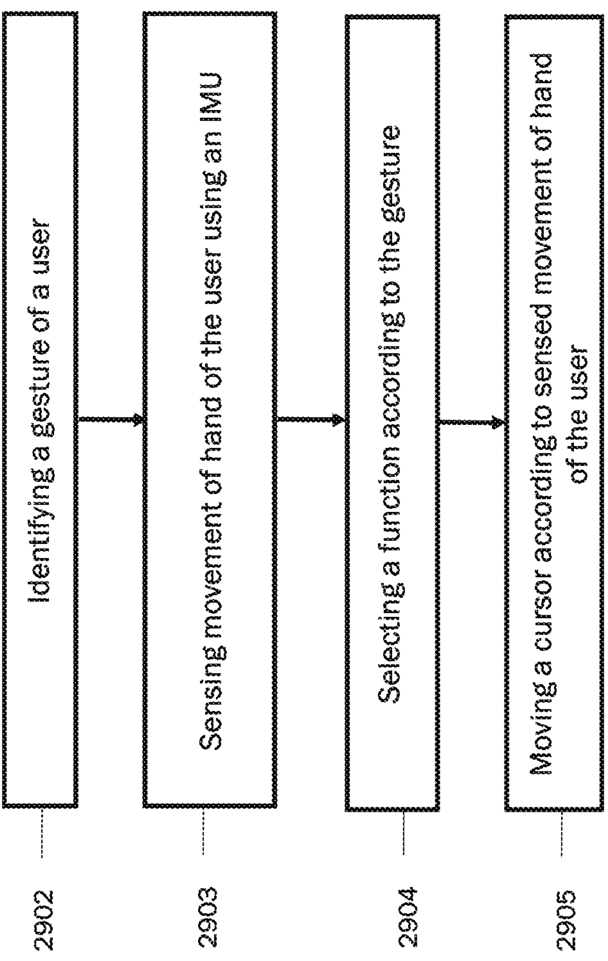
FIG. 29 is a flowchart of a method for controlling a cursor using an interface device with an IMU and biopotential sensors, in accordance with some embodiments of the present invention.
Figure 29:

FIG. 29 is a flowchart of a method for controlling a cursor using an interface device with an IMU and biopotential sensors, in accordance with some embodiments of the present invention. In some embodiments of the present invention, method 2901 may comprise identifying a gesture of a user 2902. Method 2901 may include sensing movement of hand of the user using an IMU. Method 2901 may include selecting a function according to the gesture 2904. Method 2901 may include moving a cursor according to sensed movement of the hand of the user.

Figure 30B:
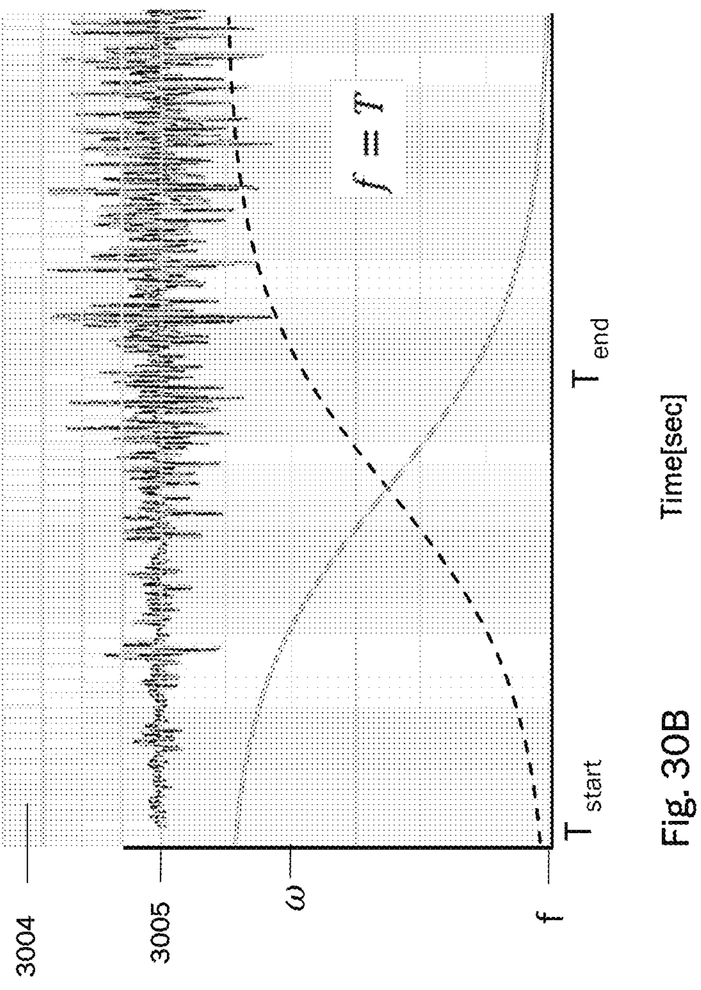
FIG. 30B is a graph showing measurements of force and rotational speed of the hand of FIG. 30A for estimating force, in accordance with some embodiments of the present invention.
Figure 30A:
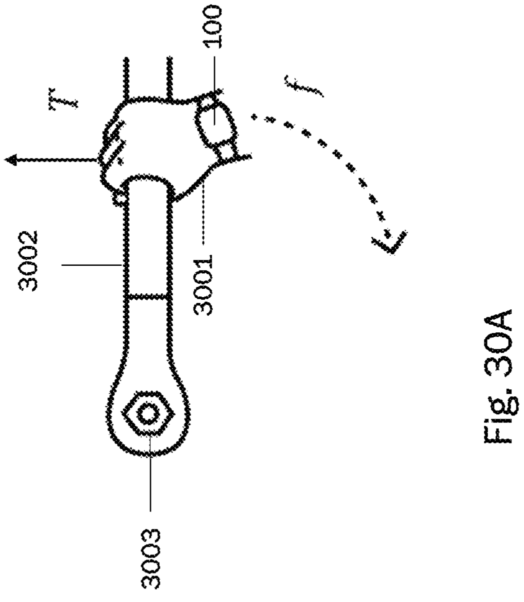
FIG. 30A is an illustration of a hand of a user rotating a wrench, the hand equipped with an interface device for estimating force, in accordance with some embodiments of the present invention.

FIG. 30A is a schematic view of a hand of a user rotating a wrench, the hand wearing an interface device for estimating force, in accordance with some embodiments of the present invention. A user may hold a wrench 3002 with their hand 3001 to tighten nut 3003. The user may apply force in a clockwise direction. The user may wear interface device 100. Interface device 100 may include one or a plurality of bipotential sensors, and an IMU. The one or a plurality of biopotential sensors may measure force applied by the user on wrench 3002 for tightening nut 3003. When nut 3003 is tightened, nut 3003 may not turn further clockwise, and wrench 3002 may not turn further clockwise. The force may be estimated by measuring the force applied by the user when the wrench cannot turn further clockwise, and the measured rotational movement (velocity) is near zero.

In some embodiments of the present invention, an interface device may be configured to estimate a weight of an object or an applied force. The interface device may comprise one or a plurality of biopotential sensors configured to be placed on a limb of a user and to measure one or more biopotential signals from one or more muscles and nerves of the limb. The interface device may comprise a processor to obtain the measured one or more biopotential signals and to estimate a weight of an object supported by the limb of the user or of a force applied by that limb based on one or more biopotential signals that were measured with respect to known weights or known forces.

In some embodiments of the present invention, an interface device may be configured to detect successful connecting or disconnecting of parts of at least one type of connector to assess if it was connected or disconnected correctly. This may be beneficial on a production line were forgetting to assemble a connector, or bad assembly of a connector may cause product failures, safety issues and may require big effort to detect and fix the issue at the end of the assembly process. The interface device may comprise one or a plurality of biopotential sensors configured to be placed on a wrist of a user and to measure one or more biopotential signals from one or more muscles and nerves of the wrist. The interface device may be configured to estimate the force applied to fasten a connector. The interface device may comprise a microphone and may be configured to record the sounds created when fastening the connector such as click of connection or friction sounds from the connector. The interface device may comprise inertial measurement unit and may be configured to record the accelerations created when fastening the connector or the orientation of the hands holding the connector. The device may be configured to store samples of sounds, biopotentials or acceleration and orientation of hands of a user while correctly fastening at least one type of connector in a memory bank of correct examples. The device may be configured to store samples of sounds, biopotentials or acceleration and orientation of at least one hands of at least one user while correctly disconnecting at least one type of connector in a memory bank. The device may be configured to store samples of sounds, biopotentials or accelerations and orientation of at least one hand of at least one user while making other irrelevant movements and gestures to a memory bank. In some embodiments of the present invention, a neural network configured as a 2-class classifier may be trained on the stored samples to detect correct fastening of only one type of connector. In some embodiments of the present invention, a neural network configured as a meta learner may be trained to map the stored samples on to a metric feature space such that samples of correctly fastening one type of connector will be mapped to a coordinate at close distance to each other, and as far as possible from coordinates of connecting or disconnecting other types of connectors and other irrelevant movements and gestures. the meta learner maybe further trained to map the stored samples on to a metric feature space such that the samples taken from a specific user will be mapped to a coordinate at close distance to the same user and as far as possible from coordinates of other users, and such that samples of correctly fastening one type of connector by that user will be mapped closer to each other and far from samples of fastening other connectors within a region in the metric feature space where the user samples were mapped on which is far from regions in the metric feature space where other users samples where mapped on.

In some embodiments of the present invention the interface device may be configured to detect if a new action done by a user is correctly fastening one type of connector by presenting the trained 2d classifier with new samples from at least one of the following: at least one biopotential sensor, a microphone, an inertial measurement unit.

In some embodiments of the present invention the interface device may be configured to detect if a new action done by a user is correctly fastening a connector by first using the trained meta learner to map new samples from at least one of the following: at least one biopotential sensor, a microphone, an inertial measurement unit to a coordinate on the metric feature space and then checking if it is mapped within a region of the metric space of correctly fastening a specific connector.

In some embodiments of the present invention the detection accuracy per user maybe improved by using the trained meta learner to map a set of exemplary samples of a new user of each type of connector correctly fastening or disconnecting from at least one of the following: at least one biopotential sensor, a microphone, an inertial measurement unit to coordinate on the metric feature space to get a set of coordinates per each action of the user and training a classifier to classify the action done by the user according to its mapped coordinate.

FIG. 30B is a graph showing measurements of force and rotational speed of the hand of FIG. 30A for estimating force, in accordance with some embodiments of the present invention. Graph 3004 shows measurements 3005 from the biopotential sensors. Force f may be extracted from the measurements of the biopotential sensors. Rotational movement ω may be measured from the IMU. Graph 3004 shows that as time advances, the force f increases, indicating that the user is applying more force to tighten the nut 3003, while the rotational movement ω decreases, indicating that the wrench may not turn further clockwise. The force may be estimated by identifying the value of force, when the values of force data are near a maximum and the values of movement data are near a minimum (e.g., near zero).

In some embodiments of the present invention, interface device may estimate force by comparing extracted values of force when the user is turning wrench 3002 (to tighten nut 3003) to extracted values of force from baseline readings (and calibration). The interface device 100 may obtain baseline readings by extracting values of force and measurements from the IMU combined with readings from a force meter (e.g., a force meter attached to the wrench) while the user is rotating a lever such as wrench 3002. The interface device may obtain multiple baseline readings for having a sufficient sample database. For example, the interface device may obtain baseline readings when the user is turning different wrenches and nuts and/or at different directions. The processor of the interface device may be configured to apply a meta learner regressor on all the baseline readings of the user and obtain regression parameters that are specific to that user. Based on the regression parameters of the user, the processor may then estimate the force, using extracted values of force when the user is turning wrench 3002.

Figure 31A:
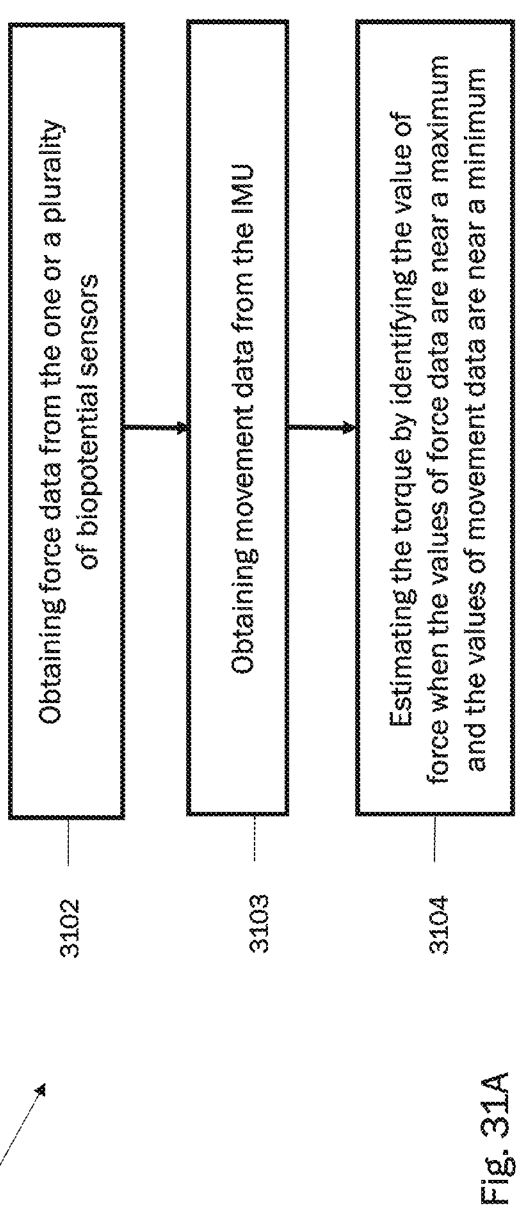
FIG. 31A a flowchart of a method for estimating force using an interface device with an IMU and biopotential sensors, in accordance with some embodiments of the present invention.

FIG. 31A is a flowchart of a method for estimating force using an interface device with an IMU and biopotential sensors, in accordance with some embodiments of the present invention. In some embodiments of the present invention, method 3101 may comprise obtaining force data from one or a plurality of biopotential sensors 3102. Method 3101 may include obtaining movement data from the IMU 3103. Method 3001 may include, using an interface device, estimating the force by identifying the value of force when the values of force data are near a maximum and the values of movement data (e.g., an angular or linear velocity) are near a minimum 3104.

Figure 31B:
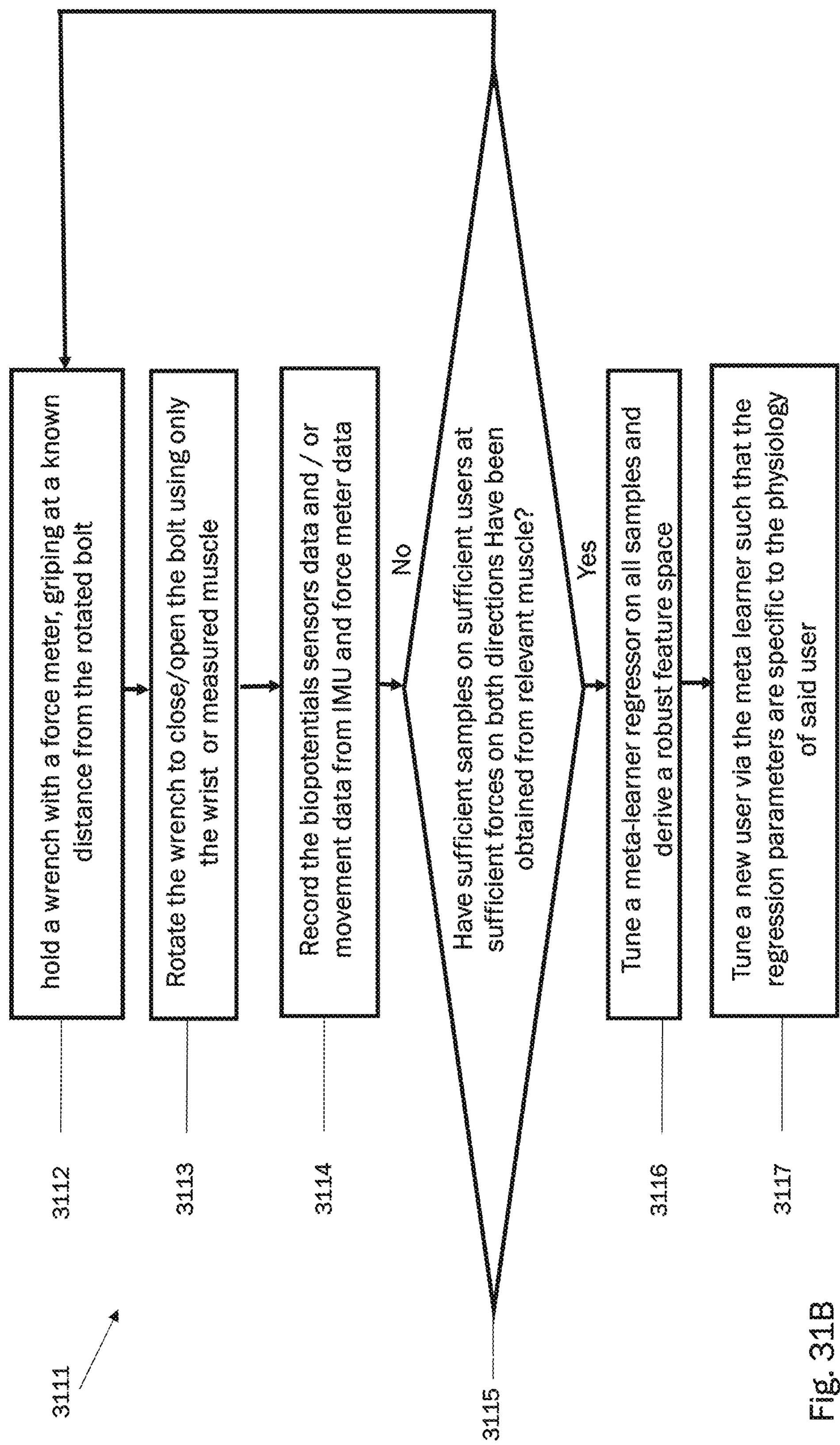
FIG. 31B a flowchart of a method for calibrating the interface device to estimate force, in accordance with some embodiments of the present invention.

FIG. 31B a flowchart of a method for calibrating the interface device to estimate force, in accordance with some embodiments of the present invention. method 3111 may comprise holding by, a user, a lever such as a wrench with a force meter, griping at a known distance from a bolt 3112. It may be important for the user to grip the lever at the same distance from the rotated bolt so that the force estimation and calibration are consistent. Method 3111 may comprise rotating, by the user, the lever to close or open the bolt using only wrist of the user or another measured muscle 3113. It may be important for the user to use that same muscle groups and the same movement while applying force, so that the force estimation and calibration are consistent.

In some embodiments of the present invention method 3111 may include obtaining data from the biopotential sensors data and/or movement data from IMU and force meter data 3114. The processor may obtain the biopotential sensors data and/or movement data from IMU and force meter data.

In some embodiments of the present invention method 3111 may include checking by the processor, if sufficient samples of force estimation on both directions (e.g., clockwise and counterclockwise rotation directions, or closing and opening directions) have been obtained from sufficient number of different users 3115. By "sufficient samples" is meant that a model constructed from the collected data allows accurate enough estimation of force (e.g., small enough estimation error). When the number of samples is not sufficient, method 3111 may comprise returning to step 3112 for obtaining additional samples. When the number of samples is sufficient, the method 3111 may comprise tuning a meta-learner regressor on all samples and deriving a feature space (e.g., robust feature space) 3116.

In some embodiments of the present invention method 3111 may include tuning the model to a new user via the meta learner such that the regression parameters are specific to said user 3117.

Figure 31C:
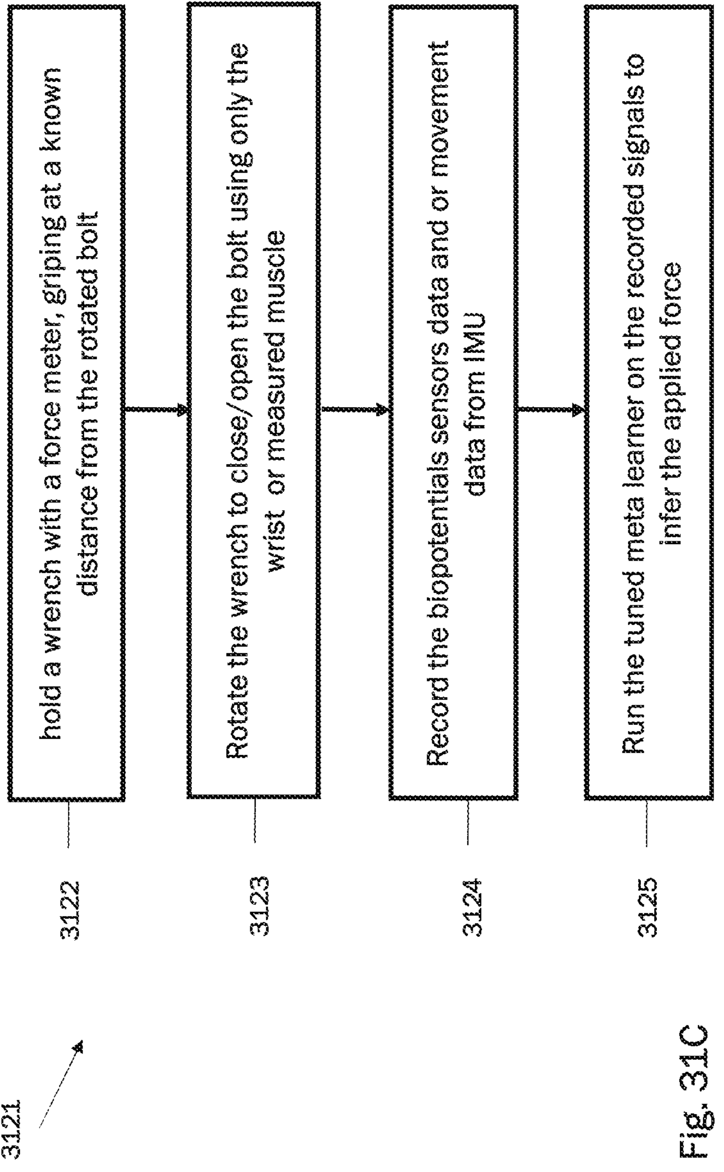
FIG. 31C a flowchart of a method for estimating force using the interface device, in accordance with some embodiments of the present invention.

FIG. 31C is a flowchart of a method for estimating force using the interface device, in accordance with some embodiments of the present invention. Method 3121 may comprise holding, by the user, a lever such as a wrench with a force meter, wherein the user grips the lever at a known distance from the rotated bolt 3122. Method 3121 may include rotating the lever to close or open the bolt using the wrist of the user or a designated muscle group 3123. Method 3121 may include obtaining data from biopotential sensors and/or movement data from the IMU 3124. Method 3121 may include running the tuned meta learner on the obtained data to infer the applied force and estimate the force 3125.

In some embodiments of the invention, based on the estimated force, the applied torque may be calculated and presented.

FIG. 32A is a schematic view of a hand of a user lifting an object, the hand wearing an interface device for estimating weight of the object, in accordance with some embodiments of the present invention. FIG. 32B is a graph showing measurements of force of the hand of FIG. 32A for estimating weight of the object of FIG. 32A, in accordance with some embodiments of the present invention. FIG. 32C is a graph showing measurements of speed of the hand of FIG. 32A for estimating weight of the object of FIG. 32A, in accordance with some embodiments of the present invention. The interface device 100 may estimate weight of an object such as cup 3201. The user may wear the interface device 100 (for example on their wrist or around their biceps), and interface device 100 may measure gestures and movement of the user and extract values of force applied by the user (e.g., force applied when holding and lifting cup 3201). The interface device may extract values of force while the user is holding the cup 3201 without lifting the cup (e.g., performing a baseline reading or calibration). The interface device may estimate the weight of cup 3201 by extracting values of force while the user is lifting cup 3201 and comparing said extracted values of force with the extracted values of force obtained during the baseline reading.

The user may wear the interface device 100 around their biceps. The interface device may obtain a baseline reading of extracted values of force from biceps muscle fibers of the user. The interface device may obtain baseline readings when the user is holding but not lifting cup 3201, while the forearm of the user is substantially at 90 degrees relative to their biceps. The interface device 100 may obtain multiple baseline readings while the user is holding different cups with different weights. The processor of the interface device may be configured to apply a meta learner regressor on all the baseline readings of the user and obtain regression parameters that are specific to the user. Based on the regression parameters of the user, the processor may then estimate the weight of cup 3201, using extracted values of force when the user is lifting cup 3201 (while flexing their biceps).

The user may wear the interface device 100 around their wrist. The interface device may obtain a baseline reading of extracted values of force from muscle fibers of the user related to wrist abduction, wrist flexing and or finger clenching. The interface device may obtain baseline readings when the user is holding but not lifting cup 3201. For example, baseline for wrist abduction and/or finger clenching may be obtained by the interface device when the user is wrapping their fingers around cup 3201 without lifting cup 3201. Baseline readings for wrist flexion may be obtained by the interface device when the user places cup 3201 on their open palm without lifting cup 3201. The interface device 100 may obtain multiple baseline readings (e.g., using cups with different weights) and calculate regression parameters specific to the user. Based on the regression parameters of the user, the processor of the interface device 100 may then estimate the weight of cup 3201, using extracted values of force when the user is lifting cup 3201.

In some embodiments of the present invention, the interface device may distinguish between force extracted from measurements of the user while the user is lifting cup 3201 and while the user is holding cup 3201 without lifting cup 3201. The interface device 100 may measure speed of arm movement of the user as shown in line 3203. When the user is holding the cup 3201 without lifting cup 3201 the speed is substantially zero while the extracted values of force (shown in line 3202) may change. At time 3204 when the user starts lifting the cup 3201, their arm moves. The interface device may determine that cup 3201 is lifted when the speed is different from zero at time 3204.

Figure 33A:
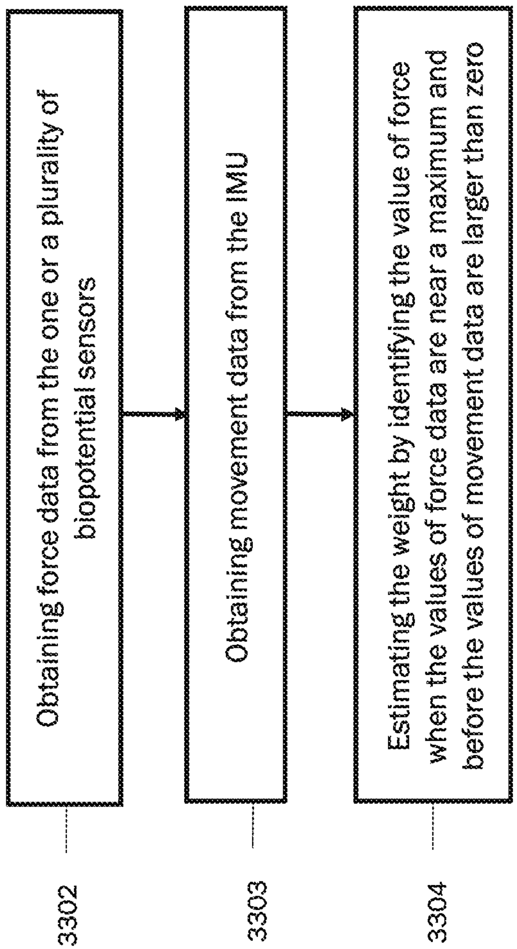
FIG. 33A is a flowchart of a method for estimating weight of an object using an interface device with an IMU and biopotential sensors, in accordance with some embodiments of the present invention.

FIG. 33A is a flowchart of a method estimating weight of an object using an interface device with an IMU and biopotential sensors, in accordance with some embodiments of the present invention. In some embodiments of the present invention, method 3301 may comprise obtaining force data from one or a plurality of biopotential sensors 3302. Method 3301 may include obtaining movement data from the IMU 3303. Method 3301 may include, using an interface device, estimating the weight by identifying the value of force when the values of force data are near a maximum and before the values of movement data are larger than zero 3304.

Figure 33B:
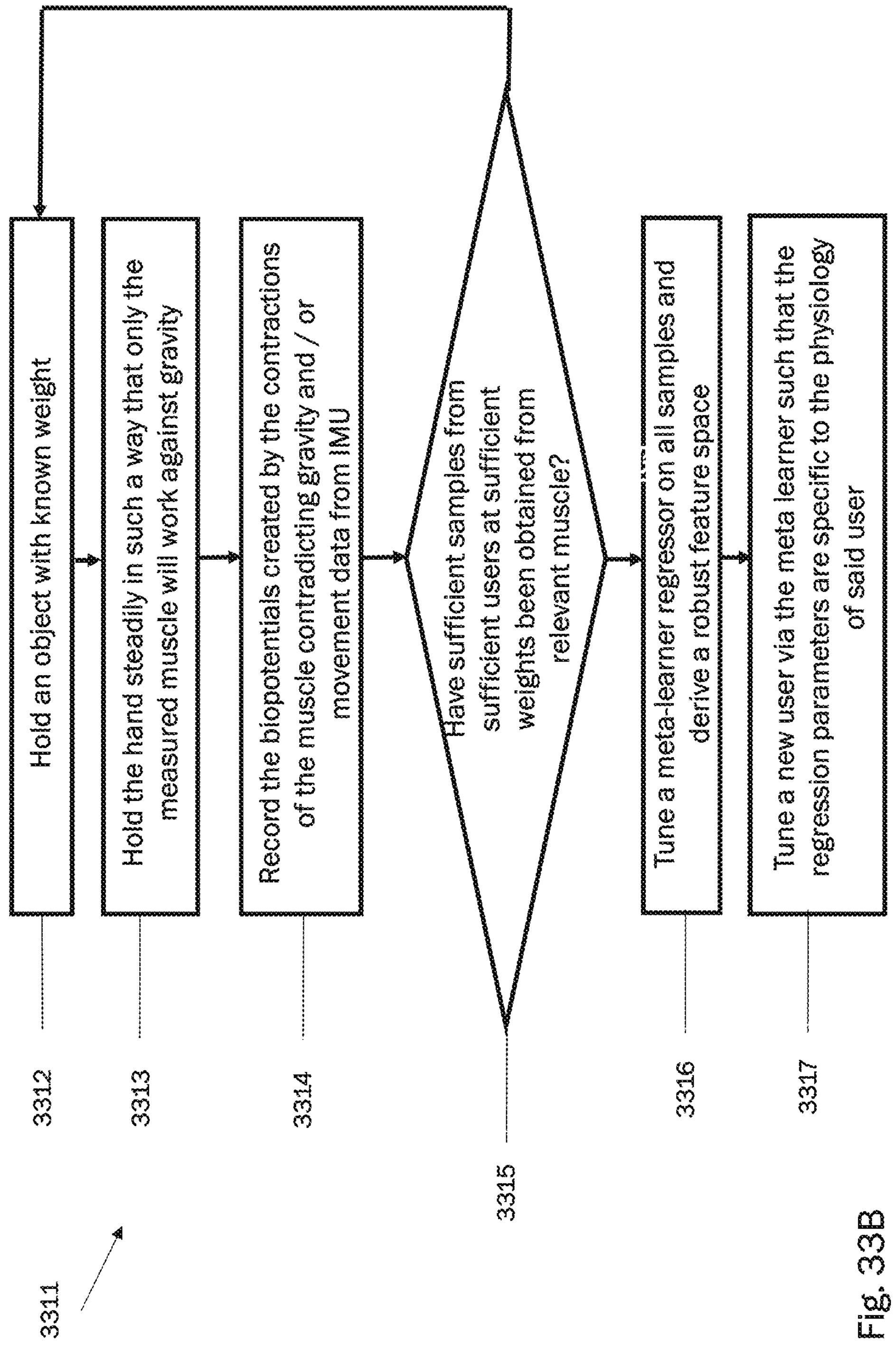
FIG. 33B is a flowchart of a method for calibrating the interface device to estimate weight of an object, in accordance with some embodiments of the present invention.

FIG. 33B is a flowchart of a method for calibrating the interface device to estimate weight of an object, in accordance with some embodiments of the present invention. method 3311 may comprise holding by, a user, an object with a known weight 3312. It may be important for the user to grip the object the same way in each measurement so that the weight estimation and calibration are consistent. Method 3311 may comprise holding the hand of the user steadily so that the measured biopotential signals may be taken from a muscle or a group of muscles holding the object against gravity 3313. It may be important for the user to use the same muscle groups and the same movement while holding the object, so that the weight estimation and calibration are consistent.

In some embodiments of the present invention method 3311 may include obtaining data from the biopotential sensors and/or movement data from IMU and force meter data 3314. The processor may obtain the biopotential sensors data and/or movement data from IMU and force meter data.

In some embodiments of the present invention method 3311 may include checking by the processor, if sufficient samples of weight estimation from sufficient different users lifting sufficient different weights have been obtained from relevant muscles 3315. Again, by "sufficient samples" is meant that a model constructed from the collected data allows accurate enough estimation of weight (e.g., small enough estimation error). When the number of samples is not sufficient, method 3311 may comprise returning to step 3312 for obtaining additional samples. When the number of samples is sufficient, the method 3311 may comprise constructing a meta-learner regressor model on all samples and deriving a feature space (e.g., robust feature space) 3316.

In some embodiments of the present invention method 3311 may include tuning a new user via the meta learner such that the regression parameters are specific to said user 3317.

Figure 33C:
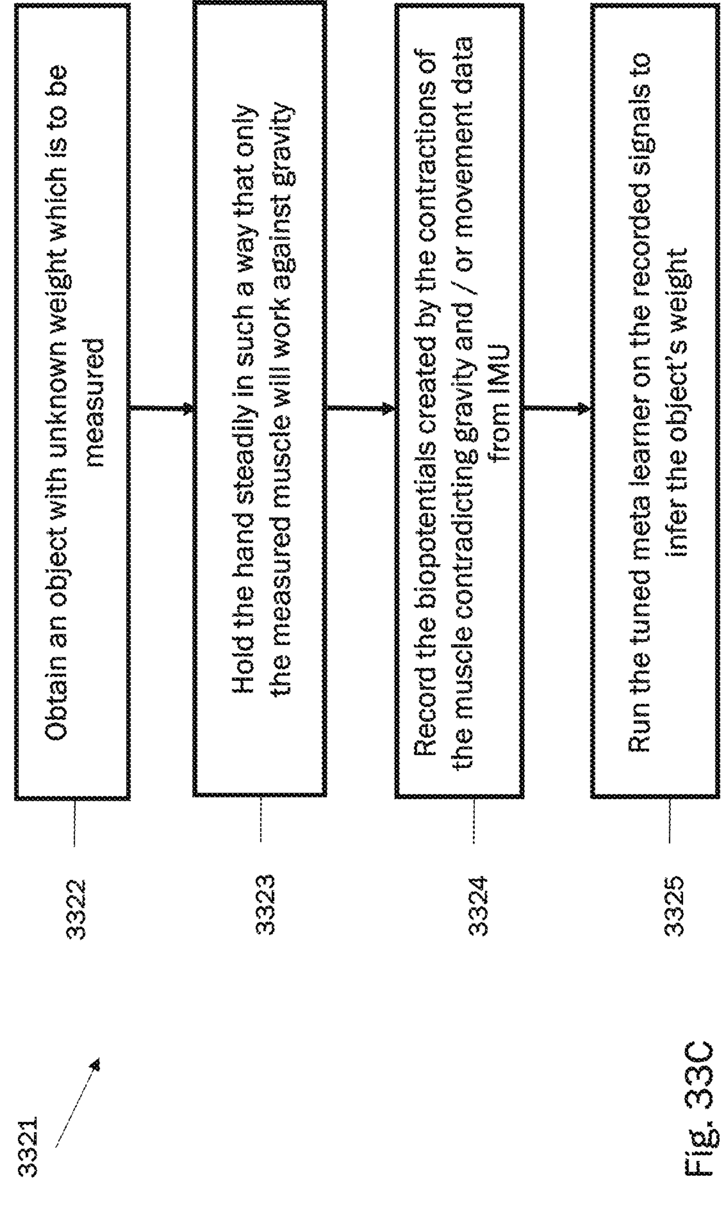
FIG. 33C is a flowchart of a method for estimating weight of an object using the interface device, in accordance with some embodiments of the present invention.

FIG. 33C is a flowchart of a method for estimating weight of an object using the interface device, in accordance with some embodiments of the present invention. Method 3321 may comprise obtaining, by the user, an object for estimating weight of the object 3322. Method 3321 may include holding the hand of the user steadily, so that the muscle or muscle group that is holding the object against gravity is steady while data is being obtained 3323. Method 3321 may include recording 3324 the biopotentials created by the contractions of the muscle contradicting gravity and/or movement data from IMU.

Method 3321 may include running the tuned meta learner on the recorded data to estimate weight of the object 3325.

In some embodiments of the present invention, a gesture and voice-controlled interface device may be configured to identify a gesture performed by the user for interfacing with a virtual object and provide feedback to the user for enhancing a virtual experience of the user via sensory substitution. Sensory substitution may refer to the user's perception of a virtual object. The interface device may provide feedback to the user when the user is interacting with the virtual object, to provide perception of a quality of the virtual object (such as wight, texture, elasticity, and mobility of the virtual object). Sensory substitution may enhance the virtual experience of the user, as the user may perceive (e.g., feel) qualities of the virtual object (mimicking an interaction with a physical object). Sensory substitution provided by the interface device may be used for simulations (e.g., tutorials for interfacing with physical objects such as operating machinery, flight and driving simulations, a simulation of operating on a patient, etc.), virtual and augmented reality, and gaming (e.g., videogames on a computing device or a game platform such as the metaverse, wherein the experience of the user is enhanced by the sensory substation and similar functions of the interface device).

In some embodiments of the present invention, the processor may be configured to obtain one or a plurality of sensed gestures from said one or a plurality of gesture sensors and to analyze the one or a plurality of sensed gestures to identify an input from the user, and to generate an output signal corresponding to the input to a controlled device, wherein the output signal is modulated by a modulating function. The modulating function simulates a physical parameter relating to a virtual object or a virtual environment.

The modulating function is a way in which the parameters of a virtual object such as weight, texture, elasticity etc. change the way the virtual object reacts to user interaction or input with the object, such as pressing, lifting, touching the object, via a feedback such as a visual display, sound, haptics etc. for example, a virtual ball may react to a user squeezing the ball by changing its visual size as a function of the pressure applied by a user and the balls physical parameters can modulate the ball's reaction. For example, a sponge ball will have pressure modulation function that behaves as a $1-e^{-pressure}$—its visual size will rapidly degrees at first, but any increase in pressure will yield less change in its size, while the size of a hard ball will not react to the pressure. A texture for example can be simulated by changing the voltage applied to a speaker to create sound or to a haptic actuator through a high pass filter. The texture may also be simulated by the pace size in pixels at which visual curser is moving on a screen. A modulation function of a texture is a two-dimensional function or matrix such as sine, a triangle, or spikes train, describing the surface height at each coordinate on the surface. As the position of a hand of the user changes, the modulation function provides the surface height at this position as an output function. The function is sent to the feedback device to create the illusion of a real texture. a high pass filter may be applied to the output function to prevent any feedback when the hand position is static.

Figure 35A:
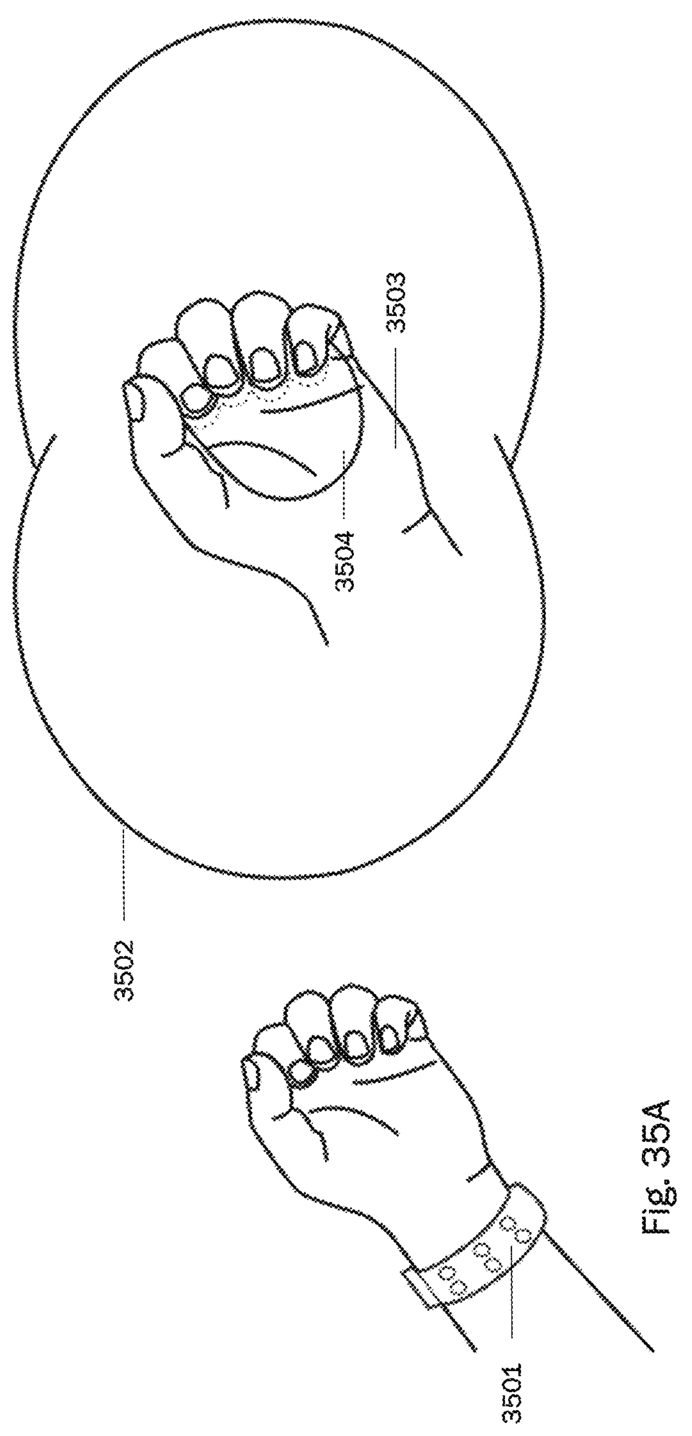
FIG. 35A describes a wrist of a user with a wearable interface device, according to some embodiments of the invention, configured to detect the pressure applied by user, wearing a heads-up display, displaying a virtual hand squeezing a virtual ball.
Figure 35B:
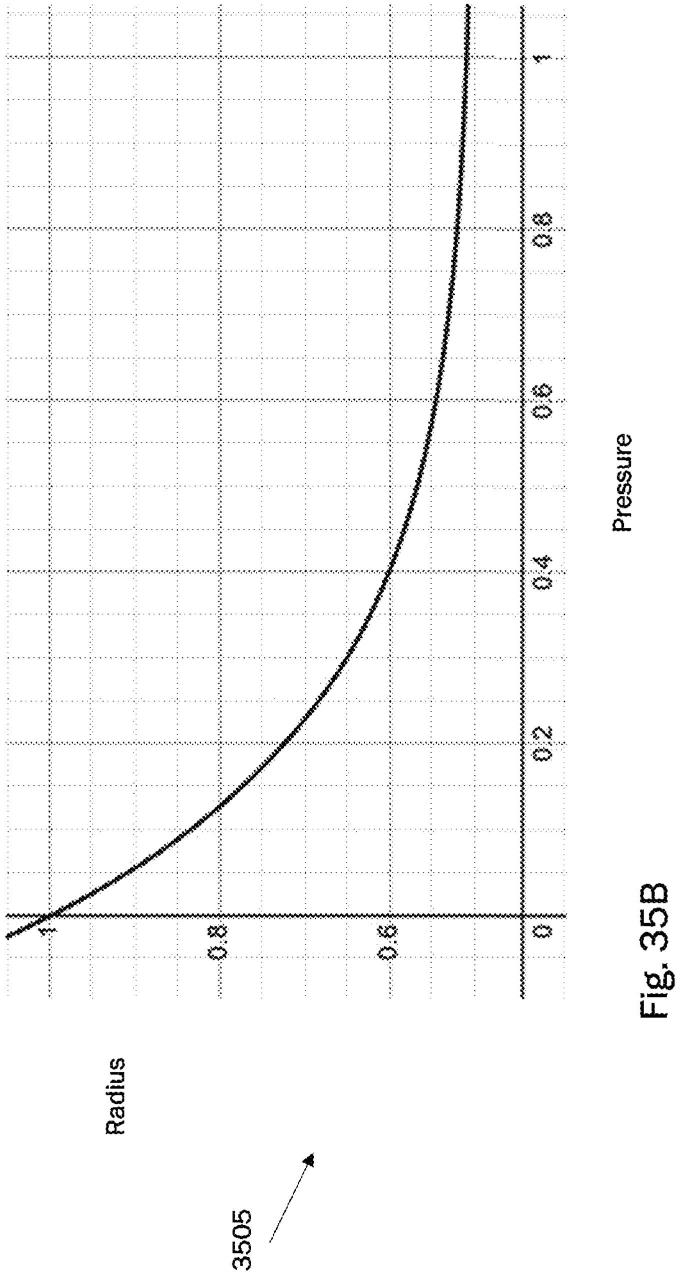
FIG. 35B is a graph of a modulation function describing the radius of the virtual ball as a function of the estimated pressure applied by the user.

FIG. 35A describes a wrist of a user with a wearable interface device 3501 according to some embodiments of the invention, configured to detect the pressure applied by user, wearing a heads-up display 3502 displaying a virtual hand 3503 squeezing a virtual ball 3504. FIG. 35. B is a graph 3505 of a modulation function describing the radius of the virtual ball as a function of the estimated pressure applied by the user.

Figure 36:
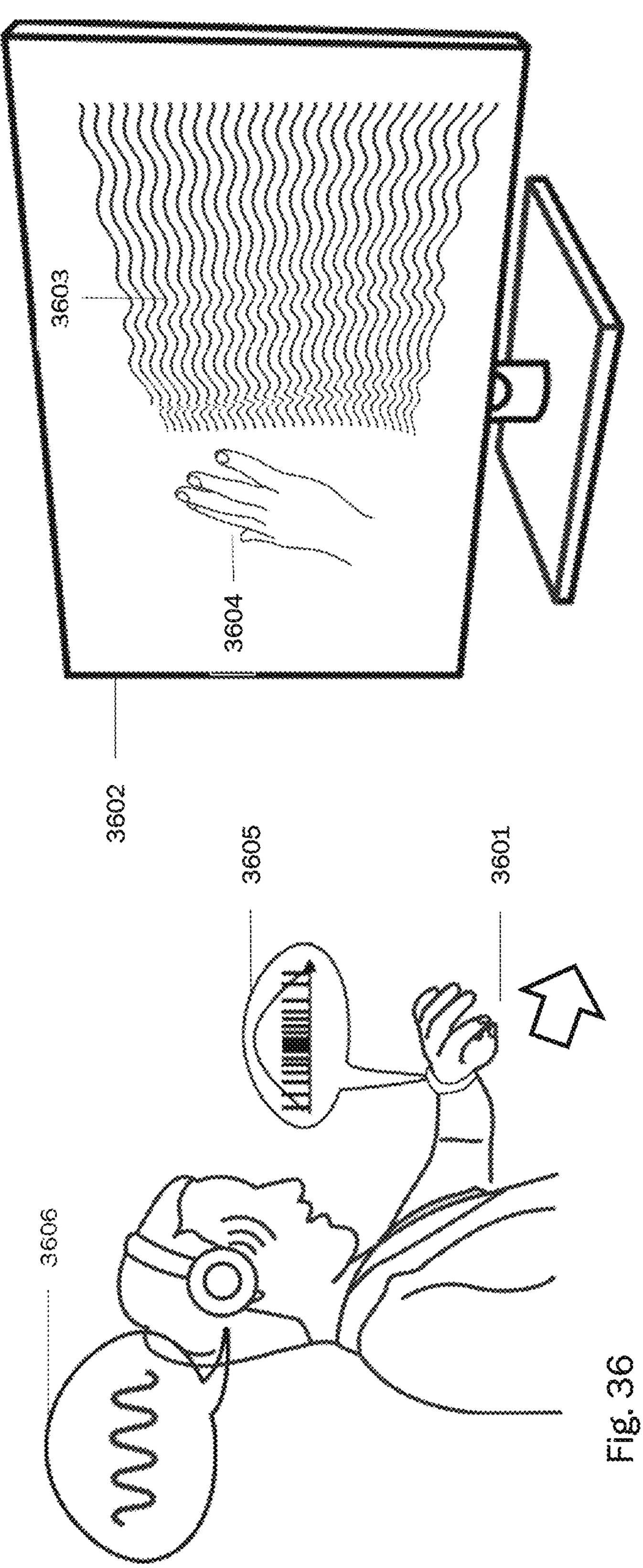
FIG. 36 shows a user wearing a wrist interface device and earphones, according to some embodiments of the present invention.
Figures 37A, 37B, 37C, 37D:
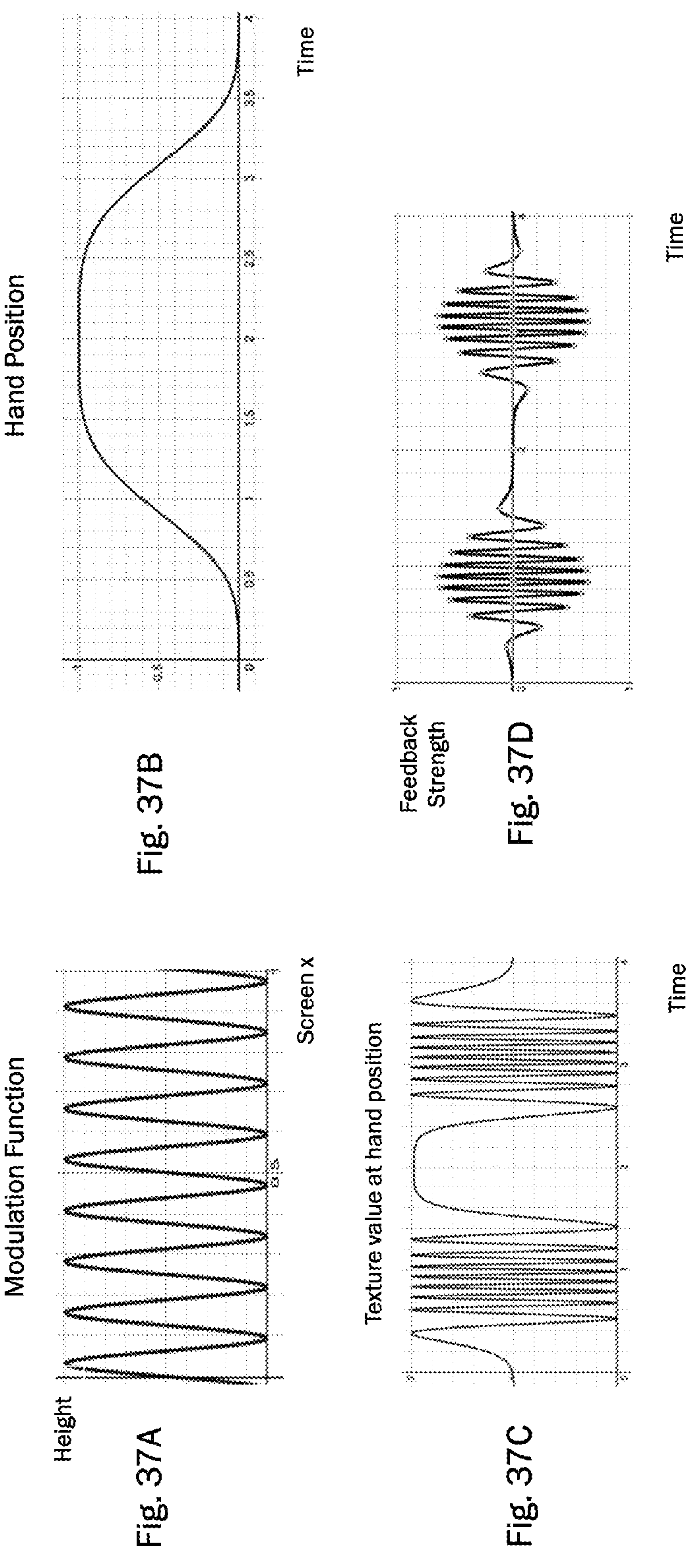
FIG. 37A is a graph of sinusoidal modulation function describing a virtual pattern as function of position along a screen.
FIG. 37B is a graph that describes a possible movement of a hand along x axis as function of time
FIG. 37C is a graph that shows a value of texture as function of time as result of moving a hand along x axis
FIG. 37D is a graph of the texture value after a high pass filter was applied to it.

FIG. 36 shows a user wearing a wrist interface device and earphones, according to some embodiments of the present invention. The user moves his hand in front of screen 3602 displaying a virtual hand 3604 moving according to the detected movement of the user hand 3601 while touching a virtual surface 3603 with sinus texture. The user gets haptic feedback 3605 on his wrist and hears sound feedback 3606 that are determined by the virtual pattern shown in FIG. 37D. FIG. 37A is a Graph of sinusoidal modulation function describing the virtual pattern as function of position along the screen 3602 width. FIG. 37B is a graph that describes a possible movement of the hand along x axis as function of time. The hand is not moving at first, then quickly moves to the screen center and waits, and then continues to the screen end and stops. FIG. 37C is a Graph that shows the value of the texture as function of time when applying the modulation function of FIG. 37A to a hand position that moves according to FIG. 37B. In this graph the feedback strength may stay high when the hand is still at the center of the screen. FIG. 37D shows the feedback after a high-pass filter. Here the feedback value is zero when the hand is not moving. Thus, according to some embodiments of the invention, the processor of the input device may use the modulation function to modulate one or more properties of the one or a plurality of sensed gestures and use the modulated one or more properties of the one or a plurality of sensed gestures to provide feedback to the user using a feedback device.

In some embodiments of the present invention, the interface device may be linked to a screen. The screen may display a virtual object for the user to interact with. The user may perform a gesture for attempting to lift the virtual object. The interface device may provide feedback to the user for providing a perception of weight of the virtual object. The interface device may display that the virtual object begins to rise when measured force applied by the user (e.g., the user pressing their fingers together) is above a threshold. For example, the heavier the virtual object is to be perceived, the higher the threshold (e.g., the user is required to apply more force to lift the virtual object). The user may perform a gesture for squeezing the virtual object (e.g., closing their hand as if grabbing a physical object). The interface device may display a deformation in the virtual object based on the gesture. For example, when the user performs a squeezing gesture, to provide a perception of a mailable object, the interface device may display a deformation in the virtual object. To provide a perception of a rigid object, the interface device may display a little to no deformations in the virtual object. To provide a perception of an elastic object, the interface device may display a deformation in the virtual object during the gesture and return the virtual object to an original shape after the gesture is concluded (e.g., for perception of a plastic object the deformations remain after conclusion of the gesture).

The user may perform a gesture for feeling the texture of the virtual object (e.g., moving an open hand in space as if touching or brushing the virtual object). The interface device may display a cursor (e.g., shaped like a hand) brushing over the virtual object based on the gesture. For example, to provide a perception of a textured or coarse object, the interface device may display the cursor moving slowly over a surface of the virtual object (e.g., compared to less coarse objects). To provide a perception of a smooth or slippery object, the interface device may display the cursor moving swiftly over a surface of the virtual object (e.g., compared to less smooth virtual objects).

The interface device may provide secondary feedback to the user for enhancing a virtual experience of the user via sensory substitution. The interface device may have a haptic actuator that vibrates to provide feedback to the user. For example, when the user is interacting with a heavier or coarser virtual object the haptic actuator may vibrate intensely (compared to lighter or smoother virtual objects). The interface device may display visual effects on a screen for enhancing a virtual experience of the user via sensory substitution. For example, the interface device may display a gauge (such as a bar) to represent the amount of force the user needs to apply for interfacing with the virtual object. The interface device my display visual effects juxtaposed (e.g., surrounding) to the virtual object, wherein the virtual effects are modified based on the interaction of the user with the virtual object. The interface device may display visual effect such as a dotted line surrounding the virtual object, the dotted line may spin, change color, and/or expand in circumference to indicate a quality of the virtual object (and/or a quality of interaction with the virtual object). For example, the dotted line may spin at a predetermined rate for indicating that the user is performing a virtual task correctly. The dotted line may expand in circumference to indicate that the virtual object is lifted. The user may intuitively perceive the qualities of the virtual object (and qualities of interacting with the virtual objects) through the display of the visual effects.

Figure 34A:
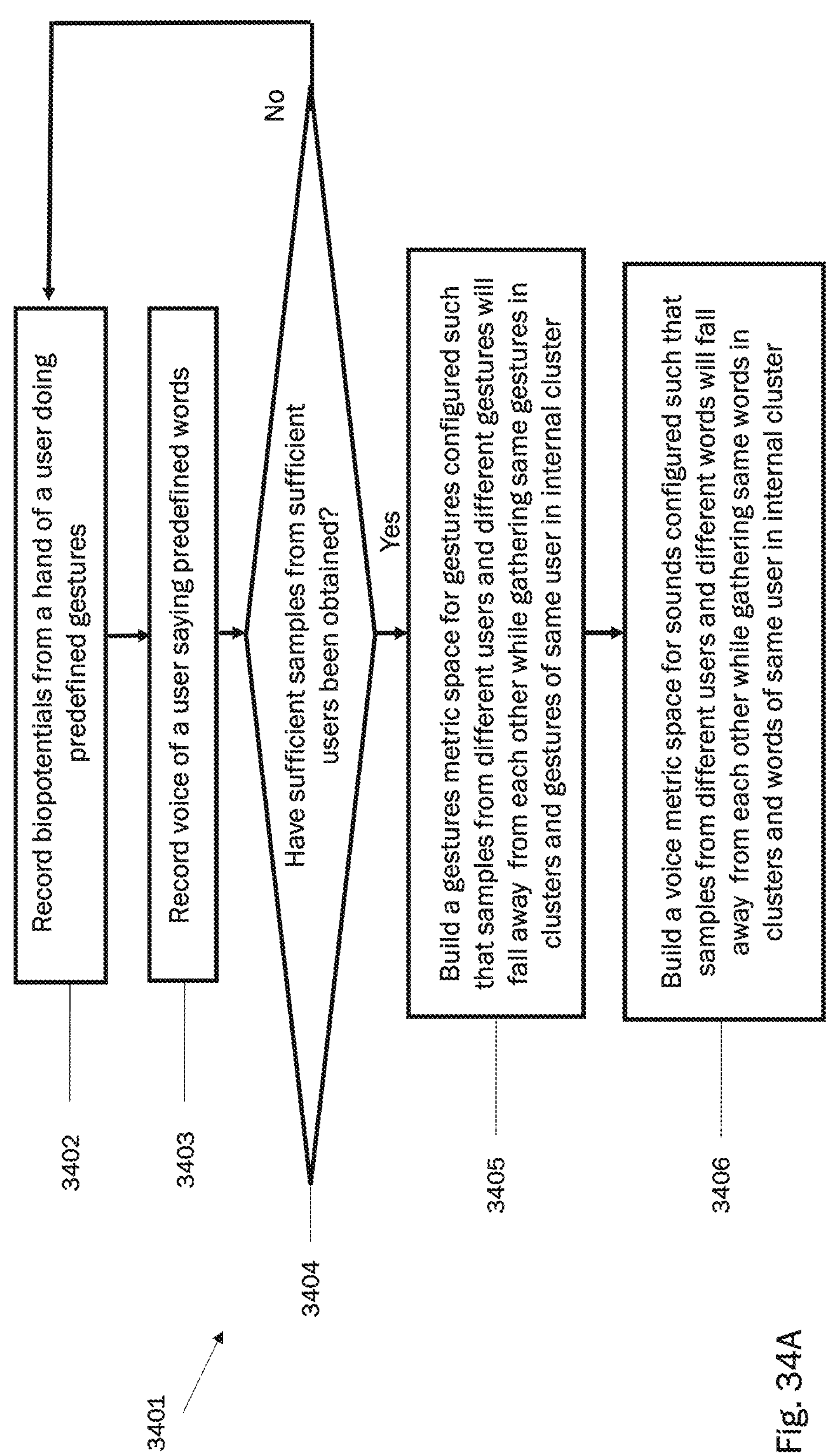
FIG. 34A is a flow chart of a method for training a metric based meta learner to uniquely identify a user based on gestures and sounds made by a plurality of users obtained using the interface device according to some embodiments of the invention.

FIG. 34A is a flow chart of a method 3401 for training a metric based meta learner to uniquely identify a user based on gestures and sounds made by a plurality of users, according to some embodiments of the invention.

Method 3401 may include recording 3402 biopotentials from biopotential sensor/s on a hand of a user performing predefined gestures. Method 3401 further includes recording 3403 voice of a user saying predefined words.

Figure 34B:
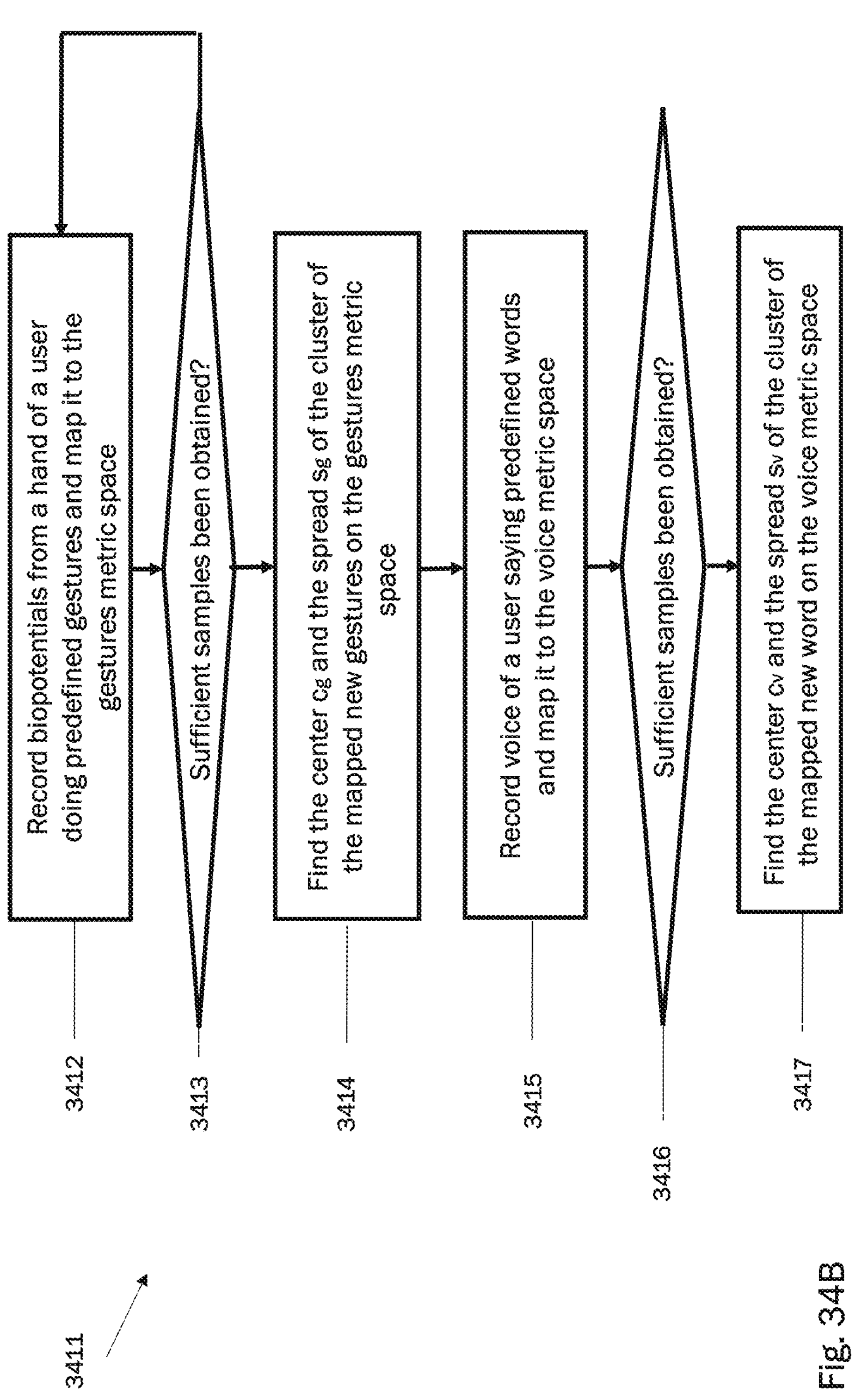
FIG. 34B is a flow chart of a method for tuning the metric based meta learner to a personal gesture signature and voice signature of a specific user, according to some embodiments of the invention.

Method 3401 may also include determining 3404 whether enough samples were obtained from sufficient number of users. If there is no sufficient number of samples or no sufficient number of users—there may be, for example, a predetermined sufficient number of required samples and a predetermined number of sufficient users or a learned decision-further recording of biopotentials 3402 and further recording of voices of a user 3403 of more users is carried out. If there is a sufficient number of samples or sampled users then method 3401 further includes building 3405 a gesture metric space for gestures configured such that samples from different users and different gestures will fall away from each other while gathering same gestures in clusters and gestures of same user in an internal cluster and building 3406 a voice metric space for sounds configured such that samples from different users and different words will fall away from each other while gathering same words in clusters and words of same user in internal cluster FIG. 34B is a flow chart of method 3411 for tuning the metric based meta learner to a personal gesture signature and voice signature of a specific user, according to some embodiments of the invention.

Method 3411 may include recording 3412 biopotentials from biopotential sensor/s on a hand of a user performing predefined gestures and mapping it to a gesture metric space.

Method 3411 may also include determining 3413 whether enough samples were obtained. If there is no sufficient number of samples—there may be, for example, a predetermined sufficient number of required samples or a learned decision—further recording of biopotentials and mapping is carried out. If there is a sufficient number of samples then method 3411 further includes finding 3414 the center $c_g$ and the spread $s_g$ of the cluster of the mapped new gestures on the gesture metric space. Method 3411 further includes recording 3415 voice of a user saying predefined words and mapping it to the voice metric space. Method 3411 may further include determining 3416 whether enough voice samples were obtained. If not, further recording 3415 voice of a user saying predefined words and mapping it to the voice metric space is carried out. If enough number of voice samples was obtained, then method 3411 further includes finding 3417 the center $c_v$ and the spread $s_v$ of the cluster of the mapped new word on the voice metric space.

Figure 34C:
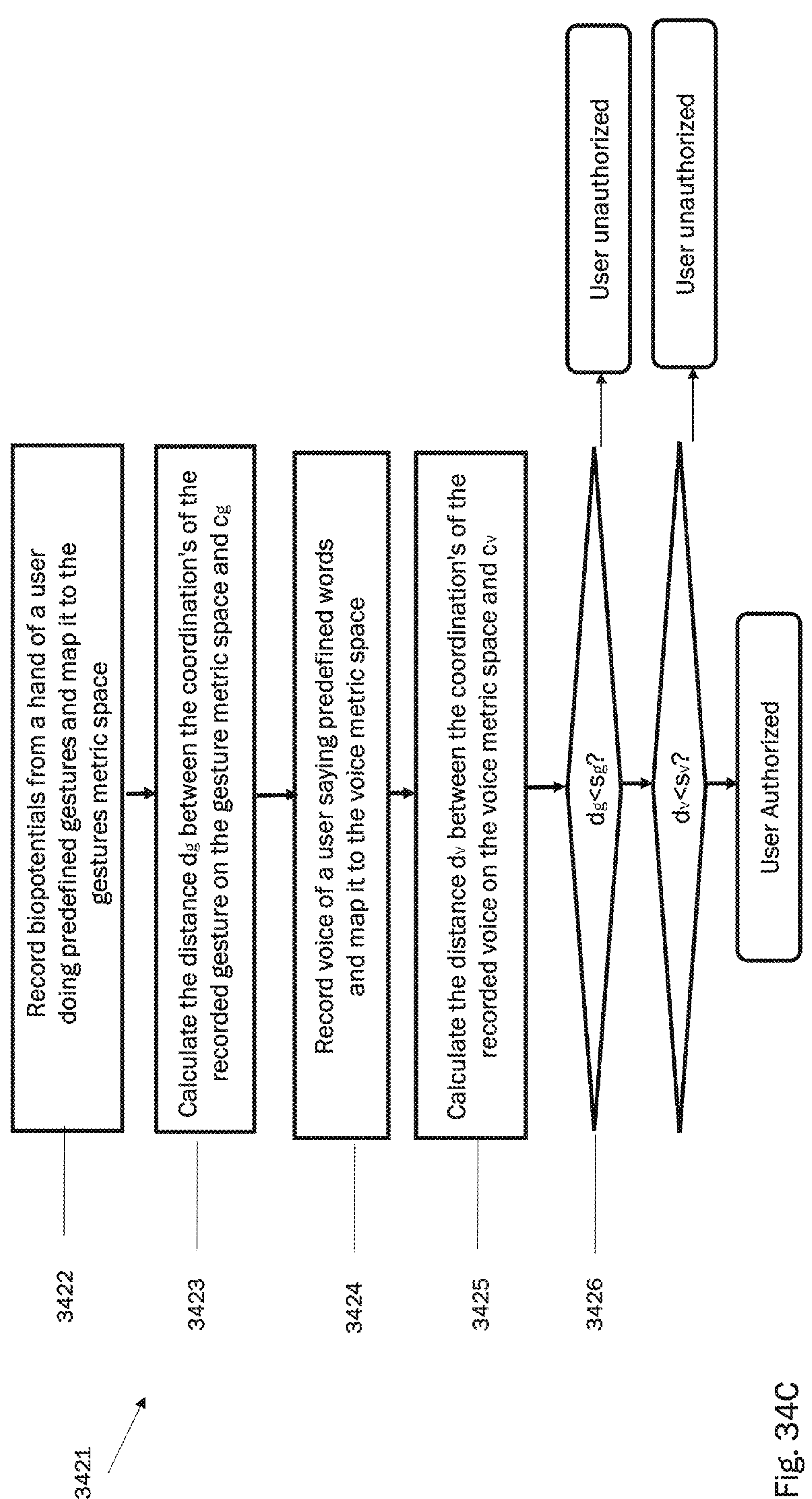
FIG. 34C is a flow chart of a method for using the interface device with the tuned metric based meta learner to authorize user input based on personal gesture signature and voice signature, according to some embodiments of the invention.

FIG. 34C is a flow chart of method 3421 for using the interface device to authorize user input based on personal gesture signature and voice signature, according to some embodiments of the invention. Method 3421 may include recording 3422 biopotentials from biopotential sensor/s on a hand of a user doing predefined gestures and mapping it to the gesture metric space. Method 3421 may also include calculating 3423 the distance $d_g$ between the coordination of the recorded gesture on the gesture metric space and $c_g$. Method 3421 may also include recording 3424 voice of a user saying predefined words and mapping it to the voice metric space. Method 3421 may also include calculating 3425 the distance $d_v$ between the coordination's of the recorded voice on the voice metric space and $c_v$. Method 3421 may also include determining whether the distance $d_g$ of the recorded gesture (from the center) is smaller than the spread of gestures $s_g$. If not, the user is determined to be unauthorized. If yes, then it is determined whether the distance $d_v$ of the recorded voice (from the center) is smaller than the spread of voices $s_v$. If not, the user is determined to be unauthorized. Only if both $d_g<s_g$ and $d_v<s_v$ are true the user is authorized to provide the input.

In some embodiments of the present invention an interface device may be used to detect: gestures made by moving fingers of a hand of a user, gestures made by moving a limb of a user, facial gestures made by moving eyes of a user, distance between two fingers of a hand of a user, pressure applied by pressing fingers of a hand of a user against each other, force applied by a muscle of a user, user actions such as connecting a connector, using one or more sensors of the following: at least one biopotential sensor, IMU, PPG, microphone, where the sensors data is going through a pipeline including sensors data preparation, data over representation, Convolutional Neural Net (CNN) layers, and output layers.

Sensor data preparation refers to resampling, alignment and normalization of sensor data from different sensors to fit on the same time frames and values range.

Over representation refers to the transformation of sensor time series data to multiple time series at different frequency bands using methods such as continuous wavelet transform (CWT), discrete wavelet transform (DWT), short time Fourier transform (STFT), Mel-frequency cepstral coefficients (MFCCs). Selecting over representation method depends on different sensor types and its usage. For example, CWT is known to best represent biopotential signals, while MFCC is usually used for audio key word detection. The over representation creates a 2d heat map that graphically represent events recorded by the sensors, for example a gesture event may be seen as a dense blob of high values in the mid frequency bands while noise may be seen as spread low values all around the heat map.

In some embodiments of the present invention, a convolutional neural network is trained as a meta learner that maps the overrepresented heat maps to an output vector or coordinate on a metric features space. During the training process, a center of cluster ck is calculated for a signal of a certain class ck with sk examples of the class, by averaging the network output values for each sensor, translating the distance between the example center and its one hot encoded label to a probability using for example SoftMax, and calculating a loss function such as cross entropy on the calculated probability and one hot encoded label.

In some embodiments of the present invention, an interface device is configured to detect hand gestures, finger gestures, and other user actions by training a meta learner to map signals of at least one biopotential sensor and an inertial measurement unit taken from many users, such that examples of gestures of same user will be mapped close to a shared cluster center, and far from the cluster centers of the examples of other gestures and actions done by other users.

In some embodiments of the present invention the above neural net may be trained as a regressor for estimating a value such as pressure applied between fingers, distance between fingers, force applied by a muscle. A ground truth signal is acquired using an auxiliary sensor such as pressure sensor, distance sensor or force sensor at the same time as signals from sensors such as biopotential sensors, PPG, IMU. The network is trained to minimize regression loss function such as $L=\log(\cos h(f(x_i)-y_i))$ where $y_i$ is the auxiliary based ground truth and $f(x_i)$ is the network output of a single value. In some embodiments, multiple regression outputs may be trained to estimate derivatives of the auxiliary signal.

In some embodiments of the present invention the above pipeline may be configured to detect keywords said by a user recorded using a microphone. MFCC method may be used to over represent the voice signal as a heatmap. The neural network may be trained as a classifier, where the output vector dimension Is the number of key words, such that $p_k$ represents the probability of the keyword to be of class k. The network is trained using a classification loss of the difference between the network output vector and the actual class label.

In some embodiments of the present invention an interface device may be used to detect gestures made by moving fingers of a hand of a user, gestures made by moving a limb of a user, facial gestures made by moving eyes of a user, distance between two fingers of a hand of a user using sensors such as a camera, a depth camera, a lidar, sonar, a radar etc. were the sensors data is going through a pipeline including dense segmentation, skeletonization and classification.

Dense segmentation is a per-pixel fine segmentation which yields semantic segmentation carefully trained using a UV coordinate estimation approach. skeletonization is a key point detection network that yields a set of key point coordinates such as a fingers base coordinate, fingertip coordinate, eye pupil coordinates etc.

In some embodiments of the present invention, a classifier is trained to recognize a gesture from the position of the skeletonization output.

In some embodiments of the present invention dense segmentation and skeletonization network are trained to segment and detect the coordinates of the tip of the index finger and thumb of a hand of a user, and a regressor is trained to estimate the distance between the tip of the index finger and the tip of the thumb of the hand of the user.

Different embodiments are disclosed herein. Features of certain embodiments may be combined with features of other embodiments. Thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A gesture interface device comprising:

one or a plurality of gesture sensors for sensing one or a plurality of gestures of a user of one or a plurality of users;

a processor configured to obtain an input of one or a plurality of sensed gestures from said one or a plurality of gesture sensors, to analyze the one or a plurality sensed gestures to identify a specific person based on comparing said one or a plurality of sensed gestures to a gesture signature of the specific person, and to generate an output signal corresponding to the input to a controlled device only if it was verified that said one or a plurality of sensed gestures were performed by the specific person; and one or a plurality of biopotential sensors, wherein the processor is further configured to record biopotentials using the one or a plurality of biopotential sensors, when the device is worn by the user so as to analyze the one or a plurality of sensed gestures and to identify the specific person.

2. A gesture interface device comprising:

one or a plurality of gesture sensors for sensing one or a plurality of gestures of a user of one or a plurality of users;

a processor configured to obtain an input of one or a plurality of sensed gestures from said one or a plurality of gesture sensors, to analyze the one or a plurality sensed gestures to identify a specific person based on comparing said one or a plurality of sensed gestures to a gesture signature of the specific person, and to generate an output signal corresponding to the input to a controlled device only if it was verified that said one or a plurality of sensed gestures were performed by the specific person; and one or a plurality of biopotential sensors, wherein the processor is further configured to record the biopotentials using the one or a plurality of biopotential sensors, to build a gesture metric space for gestures configured such that samples from a plurality of users of said one or a plurality of users and different gestures will fall away from each other while gathering same gestures in clusters and gestures of a same user of a plurality of users in an internal cluster.

3. A method comprising:

using a gesture interface device comprising one or a plurality of gesture sensors for sensing one or a plurality of gestures of a user of one or a plurality of users, and a processor;

obtaining an input of one or a plurality of sensed gestures from said one or a plurality of gesture sensors;

analyzing the one or a plurality sensed gestures to identify a specific person based on comparing said one or a plurality of sensed gestures to a gesture signature of the specific person;

generating an output signal corresponding to the input to a controlled device only if it was verified that said one or a plurality of sensed gestures were performed by the specific person;

using one or a plurality of biopotential sensors, and recording biopotentials using the one or a plurality of biopotential sensors, when the device is worn by the user, and analyzing the one or a plurality of sensed gestures and to identify the specific person.

4. A method comprising:

using a gesture interface device comprising one or a plurality of gesture sensors for sensing one or a plurality gestures of a user of one or a plurality of users, and a processor;

obtaining an input of one or a plurality of sensed gestures from said one or a plurality of gesture sensors;

analyzing the one or a plurality sensed gestures to identify a specific person based on comparing said one or a plurality of sensed gestures to a gesture signature of the specific person;

generating an output signal corresponding to the input to a controlled device only if it was verified that said one or a plurality of sensed gestures were performed by the specific person;

Using one or a plurality of biopotential sensors, and recording the biopotentials using the one or a plurality of biopotential sensors, to build a gesture metric space for gestures configured such that samples from a plurality of users of said one or a plurality of users and different gestures will fall away from each other while gathering same gestures in clusters and gestures of a same user of a plurality of users in an internal cluster.

* * * * *